US012629928B2

(12) United States Patent
Xu et al.

(10) Patent No.:  US 12,629,928 B2
(45) Date of Patent:       May 19, 2026

(54) PROPYLENE POLYMER-BASED COMPOSITE FILM, PREPARATION METHOD THEREFOR, AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Meng Xu, Beijing (CN); Shijun Zhang, Beijing (CN); Dali Gao, Beijing (CN); Yiqing Bai, Beijing (CN); Kai Xu, Beijing (CN); Yueming Ren, Beijing (CN); Jianye Liu, Beijing (CN); Hui Quan, Beijing (CN); Mu Dong, Beijing (CN); Qi Zhang, Beijing (CN); Baige Chou, Beijing (CN); Yun Lyu, Beijing (CN); Jingbo Shao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 367 days.

(21) Appl. No.: 18/249,794

(22) PCT Filed: Oct. 20, 2021

(86) PCT No.: PCT/CN2021/125096
§ 371 (c)(1),
(2) Date: Apr. 20, 2023

(87) PCT Pub. No.: WO2022/083659
PCT Pub. Date: Apr. 28, 2022

(65) Prior Publication Data
US 2024/0017533 A1      Jan. 18, 2024

(30) Foreign Application Priority Data

Oct. 20, 2020    (CN) ......................... 202011125599.3
Oct. 20, 2020    (CN) ......................... 202011126164.0

(51) Int. Cl.
*B32B 27/32*            (2006.01)
*B29C 48/00*            (2019.01)
              (Continued)

(52) U.S. Cl.
CPC .............. *B32B 27/32* (2013.01); *B32B 27/08* (2013.01); *B32B 27/20* (2013.01);
              (Continued)

(58) Field of Classification Search
CPC .............................. B32B 27/32; B32B 27/327
See application file for complete search history.

(56) References Cited

U.S. PATENT DOCUMENTS 5,709,937 A  *  1/1998  Adams .................... B32B 27/32
                                                  524/400
6,884,850 B2 *  4/2005  Schauder ................ C08L 51/06
                                                  525/207
              (Continued)

FOREIGN PATENT DOCUMENTS

CN              1884326 A      12/2006
CN          101058654 A      10/2007
              (Continued)

OTHER PUBLICATIONS

Wolf et al. "Plastics, Additives", Ullmann's Encyclopedia of Industrial Chemistry, vol. 27, (2000); pp. 620-671.*
              (Continued)

DMTModulus            2.0 µm

Primary Examiner — Prashant J Khatri

(74) *Attorney, Agent, or Firm* — NKL Law; Allen Xue

(57)                    ABSTRACT

A propylene polymer-based composite film, a preparation method therefor, and an application thereof are provided. The composite film contains at least two different layers: layer a and layer b. Layer a and layer b each contains at least one propylene polymer, and at least one of layer a and layer b contains a propylene impact copolymer. The propylene impact copolymer contains elastic moieties that form dispersed strip-like rubber phases in the composite film. The rubber phases are arranged parallel to each other. The average dimension of transverse axes of the rubber phases is 20-200 nm and the average of aspect ratios is 5-20. The composite film is can be used in the field of packaging materials, especially in battery packaging materials, electronic product packaging materials, or food packaging materials.

49 Claims, 5 Drawing Sheets

(51)  Int. Cl.
      *B29C 55/14*        (2006.01)
      *B29K 23/00*        (2006.01)
      *B29K 105/00*       (2006.01)
      *B32B 27/08*        (2006.01)
      *B32B 27/20*        (2006.01)

(52)  U.S. Cl.
      CPC ........ *B29C 48/0018* (2019.02); *B29C 55/143*
            (2013.01); *B29K 2023/12* (2013.01); *B29K*
            *2105/0005* (2013.01); *B32B 2250/02*
            (2013.01); *B32B 2250/242* (2013.01); *B32B*
            *2307/412* (2013.01); *B32B 2307/558*
            (2013.01); *B32B 2307/7376* (2023.05); *B32B*
            *2439/70* (2013.01); *B32B 2457/10* (2013.01)

(56)                References Cited

U.S. PATENT DOCUMENTS

| | | | |
|---|---|---|---|
| 2006/0147663 | A1 | 7/2006 | Barre et al. |
| 2006/0258811 | A1 | 11/2006 | Barcus et al. |
| 2013/0192744 | A1* | 8/2013 | Henderson .............. C09J 7/243 |
| | | | 156/60 |
| 2016/0325534 | A1 | 11/2016 | Hu et al. |
| 2017/0058068 | A1 | 3/2017 | Lee et al. |

FOREIGN PATENT DOCUMENTS

| | | | |
|---|---|---|---|
| CN | 101679557 | A | 3/2010 |
| CN | 101913279 | A | 12/2010 |
| CN | 101492517 | B | 3/2011 |
| CN | 102108112 | A | 6/2011 |
| CN | 104080874 | A | 10/2014 |
| CN | 104499281 | A | 4/2015 |
| CN | 105593012 | A | 5/2016 |
| CN | 106029771 | A | 10/2016 |
| CN | 106366540 | A | 2/2017 |
| CN | 106543369 | A | 3/2017 |
| CN | 107310232 | A | 11/2017 |
| CN | 107922706 | A | 4/2018 |
| CN | 108909123 | A | 11/2018 |
| CN | 108943932 | A | 12/2018 |
| CN | 109251270 | A | 1/2019 |
| CN | 111645374 | A | 9/2020 |
| CN | 112041943 | A | 12/2020 |
| CN | 113563523 | A | 10/2021 |
| CN | 113563526 | A | 10/2021 |
| CN | 113563527 | A | 10/2021 |
| CN | 113563529 | A | 10/2021 |
| CN | 113563530 | A | 10/2021 |
| JP | 2006111864 | A | 4/2006 |
| JP | 2013512310 | A | 4/2013 |
| JP | 2015513564 | A | 5/2015 |
| JP | 2016190476 | A | 11/2016 |
| JP | 2016533919 | A | 11/2016 |
| JP | 2017502148 | A | 1/2017 |
| RU | 2386651 | C2 | 4/2010 |
| WO | WO-9413719 | A1 * | 6/1994 ........... C08F 255/02 |
| WO | 2005033195 | A1 | 4/2005 |
| WO | 2018056493 | A1 | 3/2018 |
| WO | 2020020825 | A1 | 1/2020 |
| WO | 2020094347 | A1 | 5/2020 |

OTHER PUBLICATIONS

Zhang et al. "Synthesis and Characterization of Maleic Anhydride Grafted Polypropylene with a Well-Defined Molecular Structure", Macromolecules, 46, (2013); pp. 4313-4323.*

Tanaka, Haruhiko et al.; "Olefin Polymer Composition and Laminated Structure Including Said Composition as Adhesive Layer"; United States Statutory Invention Registration; Reg. No. H568; Jan. 3, 1989; pp. 1-8.

* cited by examiner

DMTModulus                    4.0 μm

DMTModulus                    2.0 μm

DMTModulus 2.0μm

PROPYLENE POLYMER-BASED COMPOSITE FILM, PREPARATION METHOD THEREFOR, AND APPLICATION THEREOF

TECHNICAL FIELD

The present invention relates to the field of a polymer film, in particular to a propylene polymer-based composite film, a preparation method therefor, and an application thereof, and a packaging material comprising the composite film.

BACKGROUND ART

A polypropylene film can usually be produced by the methods such as casting and biaxial stretching, but the polypropylene film prepared from homopolypropylene raw material usually has a relatively low impact strength. A polypropylene film is often used for packaging purpose, which requires the film to have a relatively high impact property. At the same time, for the visualization and aesthetic of the contents, it is also desirable for the film to have good optical properties.

In order to improve the impact property of the polypropylene film, impact polypropylene can be used to prepare the film, or a polyolefin elastomer can be added to polypropylene, but the film prepared by the above methods usually has a high haze and poor optical properties such as transparency. It is also possible to simultaneously add a nucleating agent to the film to reduce the haze of the film by refining the crystals in the film, but this method will lead to a decrease in impact property.

In order to improve the impact resistance and toughness of the film, a multi-layer co-extrusion method can also be used for film preparation, for example, CN101913279A adopts a three-layer co-extrusion method to prepare a composite film, wherein the layer in the film contains an elastomer and PP blended in the ratio of 1:10-1:3, and the elastomer provides a good impact resistance. However, this method has such problem as being difficult to obtain uniform dispersion in the case of high elastomer content, and the elastomer usually has a poor flow property, which will cause such problems as non-uniform film surface and great thickness difference along the machine direction (MD) and transverse direction (TD), then it is difficult to obtain a film with good optical properties. Moreover, there is certain restriction on the amount of elastomer added. That is because when the addition amount is up to a certain level, the problem of phase separation will occur, thereby limiting the further improvement of impact resistance. In addition, during the process of multi-layer co-extrusion, the elastomer will also lead to greatly different flow properties of the core and surface layers, thereby further aggravating the problem of non-uniform film surface, and possibly leading to non-uniform properties at various points of the film; different rheological properties of raw materials between layers will also affect the uniformity of the film, and will affect the optical and mechanical properties of the film.

It is difficult for the current propylene polymer-based film to have good optical properties and impact resistance at the same time. In addition, when a propylene polymer film is used in packaging applications, it is generally desirable to have a realtively good heat-sealing property at a relatively low heat-sealing temperature, and the propylene polymer film in the prior art cannot meet such property requirements. Furthermore, current composite films have poor uniformity in thickness and properties.

DISCLOSURE OF THE INVENTION

Summary of the Invention

In view of the prior art as described above, the object of the present invention is to provide a propylene polymer-based film having a low haze and a high impact resistance and a preparation method therefor. Such film can have good impact resistance and optical properties at the same time.

Another object of the present invention is to provide a film as described above, which may additionally have good mechanical properties (such as tensile property) and/or good heat-sealing strength at a relatively low heat-sealing temperature.

Another object of the present invention is to provide a propylene polymer-based, transparent, and impact resistant composite film, which has good impact resistance and optical properties at the same time and has good uniformity in film thickness and properties.

Another object of the present invention is to provide a method for the preparaption of the composite film, which has a stable preparation process and good uniformity of the obtained film.

According to the present invention, it has been found that by using a propylene impact copolymer comprising a specific elastic part as raw material in at least one layer of a composite film and by extrusion casting, a composite film comprising a specific microstructure with uniformly dispersed strip-like rubber phases could be prepared, thereby achieving said object.

Thus according to a first aspect, the present invention provides a propylene polymer-based composite film, at least comprising two different layers: layer a and layer b;

wherein layer a and layer b each comprise at least one propylene polymer; and at least one layer of layer a and layer b comprises a propylene impact copolymer;

wherein the propylene impact copolymer comprises an elastic part, which forms dispersed strip-like rubber phases in the composite film.

According to a second aspect, the present invention provides a method for the preparation of the composite film of the present invention, comprising extrusion casting a raw material composition for forming each layer to form the composite film.

According to a third aspect, the present invention provides use of the composite film of the present invention in the sector of packaging materials.

According to a fourth aspect, the present invention provides a packaging material comprising the composite film of the present invention.

Other aspects and beneficial effects of the present invention will become apparent from the following parts of Detailed Description of the Invention and Examples in conjunction with the Drawings.

DESCRIPTION OF FIGURES

Exemplary embodiments of the present invention will be described in more details in conjunction with the Drawings.

Figure 1A:
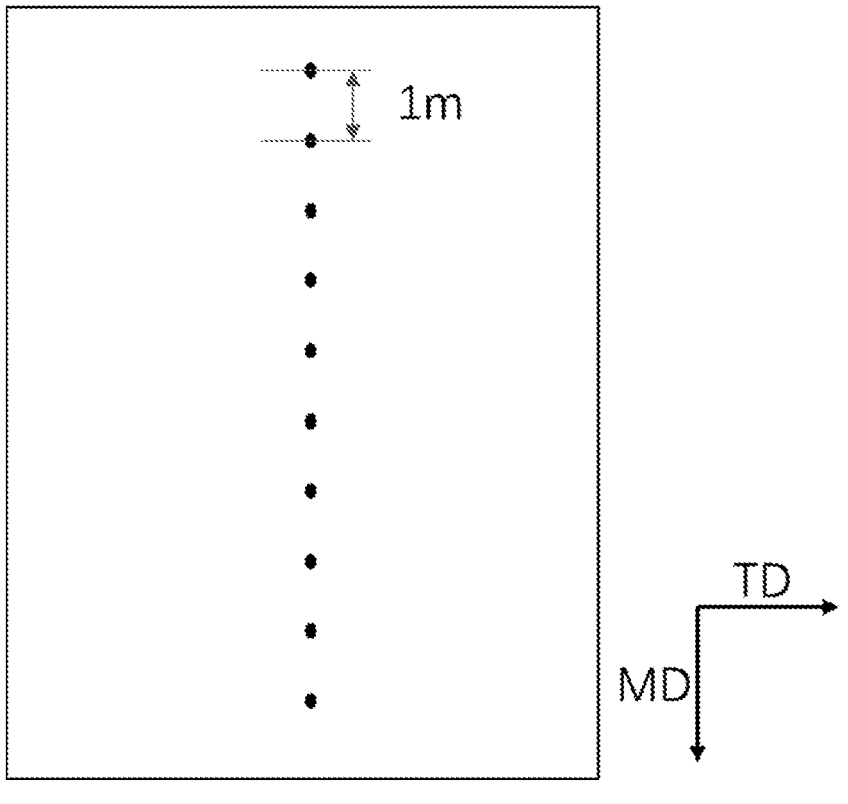
FIG. 1a and FIG. 1b are schematic diagrams for the selection of sampling points for the film of the present invention.

DETAILED DESCRIPTION OF THE
INVENTION

According to a first aspect, the present invention provides a propylene polymer-based composite film, at least comprising two different layers: layer a and layer b;

wherein layer a and layer b each comprise at least one propylene polymer; and at least one layer of layer a and layer b comprises a propylene impact copolymer;

wherein the propylene impact copolymer comprises an elastic part, which forms dispersed strip-like rubber phases in the composite film.

The term "disperse" as used herein means that the rubber phase is not continuously distributed in the composite film. Rubber phase can be seen by observing the cross section of the composite film cut along the transverse direction (TD) via an atomic force microscope (AFM), as shown by the black parts in FIGS. 3, 5 and 7, where the rubber phase is uniformly dispersed in the form of multiple strips in the film matrix.

Herein, the term "strip" refers to a shape having an aspect ratio generally greater than 2. Herein, aspect ratio refers to the ratio of the longitudinal axis to the transverse axis of an object. The longitudinal axis refers to the longest dimension of the object (herein the rubber phase), i.e., the distance between the two furthest points on the contour of the object. The transverse axis refers to the length between the intersection points of the straight line with the longest distance between the intersection points intersecting the contour of the object among the straight lines perpendicular to the longitudinal axis.

In the composite film of the present invention, the average size of the transverse axis of the rubber phase may be 20-200 nm, more preferably 20-150 nm. The average value of the aspect ratio of the rubber phase may be 5-20, preferably 5-15.

The size of the transverse axis and the aspect ratio are measured by observing the cross-section of the composite film cut along the transverse direction (TD) via an atomic force microscope. Based on the 200 sampling points, the average value of the sizes of the transverse axis of the rubber phase is calculated as the average size of the transverse axis of the rubber phase, and the average value of the aspect ratios of the rubber phase is calculated as the average value of the aspect ratio of the rubber phase.

Machine direction (MD) refers to the machine processing direction. Transverse direction (TD) refers to the direction perpendicular to the machine processing direction.

In the composite film of the present invention, said rubber phases are advantageously arranged parallel to each other.

Herein, the term "parallel arrangement" means that the transverse cross sections of the rubber phases are arranged parallel to each other along a certain direction. A small amount of rubber phase particles arranged in different directions in local areas that are inconsistent with the overall arrangement direction of the rubber phase particles in the entire composite film due to the preparation process, and the rubber phase particles that cannot be clearly observed due to the preparation process or AFM method are excluded here.

Herein, "parallel arrangement" includes the substantially parallel situation. The transverse cross sections of the rubber phase have an angle no greater than about 10 degrees with respect to each other, preferably less than about 5 degrees.

Layer a and layer b in the present invention both comprise at least one propylene polymer, and are both composed of a propylene polymer-based composition, but they differ in the specific constitution and/or thickness. The whole composite film is a composite film based on propylene polymer, which can also be named as polypropylene composite film.

In the present invention, layer a is intended to be used as the core layer of the composite film, i.e., a layer that is relatively far away from the medium, that the composite film is to be in contact with, during use of the composite film. Layer b is intended to be used as the surface layer of the composite film, i.e., a layer close to the medium, that the composite film is to be in contact with, during use of the composite film, wherein the medium is for example an electrolyte that a battery packaging material is in contact with.

According to the present invention, at least one layer of layer a and layer b comprises said propylene impact copolymer having a specific elastic part, so that the entire composite film comprises a specific dispersed rubber phase.

The elastic part may appear as a spherical or nearly spherical rubber phase in a scanning electron micrograph of an impact specimen of the propylene impact copolymer.

The propylene impact copolymer is preferably a propylene impact copolymer comprising ethylene units, wherein the elastic part is a copolymerized part comprising ethylene units, preferably selected from the group consisting of ethylene-propylene copolymerized part and ethylene-butylene copolymerized part.

Preferably, said propylene impact copolymer comprises propylene homopolymerized part and said ethylene unit-containing copolymerized part. The propylene homopolymerized part may comprise an isotactic polymerized structure.

The content of the ethylene unit-containing copolymerized part in the propylene impact copolymer is preferably 3-15% by weight, more preferably 7-12% by weight, as determined by $^{13}$C NMR.

The content of the ethylene units of the propylene impact copolymer is preferably 1-14 w % by weight, preferably 3-12% by weight, based on the total weight of the propylene impact copolymer. In the room temperature xylene solubles of the propylene impact copolymer, the content of the ethylene units is preferably not more than 40% by weight. The content of ethylene unit sequences [EEE] is preferably not more than 20% by weight, as determined by $^{13}$C NMR.

The propylene impact copolymer may have a block structure or comprise a propylene block copolymer.

The melt flow rate (MFR) of the propylene impact copolymer at 230° C. under a load of 2.16 kg can be 1-10 g/10 min, preferably 1-8 g/10 min, as determined according to the standard GB/T 3682-2000, wherein the determination temperature is 230° C. and the load is 2.16 kg.

Usable propylene impact copolymers are commercially available, such as the propylene impact copolymer from SINOPEC SABIC Petrochemical Co. with the trade name EP200K, the propylene impact copolymers from Shanghai Petrochemical Co. with the trade names F200R and M180R, the propylene impact copolymer from Maoming Petrochemical Co. with the trade name PPB-M02D, and the propylene impact copolymer from Korean Hyosung with the trade name J410F.

The propylene impact copolymer can also be prepared by continuous polymerization in the presence of a Ziegler-Natta catalyst having a high stereoselectivity. The continuous polymerization method means that the preparation process comprises at least two steps carried out in sequence, wherein the elastic part and the non-elastic part are each prepared in a separate step, and, except for the first step, a latter step is conducted in the presence of the polymer formed in the previous one step and the catalyst used in the previous one step.

Layer a may comprise a homopolypropylene and/or a propylene random copolymer.

The melt flow rate of the homopolypropylene at 230° C. under a load of 2.16 kg is preferably 2-15 g/10 min, as determined according to the standard GB/T 3682-2000, wherein the determination temperature is 230° C. and the load is 2.16 kg. The homopolypropylene preferably has an isotacticity greater than 97%, as determined by $^{13}$C NMR. The homopolypropylene preferably has a molecular weight distribution Mw/Mn of 4.5 to 7.0, as determined by gel permeation chromatography (GPC). Usable homopolypropylenes are commercially available, such as the homopolypropylene from Qingdao Refining & Chemical Co. with the trade name PPH-FA03, the homopolypropylene from Zhongyuan Petrochemical Co. with the trade name PPH-FA03, and the homopolypropylene from Shanghai Petrochemical Co. with the trade name FC801; or they can be prepared by a conventional method in the art.

The propylene random copolymer can be a copolymer of propylene and ethylene and/or butene, such as ethylene-propylene-butene ternary random copolymer, propylene-ethylene binary random copolymer, and propylene-butene binary random copolymer. The melt flow rate of the random propylene copolymer at 230° C. under a load of 2.16 kg can be 2-15 g/10 min, preferably 2-10 g/10 min, as determined according to the standard GB/T 3682-2000. The random copolymer preferably has a molecular weight distribution Mw/Mn of 4.5 to 7.0, as determined by GPC. Usable propylene random polymers are commercially available, for example, the random propylene copolymer from Yanshan Petrochemical Co. with the trade name F5006, and the random propylene copolymer from Shanghai Petrochemical Co. with the trade name F500EPS, F800EDF or F800EPS; or they can be prepared by a conventional method in the art.

Layer b may comprise a propylene random copolymer. The propylene random copolymer is as described above. The propylene random copolymer in layer b and that in layer a may be the same or different. For example, layer b may comprise 60-100% by weight of a propylene random copolymer.

In a preferred embodiment, at least one layer of layer a and layer b may comprise a polyolefin elastomer, to thereby advantageously further improve the impact resistance of the composite film.

The polyolefin elastomer may be an elastomer copolymer of ethylene and alpha olefin. The alpha olefin is preferably a $C_3$-$C_{12}$ alpha olefin, more preferably at least one selected from the group consisting of propylene, 1-butene, 1-hexene and 1-octene. Usable polyolefin elastomers are commercially available, for example, the polyolefin elastomer from the company Dow with the trade name 8200, the polyolefin elastomer from the company Dow with the trade name 8411, the polyolefin elastomer from the company Mitsui with the trade name DF640 or DF840, and the polyolefin elastomer from the company Exxon with the trade name 6102, VM3980 or EXACT3139; or they can be prepared by a conventional method in the art.

When a polyolefin elastomer is used in the composite film, the elastic part in the propylene impact copolymer and the polyolefin elastomer form a dispersed rubber phase in the composite film, which are also in the form of strips which are arranged parallel to each other. The average size of the transverse axis of such a rubber phase may also be 20-200 nm, preferably 20-150 nm. The average value of the aspect ratio of the rubber phase may be 5-20, preferably 5-15. Said sizes are determined by AFM as described above.

The presence of the polyolefin elastomer can advantageously make up for the possible problem of non-uniform distribution of the rubber phase in the propylene impact copolymer, thereby improving the uniformity of various points of the film in terms of impact property.

In a preferred embodiment, the polyolefin elastomer has a shear viscosity ratio $\eta_{160}/\eta_{640}$ of 1.2-3, preferably 1.7-2.3 at 230° C. and under shear rates of 160 s$^{-1}$ and 640 s$^{-1}$. The polyolefin elastomer has a shear viscosity $\eta_{640}$ of preferably 100-500 Pa·s, more preferably 140-400 Pa·s at 230° C. and under a shear rate of 640 s$^{-1}$. The shear viscosities $\eta_{160}$ and $\eta_{640}$ are determined with a capillary rheometer according to ISO11443:2014.

The melt flow rate of the material constituting layer a (a propylene polymer composition) at 230° C. under a load of 2.16 kg may be 2-10 g/10 min, preferably 2-8 g/10 min, more preferably 3-7 g/10 min, as determined according to the standard GB/T3682-2000, wherein the determination temperature is 230° C. and the load is 2.16 kg.

The melt flow rate of the material constituting layer b (a propylene polymer composition) at 230° C. under a load of 2.16 kg may be 2-10 g/10 min, preferably 3-10 g/10 min, more preferably 3-9 g/10 min, more preferably 4-8 g/10 min, as determined according to the standard GB/T3682-2000, wherein the determination temperature is 230° C. and the load is 2.16 kg.

Such a melt flow rate can advantageously make the film preparation process more stable, so that the film has better uniformity, mechanical properties and optical properties.

Both layer a and layer b may comprise said propylene impact copolymer, wherein the propylene impact copolymer in layer a and that in layer b may be the same or different. It is also possible that only one layer of layer a and layer b comprises said propylene impact copolymer.

Both layer a and layer b may also comprise said polyolefin elastomer, wherein the polyolefin elastomer in layer a and that in layer b may be the same or different. Preferably, the ratio of the weight proportion of the polyolefin elastomer in layer a to the weight proportion of the polyolefin elastomer in layer b is 6:1-1:6. It is also possible that only one layer of layer a and layer b comprises said polyolefin elastomer.

Both layer a and layer b may also comprise said propylene impact copolymer and said polyolefin elastomer, wherein the propylene impact copolymer in layer a and that in layer b may be the same or different, and the polyolefin elastomer in layer a and that in layer b may be the same or different.

It is also possible that only one layer of layer a and layer b comprises said propylene impact copolymer and one or two layers of layer a and layer b comprise said polyolefin elastomer; or that only one layer of layer a and layer b comprises said polyolefin elastomer and one or two layers of layer a and layer b comprise said propylene impact copolymer.

In one embodiment, layer a comprises said homopolypropylene, said propylene impact copolymer and said polyolefin elastomer, and layer b comprises said random propylene copolymer and said polyolefin elastomer.

In this embodiment, preferably, the ratio of the weight proportion of the polyolefin elastomer in layer a to the weight proportion of the polyolefin elastomer in layer b is 2:1-1:4, for example, it may be 1.5:1, 1:1, 1:1.5, 1:2, 1:2.5, 1:3, 1:3.5 and any value between them, more preferably 1:1-1:2. When carrying out co-extrusion of a bilayer or multi-layer film, the above ratio of the weight proportion of the polyolefin elastomer in layer a to the weight proportion of the polyolefin elastomer in layer b can further improve the impact resistance and optical properties of the composite film, and meanwhile can make the extrusion process more stable.

Specifically, in this embodiment, layer a may comprise 40-90% by weight, preferably 50-90% by weight, more preferably 55-75% by weight of said homopolypropylene, 5-40% by weight, preferably 10-30% by weight of said propylene impact copolymer and 2-30% by weight, preferably 5-20% by weight of said polyolefin elastomer, each based on the total weight of layer a. Layer b may comprise 40-95% by weight, preferably 60-95% by weight, more preferably 75-90% by weight of said random propylene copolymer, and 5-60% by weight, preferably 5-40% by weight, more preferably 10-25% by weight of said polyolefin elastomer, each based on the total weight of layer b.

A composite film comprising such a surface layer and a core layer may advantageously have not only excellent optical properties but also increased heat-sealing strength.

In such an embodiment, the thickness uniformity and property uniformity of the film can be greatly improved when both the polyolefin elastomer in layer a and that in layer b satisfy the following conditions: a shear viscosity ratio $\eta_{160}/\eta_{640}$ of 1.2-3, preferably 1.7-2.3 at 230° C. and under shear rates of 160 s$^{-1}$ and 640 s$^{-1}$, and a shear viscosity $\eta_{640}$ of 100-500 Pa·s, preferably 140-400 Pa·s at 230° C. and under a shear rate of 640 s$^{-1}$.

In addition, preferably, the difference in shear viscosity $(\eta A_{160}-\eta B_{160})$ at 230° C. and under a shear rate of 160 s$^{-1}$ of the propylene polymer composition constituting layer a and the propylene polymer composition constituting layer b and the difference in shear viscosity $(\eta A_{640}-\eta B_{640})$ at 230° C. and under a shear rate of 640 s$^{-1}$ are both controlled at ≥0, and the ratio of the two $(\eta A_{160}-\eta B_{160})/(\eta A_{640}-\eta B_{640})$ is 1-2.6, preferably 1.4-2.5, more preferably 1.5-2.2, so that the uniformity of the film in thickness and properties can be further improved by adjusting the matching degree of raw materials of various layers in fluidity.

In another embodiment, layer a comprises a propylene polymer and said polyolefin elastomer and layer b comprises said random propylene copolymer, said polyolefin elastomer and said propylene impact copolymer. The propylene polymer in layer a may be selected from homopolypropylene and/or said propylene impact copolymer. For example, layer a may comprise 70-100% by weight of a propylene polymer.

In this embodiment, preferably, the ratio of the weight proportion of the polyolefin elastomer in layer a to the weight proportion of the polyolefin elastomer in layer b is 10:1-1:6, preferably 6:1-1:4, more preferably 4:1-1:4, such as 3.5:1, 3:1, 2.5:1, 2:1, 1.5:1, 1:1, 1:1.5, 1:2, 1:2.5, 1:3, 1:3.5 and any value between them. When carrying out co-extrusion of a bilayer or multi-layer film, the above ratio of the weight proportion of the polyolefin elastomer in layer a to the weight proportion of the polyolefin elastomer in layer b can further improve the impact resistance and optical properties of the composite film, and meanwhile can make the extrusion process more stable.

Specifically, in such an embodiment, layer a may comprise 50-95% by weight, preferably 70-95% by weight, more preferably 80-95% by weight of said propylene polymer and 5-50% by weight, preferably 5-30% by weight, more preferably 5-20% by weight of said polyolefin elastomer, each based on the total weight of layer a; layer b may comprise 40-90% by weight, preferably 50-90% by weight, more preferably 60-85% by weight of said random propylene copolymer, 5-40% by weight, preferably 5-30% by weight, more preferably 5-20% by weight of said polyolefin elastomer and 2-30% by weight, preferably 5-20% by weight of said propylene impact copolymer, each based on the total weight of layer b.

A composite film comprising such a surface layer and a core layer not only can have improved impact resistance and improved optical and mechanical properties, but also can effectively improve heat-sealing strength while reducing heat-sealing temperature due to the synergistic effect between the propylene impact copolymer comprising specific rubber phase and other components in the surface layer (heat-sealing layer).

In another embodiment, layer a comprises said polyolefin elastomer, said propylene impact copolymer and other type of a propylene polymer, wherein said other kinds of propylene polymers may be selected from said homopolypropylene and/or propylene random copolymer; and layer b comprises said random propylene copolymer and said polyolefin elastomer.

Specifically, in such an embodiment, layer a may comprise 40-90% by weight of propylene impact copolymer, 5-40% by weight of other kinds of propylene polymers and 2-30% by weight of polyolefin elastomer, preferably 55-75% by weight of propylene impact copolymer, 10-30% by weight of other kinds of propylene polymers and 5-20% by weight of polyolefin elastomer, each based on the total weight of layer a; layer b may comprise 40-95% by weight of propylene random copolymer and 5-60% by weight of polyolefin elastomer, preferably 75-90% by weight of propylene random copolymer and 10-25% by weight of polyolefin elastomer, each based on the total weight of layer b.

Such a composite film can simultaneously have good impact resistance, optical properties and tensile properties, and can have good heat-sealing strength at lower heat-sealing temperatures.

Herein, the sum of the weight percents of all components of each layer is 100% by weight.

Additives

Layer a and/or layer b may further comprise additives conventionally used in polymer films, for example, at least one selected from the group consisting of antioxidants, lubricants, halogen absorbers, light stabilizers, heat stabilizers, colorants, fillers, slipping agents, surface adhesives, electromagnetic shielding agents, flame retardants, insulating additives, anti-sticking agents, antistatic agents and the like.

For example, an antioxidant can be used to improve the oxidation resistance of the composite film during processing. The antioxidant can be various antioxidants commonly used in the art, for example, at least one selected from the group consisting of antioxidant 1076, antioxidant 1010, antioxidant 168, thioester antioxidants (such as DLTP, DSTP) and the like. The content of the antioxidant may be 0.1-0.8 parts by weight, preferably 0.2-0.4 parts by weight, based on 100 parts by weight of the total weight of the layer.

In order to improve other properties of the composite film or endow the composite film with other properties (such as friction, stability, color, antistatic property, strength, electrical conductivity, insulation, slipping property, sliding property, surface adhesion, electromagnetic shielding property, flame retardant property, anti-blocking effect, etc.), the composite film can further comprise other film additives conventionally used in this field, for example, at least one selected from the group consisting of lubricants, halogen absorbers, light stabilizers, heat stabilizers, colorants, fillers, slipping agents, surface adhesives, electromagnetic shielding agents, flame retardants, insulating additives, anti-blocking agents and antistatic agents. These film additives can be used in conventional amounts, for example, based on 100 parts by weight of the total weight of the layer, the respective content of other film additives can be 0.01-0.5 parts by weight, preferably 0.05-0.3 parts by weight, more preferably 0.05-0.15 parts by weight, unless otherwise specified.

For example, a lubricant can be added to the composite film. The lubricant may be a PEG lubricant and/or a monoglyceride lubricant. Based on 100 parts by weight of the total weight of the layer, the content of the lubricant may be 0.01-0.5 parts by weight, preferably 0.05-0.2 parts by weight.

Polar monomer-modified polypropylene can be added as a surface adhesive to the composite film of the present invention, thereby enhancing the bonding at the interface between the composite film and other material, and obtaining a high-adhesion high-impact propylene polymer composite film. Said polar monomer-modified polypropylene is particularly added to layer b.

In a preferred embodiment, based on the total weight of layer a, layer a may comprise 40-90% by weight, preferably 50-85% by weight of homopolypropylene, 5-45% by weight, preferably 10-30% by weight of propylene impact copolymer and 2-40% by weight, preferably 5-20% by weight of polyolefin elastomer; and based on the total weight of layer b, layer b comprises 40-99% by weight, preferably 70-90% by weight of propylene random copolymer, 0-30% by weight, preferably 5-15% by weight of polyolefin elastomer and 1-30% by weight, preferably 5-15% by weight of polar monomer-modified polypropylene.

In another preferred embodiment, based on the total weight of layer a, layer a may comprise 50-100% by weight, preferably 75-95% by weight of polypropylene and 0-50% by weight, preferably 5-25% by weight of polyolefin elastomer; and based on the total weight of layer b, layer b may comprise 30-90% by weight, preferably 60-85% by weight of propylene random copolymer, 5-40% by weight, preferably 5-20% by weight of polyolefin elastomer, 2.5-20% by weight, preferably 5-10% by weight of propylene impact copolymer and 2.5-20% by weight, preferably 5-10% by weight of polar monomer-modified polypropylene.

The polar monomer in the polar monomer-modified polypropylene may be at least one selected from the group consisting of hydroxyl group-containing comonomers, cyano group-containing comonomers and anhydride monomers. The hydroxyl group-containing comonomer is preferably a hydroxy acid and/or vinyl alcohol. The cyano group-containing comonomer is preferably cyanoacrylate. The anhydride monomer is preferably maleic anhydride and/or itaconic anhydride, more preferably maleic anhydride. Maleic anhydride grafted polypropylene (PP-g-MAH) has both polar groups and olefinic non-polar segments, and has the basic physical properties of original polypropylene, such as high crystallinity, high strength, high impact resistance, etc., as well as increased adhesion to other materials.

The polar monomer-modified polypropylene is commercially available, for example, the maleic anhydride-modified polypropylene from the company Mitsui with the trade name QF551A, the maleic anhydride-modified polypropylene from the company Bio-master with the trade name CMG9801, and the maleic anhydride-modified polypropylene from the company Exxon with the trade name PO1015.

A conductive filler can be further added to the composite film of the present invention, thereby improving the antistatic property of the composite film. The conductive filler is preferably added to layer b. Based on 100 parts by weight of the total weight of the matrix polymer in layer b, the conductive filler may be added in an amount of 0.1-10 parts by weight, preferably 0.5-4.5 parts by weight.

The conductive filler may be, for example, at least one selected from the group consisting of carbon blacks, graphites, carbon nanotubes, carbon fibers, conductive metal particles, conductive metal fibers and metal oxides. The carbon black conductive filler includes, but is not limited to, at least one selected from the group consisting of acetylene carbon black, superconducting carbon black, and extra conducting carbon black. The graphite conductive filler includes, but is not limited to, at least one selected from the group consisting of natural graphite, expandable graphite, expanded graphite and graphene. The carbon nanotube conductive filler includes, but is not limited to, non-surface-modified or surface-modified single-walled carbon nanotubes and/or multi-walled carbon nanotubes. The conductive metal in the conductive metal particles and the conductive metal fibers may each independently be at least one selected from the group consisting of silver, aluminum, copper, iron, nickel and stainless steel. The conductive metal-coated filler may be at least one selected from the group consisting of lead-plated, nickel-plated, silver-plated glass spheres, glass fibers and mica flakes. The metal oxide includes, but is not limited to, at least one selected from the group consisting of titanium oxide, zinc oxide, tin oxide, indium oxide and cadmium oxide. Antistatic propylene polymer film can be prepared by adding a conductive filler, and its surface resistivity can be 102-10802, preferably 102-1040, as determined by Keithley 6517B Electrometer. The antistatic property of the film is durable and less affected by ambient humidity.

In addition, an electromagnetic shielding agent can be added to the composite film to prepare an electromagnetic shielding film. The electromagnetic shielding agent is preferably added to layer b. The electromagnetic shielding agent may be a conductive metal filler and/or carbon material. The conductive metal filler is preferably conductive metal particles and/or conductive metal fibers. The metal in the conductive metal particles and the conductive metal fibers may each independently be one or more selected from the group consisting of silver, aluminum, copper, iron, nickel and stainless steel. The carbon material is preferably one or more of carbon black, graphite, graphene and carbon nanotube. The addition amount of the electromagnetic shielding agent may be 5-30 parts by weight, preferably 15-25 parts by weight, based on 100 parts by weight of the weight of the matrix polymer in layer b. The electromagnetic shielding efficiency of the obtained composite film can reach $\geq$25 dB, preferably $\geq$28 dB, as determined by a flange coaxial testing equipment according to standard SJ20524, wherein the electromagnetic wave band is in the frequency range of 50 MHz to 1 GHz.

The electromagnetic shielding agent can also be used in combination with a coupling agent. The coupling agent can improve the compatibility between the matrix polymer component (resin component) of the propylene polymer composition and the electromagnetic shielding agent, and its type, usage and amount can all be conventional selections in the art, for example, the coupling agent can be selected from titanate coupling agents, which can be one or more selected from the group consisting of monoalkoxy titanate, monoalkyl pyrophosphate titanate, coordination titanate and chelate titanate; preferably, the titanate coupling agent is selected from tetrabutyl titanate and/or tetraisopropyl titanate. Based on 100 parts by weight of the total weight of the matrix polymer component, the content of the coupling agent may be 1-6 parts by weight, preferably 4-6 parts by weight.

A flame retardant may further be added to the composite film to improve the flame retardant property. For example, it can be added to layers a and/or b, and it can also be added to an additional layer c, in which case layer c is a flame-retardant functional layer. For example, the layer c may comprise 30-80% by weight, preferably 40-70% by weight of a propylene polymer and 20-70% by weight, preferably 30-60% by weight of a flame retardant, based on the total weight of layer c. This can achieve an oxygen index $\geq$21%, preferably an oxygen index $\geq$23%, as determined according to the method specified in GB/T 2406-2008.

The flame retardant may be at least one selected from the group consisting of metallic or non-metallic hydroxides and/or oxide hydrates, phosphorus flame retardants, boron flame retardants, antimony flame retardants and intumescent flame retardants. The metallic or non-metallic hydroxide and/or oxide hydrate can be at least one selected from the group consisting of hydroxides of aluminum, magnesium, boron and zinc and layered double metal hydroxides; the phosphorus flame retardant can be at least one selected from the group consisting of red phosphorus, phosphate salts, polyphosphate salts and phosphoric acid esters; the boron flame retardant can be boric acid and/or borate salt, and the borate salt is preferably ammonium borate and/or zinc borate; the antimony flame retardant can be at least one selected from the group consisting of antimony trioxide, antimony pentoxide and sodium antimonate; the intumescent flame retardant is at least two selected from the group consisting of sulfuric acid, pentaerythritol or its dimer or trimer, butantetraol, cyclohexane-hexaol, sorbitol, glucose, maltose, starch, resorcinol, ammonium polyphosphate, dicyandiamide, melamine, urea, melamine, glycine, expandable graphite and carbon nanotubes. In one embodiment, the flame retardant is an intumescent flame retardant, preferably a mixture of ammonium polyphosphate and pentaerythritol, specifically, the weight ratio of ammonium polyphosphate to pentaerythritol is 0.5-5:1. In another embodiment, the flame retardant is a mixture of magnesium hydroxide and aluminum hydroxide, specifically, the weight ratio of magnesium hydroxide to aluminum hydroxide is 0.5-2:1. The flame retardant polypropylene film prepared by adding a flame retardant has the advantages of easy processing and good properties and the like.

In order to endow the composite film with a colored appearance, a colorant may be added to the composite film. The colorant can be a conventional selection in the art, including but not limited to at least one of azo pigments, phthalocyanine pigments, heterocyclic pigments, lake pigments, dyes, fluorescent whitening agents and fluorescent pigments. All of the above colorants are commercially available. The colorant is preferably added to layer a. Based on 100 parts by weight of the matrix polymer in layer a, the content of the colorant can be 0.1-1 parts by weight, preferably 0.3-0.8 parts by weight. Layer a may also comprise a dispersant. The dispersant can improve the processability and uniformity between the matrix polymer component and the colorant of the layer a, and its type, usage and amount can all be conventional selections in the art. For example, the dispersant can be a low molecular weight polyethylene wax, and the weight content of the dispersant can be 20-30% by weight of the colorant.

A slipping agent may further be added to the composite film of the present invention. The slipping agent can be an amide slipping agent, preferably at least one of erucamide, oleamide, stearamide, behenamide, stearyl erucamide and ethylene bisstearamide.

Alternatively, the slipping agent may be a mixture of an amide slipping agent and a migration-resistant slipping agent, wherein the amide slipping agent is preferably at least one of erucamide, oleamide, stearamide, behenamide, stearyl erucamide and ethylene bisstearamide. The migration-resistant slipping agent is preferably at least one of polytetrafluoroethylene microparticles, polyimide microparticles, polyamide microparticles, polycarbonate microparticles, silicone, nano-calcium carbonate, mica and nano-silica. Preferably, the weight ratio of the amide slipping agent to the migration-resistant slipping agent is 1:20-1:1, preferably 1:10-1:2. The particle size of the migration-resistant slipping agent comprised in the slipping agent may be in the range of 0.1-5 µm, preferably 0.3-2 µm.

The slipping agent can be added to layer a and/or layer b and it can be added in an amount of 0.01-1.5% by weight, preferably 0.08-0.6% by weight, based on the total weight of the respective layer.

Preferably, the slipping agent is added to both layer a and layer b.

Preferably, the molecular weight of the amide slipping agent in the slipping agent in layer b is not less than the molecular weight of the amide slipping agent in the slipping agent in layer a.

Particularly preferably, an amide slipping agent is added to layer a, and a mixture of an amide slipping agent and a migration-resistant slipping agent is added to layer b.

By the means of adding a composite slipping agent to the surface layer, the initial slipping property of the film is improved, and the migration-resistant slipping agent part in the composite slipping agent can provide part of the slipping property without the need for a precipitation process, and by regulating the particle size range, it can be guaranteed that the heat-sealing property and optical properties of the film will not change. In addition, the amide slipping agent in the surface layer can also provide a certain slipping property, further reduce the friction coefficient of the film, and improve the initial slipping property of the film. On the other hand, the use of the composite slipping agent and the matching between the slipping agents at the inner and surface layers provide good high-temperature slipping property and heat-sealing property retention.

The obtained composite film may have a surface friction coefficient of <0.3, preferably ≤0.23; and after heating at 60° C. for 24 hours, the change of the surface friction coefficient of the film is ≤0.02, preferably the change of the surface friction coefficient of the film is ≤0.01.

In addition, an insulating additive can be added to the composite film of the present invention, so that the electrical insulation property of the propylene polymer composite film can be improved. Preferably, grafted propylene polymer can be used as the insulating additive.

A grafted propylene polymer may be added to layer a and/or layer b. The grafted propylene polymer may be added in an amount of 5-45% by weight, based on the total weight of the respective layer.

In a preferred embodiment, based on the total weight of layer a, layer a comprises 50-90% by weight, preferably 55-75% by weight of a homopolypropylene, 5-45% by weight, preferably 10-30% by weight of a grafted propylene polymer and 2-40% by weight, preferably 5-20% by weight of a polyolefin elastomer; and based on the total weight of layer b, layer b comprises 40-100% by weight, preferably 70-90% by weight of a propylene random copolymer and 0-60% by weight, preferably 10-30% by weight of a polyolefin elastomer.

In another embodiment, based on the total weight of layer a, layer a comprises 50-100% by weight, preferably 75-95% by weight of a propylene polymer and 0-50% by weight, preferably 5-25% by weight of a polyolefin elastomer; and based on the total weight of layer b, layer b comprises 50-90% by weight, 60-85% by weight of a propylene random copolymer, 5-40% by weight, preferably 5-20% by weight of a polyolefin elastomer and 2-40% by weight, preferably 5-20% by weight of a grafted propylene polymer.

The grafted propylene polymer may comprise structural units derived from copolypropylene and structural units derived from grafting monomers and grafted thereon.

The grafting monomers may be selected from the group consisting of acrylates; acrylics; styrenes; alkenyl-containing silanes; alkenyl-containing heterocyclic monomers; and combinations of anhydrides having at least one olefinic unsaturation and alkenyl-containing polymerizing monomers.

The grafted propylene polymer may have a melt flow rate at 230° C. under a load of 2.16 kg of 0.01-30 g/10 min, preferably 0.05-20 g/10 min, further preferably 0.1-10 g/10 min, more preferably 0.2-8 g/10 min.

The copolypropylene may be a propylene copolymer comprising ethylene or a higher α-olefin or a mixture thereof. Specifically, the comonomer of the copolypropylene is at least one selected from the group consisting of ethylene and $C_4$-$C_8$ α-olefins. The $C_4$-$C_8$ α-olefin includes but is not limited to: at least one of 1-butene, 1-pentene, 4-methyl-1-pentene, 1-hexene, 1-heptene and 1-octene. The comonomer is preferably ethylene and/or 1-butene, further preferably, the copolypropylene consists of propylene and ethylene.

In addition to the above compositional features, the copolypropylene has at least one of the following features: a comonomer content of 0.5-30 mol %, preferably 4-25 mol %; a xylene solubles content of 2-80% by weight, preferably 18-75% by weight, further preferably 30-70% by weight; a comonomer content in the solubles of 10-70% by weight, preferably 10-50% by weight, further preferably 20-35% by weight; an intrinsic viscosity ratio of the solubles to polypropylene of 0.3-5, preferably 0.5-3, more preferably 0.8-1.3; a melt flow rate at 230° C. under a load of 2.16 kg of 0.01-60 g/10 min, preferably 0.05-35 g/10 min, further preferably 0.5-15 g/10 min; a melting temperature (Tm) of above 100° C., preferably 110-180° C., further preferably 120-170° C.; and a weight average molecular weight of $20 \times 10^4$-$60 \times 10^4$ g/mol.

The copolypropylene can be any suitable commercially available polypropylene powder, and can also be produced by a common polymerization process recorded in literatures. For example, it can be prepared with reference to the processes as described in CN101679557A and CN101058654A.

In one embodiment, the grafted propylene polymer may comprise structural units derived from copolypropylene and structural units derived from acrylate monomers and optionally acrylic monomers and grafted thereon. Based on the weight of the grafted propylene polymer, the content of grafted-on structural units derived from acrylate monomers and optional acrylic monomers can be 0.3-7% by weight, preferably 0.8-5% by weight. In the grafted propylene polymer, the molar ratio of the structural units derived from acrylate monomers to the structural units derived from acrylic monomers may be 1:0-2, preferably 1:0.125-1.

The acrylate monomer as the graft monomer can be any monomeric acrylate compound capable of free radical polymerization, and can be at least one selected from the monomers having the structure shown by formula I;

$$\text{Formula I}$$

wherein $R_1$, $R_2$ and $R_3$ are each independently selected from H, $C_1$-$C_6$ straight-chain alkyls, and $C_3$-$C_6$ branched alkyls; $R_4$ is selected from the following substituted or unsubstituted groups: $C_1$-$C_{20}$ straight-chain alkyls, $C_3$-$C_{20}$ branched alkyls, $C_3$-$C_{12}$ cycloalkyls, $C_3$-$C_{12}$ alkylene oxide group, and $C_3$-$C_{12}$ alkylene oxide alkyls, the substitutent is at least one selected from halogen, amino and hydroxyl.

Preferably, the acrylate monomer is at least one selected from the group consisting of methyl (meth)acrylate, sec-butyl (meth)acrylate, ethyl (meth)acrylate, n-butyl (meth)acrylate, isobutyl (meth)acrylate, tert-butyl (meth)acrylate, isooctyl (meth)acrylate, lauryl (meth)acrylate, cocooleate (meth)acrylate, octadecyl (meth)acrylate, dimethylaminoethyl (meth)acrylate, diethylaminoethyl (meth)acrylate, dimethylaminopropyl (meth)acrylate and glycidyl (meth) acrylate.

The acrylic monomer can be any monomeric acrylic compound capable of free radical polymerization, and can be at least one selected from the monomers having the structure shown by formula II;

$$\text{Formula II}$$

in formula II, $R^1$, $R^2$ and $R^3$ are each independently selected from H, $C_1$-$C_6$ straight-chain alkyls, and $C_3$-$C_6$ branched alkyls.

Preferably, the acrylic monomer is at least one selected from the group consisting of acrylic acid, methacrylic acid and 2-ethyl acrylic acid.

The $C_3$-$C_{12}$ alkylene oxide alkyl in the present invention refers to an alkylene oxide group-substituted alkyl group having 3-12 carbon atoms, for example, oxiranylmethyl.

In the present invention, the structural units derived from acrylic monomers may be absent, and may also be present together with structural units derived from acrylate mono-mers. Preferably, the molar ratio of the structural units derived from acrylate monomers to the structural units derived from acrylic monomers is 1:0-2, preferably 1:0.125-1.

The ratio of the total mass of the acrylate monomers and the optional acrylic monomers to the mass of the copoly-propylene is 0.1-10:100, preferably 0.5-8:100, further preferably 0.8-7:100. The molar ratio of the acrylate monomers to the acrylic monomers is 1:0-2, preferably 1:0.125-1.

In another embodiment, the grafted propylene polymer may comprise structural units derived from copolypropylene and structural units derived from styrene monomers. Based on the weight of the grafted propylene polymer, the content of the grafted-on structural units derived from styrene mono-mers in the grafted propylene polymer may be 0.5-14% by weight, preferably 1-7.5% by weight, more preferably 1.5-5% by weight.

The styrene monomer as the graft monomer can be any monomeric styrene compound capable of free radical polymerization, and can be at least one selected from the group consisting of monomers having the structure shown by formula III, monomers having the structure shown by formula IV and monomers having the structure shown by formula V;

Formula III in formula III, $R^1$, $R^2$ and $R^3$ are each independently selected from H, and substituted or unsubstituted $C_1$-$C_6$ alkyl; $R^4$-$R^8$ are each independently selected from H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, and substituted or unsubstituted $C_1$-$C_{12}$ amine group, the substitutent is selected from halogen, hydroxyl, amino, phos-phoric acid group, sulfonic acid group, $C_1$-$C_{12}$ alkyl, $C_3$-$C_{12}$ cycloalkyl, $C_1$-$C_{12}$ alkoxy group, $C_1$-$C_{12}$ ester group, and $C_1$-$C_{12}$ amine group; preferably, $R^1$, $R^2$ and $R^3$ are each independently selected from H, and substituted or unsubsti-tuted $C_1$-$C_3$ alkyl, $R^4$-$R^8$ are each independently selected from H, halogen, hydroxyl, amino, substituted or unsubsti-tuted $C_1$-$C_6$ alkyl, and substituted or unsubstituted $C_1$-$C_6$ alkoxy;

Formula IV in formula IV, $R_1$, $R_2$ and $R_3$ are each independently selected from H, and substituted or unsubstituted $C_1$-$C_6$ alkyl; $R_4$-$R_{10}$ are each independently selected from H, halogen, hydroxyl, amino, phosphoric acid group, sulfonic acid group, substi-tuted or unsubstituted $C_1$-$C_{12}$ alkyl, substituted or unsubsti-tuted $C_3$-$C_{12}$ cycloalkyl, substituted or unsubstituted $C_1$-$C_{12}$ alkoxy, substituted or unsubstituted $C_1$-$C_{12}$ ester group, and substituted or unsubstituted $C_1$-$C_{12}$ amine group, the sub-stitutent is selected from halogen, hydroxyl, amino, phos-phoric acid group, sulfonic acid group, $C_1$-$C_{12}$ alkyl, $C_3$-$C_{12}$ cycloalkyl, $C_1$-$C_{12}$ alkoxy group, $C_1$-$C_{12}$ ester group, and $C_1$-$C_{12}$ amine group; preferably, $R_1$, $R_2$ and $R_3$ are each independently selected from H, and substituted or unsubsti-tuted $C_1$-$C_3$ alkyl, $R_4$-$R_{10}$ are each independently selected from H, halogen, hydroxyl, amino, substituted or unsubsti-tuted $C_1$-$C_6$ alkyl, and substituted or unsubstituted $C_1$-$C_6$ alkoxy, the substitutent is selected from halogen, hydroxyl, amino, $C_1$-$C_6$ alkyl, and $C_1$-$C_6$ alkoxy;

Formula V in formula V, $R_1'$, $R_2'$ and $R_3'$ are each independently selected from H, and substituted or unsubstituted $C_1$-$C_6$ alkyl; $R_4'$-$R_{10}'$ are each independently selected from H, halogen, hydroxyl, amino, phosphoric acid group, sulfonic acid group, substituted or unsubstituted $C_1$-$C_{12}$ alkyl, sub-stituted or unsubstituted $C_3$-$C_{12}$ cycloalkyl, substituted or unsubstituted $C_1$-$C_{12}$ alkoxy, substituted or unsubstituted $C_1$-$C_{12}$ ester group, and substituted or unsubstituted $C_1$-$C_{12}$ amine group, the substitutent is selected from halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy group, $C_1$-$C_{12}$ ester group, and $C_1$-$C_{12}$ amine group; pref-erably, $R_1'$, $R_2'$ and $R_3'$ are each independently selected from H, and substituted or unsubstituted $C_1$-$C_3$ alkyl, $R_4'$-$R_{10}'$ are each independently selected from H, halogen, hydroxyl, amino, substituted or unsubstituted $C_1$-$C_6$ alkyl, and substi-tuted or unsubstituted $C_1$-$C_6$ alkoxy, the substitutent is selected from halogen, hydroxyl, amino, $C_1$-$C_6$ alkyl, and $C_1$-$C_6$ alkoxy.

Preferably, the styrene monomer can be at least one selected from the group consisting of styrene, α-methylsty-rene, 1-vinylnaphthalene, 2-vinylnaphthalene, monosubsti-tuted or polysubstituted styrene, monosubstituted or poly-substituted α-methylstyrene, monosubstituted or polysubstituted 1-vinylnaphthalene and monosubstituted or polysubstituted 2-vinylnaphthalene; the substitutent is preferably at least one selected from the group consisting of halogen, hydroxyl, amino, phosphoric acid group, sulfonic acid group, $C_1$-$C_8$ straight-chain alkyl, $C_3$-$C_8$ branched alkyl or cycloalkyl, $C_1$-$C_6$ straight-chain alkoxy, $C_3$-$C_8$ branched alkoxy or cyclic alkoxy, $C_1$-$C_8$ straight-chain ester group, $C_3$-$C_8$ branched ester group or cyclic ester group, $C_1$-$C_8$ straight-chain amine group and $C_3$-$C_8$ branched amine group or cyclic amine group.

More preferably, the styrene monomer is at least one selected from the group consisting of styrene, α-methylstyrene, 2-methylstyrene, 3-methylstyrene and 4-methylstyrene.

The mass ratio of the styrene monomer to the copolypropylene may be 0.5-16:100, preferably 1-12:100, further preferably 2-10:100.

In another embodiment, the grafted propylene polymer comprises structural units derived from copolypropylene and structural units derived from alkenyl-containing silane monomers. Based on the weight of the grafted propylene polymer, the content of the grafted-on structural units derived from alkenyl-containing silane monomers in the grafted propylene polymer b may be 0.2-6% by weight, preferably 0.2-2.5% by weight.

The alkenyl-containing silane monomer as the graft monomer can be any monomeric silane compound capable of free radical polymerization, and the alkenyl-containing silane monomer can be at least one selected from the monomers having the structure shown by formula VI, $$R_2 \!-\! \underset{\underset{R_4}{|}}{\overset{\overset{R_1}{|}}{Si}} \!-\! R_3 \qquad \text{Formula VI}$$

in formula VI, $R_1$ is $C_2$-$C_{12}$ alkenyl, preferably monounsaturated alkenyl; $R_2$, $R_3$ and $R^4$ are each independently selected from substituted or unsubstituted $C_1$-$C_{12}$ straight-chain alkyl, substituted or unsubstituted $C_3$-$C_{12}$ branched alkyl, substituted or unsubstituted $C_1$-$C_{12}$ alkoxy, and substituted or unsubstituted $C_1$-$C_{12}$ acyloxy; preferably, $R_1$ is $C_2$-$C_6$ alkenyl, preferably a monounsaturated alkenyl; $R_2$, $R_3$ and $R^4$ are each independently selected from substituted or unsubstituted $C_1$-$C_6$ straight-chain alkyl, substituted or unsubstituted $C_3$-$C_6$ branched alkyl, substituted or unsubstituted $C_1$-$C_6$ alkoxy, and substituted or unsubstituted $C_1$-$C_6$ acyloxy.

More preferably, the alkenyl-containing silane monomer is at least one selected from the group consisting of vinyltriethoxysilane, vinyltrimethoxysilane, vinyltriisopropoxysilane, vinyltri-tert-butoxysilane, vinyltriacetoxysilane, methylvinyldimethoxysilane, ethylvinyldiethoxysilane, allyltriethoxysilane, allyltrimethoxysilane, allyltriisopropoxysilane, vinyltris(β-methoxyethoxy)silane, allyltris(β-methoxyethoxy)silane, allyltri-tert-butoxysilane, allyltriacetoxysilane, methylallyldimethoxysilane and ethylallyldiethoxysilane.

The mass ratio of the alkenyl-containing silane monomer to the copolypropylene may be 0.5-12:100, preferably 0.8-9:100, further preferably 1-6:100.

In another embodiment, the grafted propylene polymer comprises structural units derived from copolypropylene, structural units derived from anhydride monomers, and structural units derived from alkenyl-containing polymerizing monomers. The alkenyl-containing polymerizing monomer may be at least one selected from the group consisting of vinyl acetate, styrene, α-methylstyrene, (meth)acrylate, vinyl alkyl ether, vinyl pyrrolidone, vinyl pyridine, vinyl imidazole and acrylonitrile. The anhydride is preferably selected from maleic anhydride and/or itaconic anhydride. The content of the grafted-on structural units derived from anhydride monomers and alkenyl-containing polymerizing monomers may be 0.1-5% by weight, preferably 0.4-3% by weight. The content of the grafted-on structural units derived from anhydride monomers may be 0.05-2% by weight, preferably 0.2-0.7% by weight. The molar ratio of the structural units derived from anhydride monomers to the structural units derived from alkenyl-containing polymerizing monomers may be 1:1-20, preferably 1:1-10. The alkenyl-containing polymerizing monomer as the graft monomer is preferably at least one selected from the monomers having the structure shown by Formula 1, $$R_1 \!-\! \underset{}{\overset{\overset{R_2}{|}}{C}} \!=\! \underset{}{\overset{\overset{R_3}{|}}{C}} \!-\! R_4 \qquad \text{Formula 1}$$

in formula 1, $R_1$, $R_2$ and $R_3$ are each independently selected from H, and substituted or unsubstituted alkyl; $R_4$ is selected from substituted or unsubstituted alkyl, substituted or unsubstituted alkoxy, substituted or unsubstituted aryl, substituted or unsubstituted ester group, substituted or unsubstituted carboxyl, substituted or unsubstituted cycloalkyl or heterocyclic group, and cyano group.

Preferably, $R_1$, $R_2$ and $R_3$ are each independently selected from H, and substituted or unsubstituted $C_1$-$C_6$ alkyl, more preferably, $R_1$, $R_2$ and $R_3$ are are each independently selected from H, and substituted or unsubstituted $C_1$-$C_3$ alkyl; $R_4$ is selected from substituted or unsubstituted $C_1$-$C_{20}$ alkyl, substituted or unsubstituted $C_1$-$C_{20}$ alkoxy, substituted or unsubstituted $C_6$-$C_{20}$ aryl, substituted or unsubstituted $C_1$-$C_{20}$ ester group, substituted or unsubstituted $C_1$-$C_{20}$ carboxylic acid group, substituted or unsubstituted $C_3$-$C_{20}$ cycloalkyl or heterocyclic group, and cyano group, the substituent is selected from halogen, hydroxyl, amino, $C_1$-$C_6$ alkyl, and $C_3$-$C_6$ cycloalkyl; preferably, $R_4$ is selected from substituted or unsubstituted $C_1$-$C_{12}$ alkyl, substituted or unsubstituted $C_1$-$C_{18}$ alkoxy, substituted or unsubstituted $C_6$-$C_{12}$ aryl, substituted or unsubstituted $C_1$-$C_{12}$ ester group, substituted or unsubstituted $C_1$-$C_{12}$ carboxylic acid group, substituted or unsubstituted $C_3$-$C_{12}$ cycloalkyl or heterocyclic group, and cyano group, the substitutent is selected from halogen, $C_1$-$C_6$ alkyl, and $C_3$-$C_6$ cycloalkyl; more preferably, $R_4$ is selected from substituted or unsubstituted $C_1$-$C_6$ alkyl, substituted or unsubstituted $C_1$-$C_{12}$ alkoxy, substituted or unsubstituted $C_6$-$C_8$ aryl, substituted or unsubstituted $C_1$-$C_6$ ester group, substituted or unsubstituted $C_1$-$C_6$ carboxylic acid group, substituted or unsubstituted $C_3$-$C_6$ cycloalkyl or heterocyclic group, and cyano group. Specifically preferably, the heterocyclic group is selected from imidazolyl, pyrazolyl, carbazolyl, pyrrolidinone group, pyridyl, piperidinyl, caprolactam group, pyrazinyl, thiazolyl, purinyl, morpholinyl, and oxazolinyl.

More preferably, $R_1$, $R_2$ and $R_3$ are each independently selected from H, and substituted or unsubstituted $C_1$-$C_6$ alkyl;

$R_4$ is selected from the group shown by formula 2, the group shown by formula 3, the group shown by formula 4, the group shown by formula 5, the combination of the group shown by formula 5 and the group shown by formula 6, and heterocyclic group;

Formula 2 in formula 2, $R^4$-$R^8$ are each independently selected from H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, and substituted or unsubstituted $C_1$-$C_{12}$ amine group, the substitutent is selected from halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, and $C_1$-$C_{12}$ amine group; preferably, $R^4$-$R^8$ are each independently selected from H, halogen, hydroxyl, amino, substituted or unsubstituted $C_1$-$C_6$ alkyl, and substituted or unsubstituted $C_1$-$C_6$ alkoxy;

Formula 3 in formula 3, $R_4$-$R_{10}$ are each independently selected from H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, and substituted or unsubstituted $C_1$-$C_{12}$ amine group, the substitutent is selected from halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, and $C_1$-$C_{12}$ amine group; preferably, $R_4$-$R_{10}$ are each independently selected from H, halogen, hydroxyl, amino, substituted or unsubstituted $C_1$-$C_6$ alkyl, and substituted or unsubstituted $C_1$-$C_6$ alkoxy, the substitutent is selected from halogen, hydroxyl, amino, $C_1$-$C_6$ alkyl, and $C_1$-$C_6$ alkoxy;

Formula 4 in formula 4, $R_4'$-$R_{10}'$ are each independently selected from H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxyl, substituted or unsubstituted $C_1$-$C_{12}$ ester group, and substituted or unsubstituted $C_1$-$C_{12}$ amine group, the substitutent is selected from halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, and $C_1$-$C_{12}$ amine group; preferably, $R_4'$-$R_{10}'$ are each independently selected from H, halogen, hydroxyl, amino, substituted or unsubstituted $C_1$-$C_6$ alkyl, and substituted or unsubstituted $C_1$-$C_6$ alkoxy, the substitutent is selected from halogen, hydroxyl, amino, $C_1$-$C_6$ alkyl, and $C_1$-$C_6$ alkoxy;

Formula 5

Formula 6 in formula 5, $R_m$ is selected from the following substituted or unsubstituted groups: $C_1$-$C_{20}$ straight-chain alkyl, $C_3$-$C_{20}$ branched alkyl, $C_3$-$C_{12}$ cycloalkyl, $C_3$-$C_{12}$ alkylene oxide group, and $C_3$-$C_{12}$ alkylene oxide alkyl, the substitutent is at least one selected from halogen, amino and hydroxyl.

Further preferably, the alkenyl-containing polymerizing monomer is at least one selected from the group consisting of vinyl acetate, styrene, α-methylstyrene, (meth)acrylate, vinyl alkyl ether, vinylpyrrolidone, vinylpyridine, vinylimidazole and acrylonitrile; the (meth)acrylate is preferably at least one selected from the group consisting of methyl (meth)acrylate, ethyl (meth)acrylate and glycidyl (meth) acrylate. Preferably, the alkenyl-containing polymerizing monomer is selected from the group consisting of vinyl acetate, styrene, and α-methylstyrene. Further preferably, the alkenyl-containing polymerizing monomer is styrene.

The molar ratio of the structural units derived from (maleic) anhydride monomers to the structural units derived from alkenyl-containing polymerizing monomers in the anhydride group-containing grafted propylene polymer can be 1:1-20, preferably 1:1-10.

The anhydride may be selected from anhydrides having at least one olefinic unsaturation; more preferably, the anhydride is selected from maleic anhydride and/or itaconic anhydride; further preferably, the anhydride is maleic anhydride.

The ratio of the total mass of the anhydride monomers and the alkenyl-containing polymerizing monomers to the mass of the copolypropylene can be 0.1-8:100, preferably 0.3-5:100. The mass amount of the anhydride monomers can be 5-100% by weight, preferably 10-100% by weight of the mass amount of the alkenyl-containing polymerizing monomers.

In another embodiment, the grafted propylene polymer comprises structural units derived from copolypropylene and structural units derived from alkenyl-containing heterocyclic monomers. Based on the weight of the grafted propylene polymer, the content of the grafted-on structural units derived from alkenyl-containing heterocyclic monomers may be 0.5-6% by weight, preferably 0.5-4% by weight.

The alkenyl-containing heterocyclic monomer as the graft monomer can be any alkenyl-containing heterocyclic compound capable of free radical polymerization, and can be at least one selected from the group consisting of alkenyl substituent-containing imidazole, alkenyl substituent-containing pyrazole, alkenyl substituent-containing carbazole, alkenyl substituent-containing pyrrolidone, alkenyl substituent-containing pyridine or pyridinium salt, alkenyl substituent-containing piperidine, alkenyl substituent-containing caprolactam, alkenyl substituent-containing pyrazine, alkenyl substituent-containing thiazole, alkenyl substituent-containing purine, alkenyl substituent-containing morpholine and alkenyl substituent-containing oxazoline; preferably, the alkenyl-containing heterocyclic monomer is a monoalkenyl-containing heterocyclic monomer.

Specifically, the alkenyl-containing heterocyclic monomer can be at least one selected from the group consisting of: 1-vinylimidazole, 2-methyl-1-vinylimidazole, N-allylimidazole, 1-vinylpyrazole, 3-methyl-1-vinylpyrazole, vinylcarbazole, N-vinylpyrrolidone, 2-vinylpyridine, 3-vinylpyridine, 4-vinylpyridine, 2-methyl-5-vinylpyridine, vinylpyridine-N-oxide, vinylpyridinium salt, vinylpiperidine, N-vinylcaprolactam, 2-vinylpyrazine, N-vinylpiperazine, 4-methyl-5-vinylthiazole, N-vinylpurine, vinylmorpholine and vinyloxazoline.

The mass ratio of the alkenyl-containing heterocyclic monomers to the copolypropylene may be 0.3-12:100, preferably 0.5-10:100.

The grafting reaction described herein is a free radical polymerization reaction. Via free radical polymerization, grafting monomers form covalent linkage (grafting) with copolypropylene.

Preferably, the grafted propylene polymer can be prepared from copolypropylene and grafting monomers via a solid-phase grafting reaction, for example, according to the methods described in the Chinese patent applications with the application Nos. 202011195771.2, 202011191001.0, 202011195799.6, 202011190917.4, and 202011195819.X.

Specifically, it can be prepared by a method comprising the following step: in the presence of an inert gas, subjecting a reaction mixture comprising copolypropylene and grafting monomers to a solid-phase grafting reaction to obtain the grafted propylene polymer.

The solid-phase grafting reaction can be carried out with reference to various conventional methods in the art, such as forming active grafting sites on copolypropylene in the presence of grafting monomers, or forming active grafting sites on copolypropylene first, followed by treatment with monomers for grafting. Grafting sites can be formed by treatment with a free radical initiator, or by high energy ionizing radiation or microwave treatment. Free radicals generated in the polymer as a result of the chemical or radiation treatment form grafting sites on the polymer, and monomer polymerization is initiated on these sites.

Preferably, the grafting sites are initiated by a free radical initiator and the grafting reaction is further carried out. In this case, the reaction mixture further comprises a free radical initiator; further preferably, the free radical initiator is selected from peroxide free radical initiators and/or azo free radical initiators.

Among them, the peroxide free radical initiator is preferably at least one selected from the group consisting of dibenzoyl peroxide, dicumyl peroxide, di-tert-butyl peroxide, lauroyl peroxide, dilauroyl peroxide, tert-butyl peroxybenzoate, diisopropyl peroxydicarbonate, tert-butyl peroxy (2-ethylhexanoate) and dicyclohexyl peroxydicarbonate; the azo free radical initiator is preferably azobisisobutyronitrile and/or azobisisoheptanonitrile.

More preferably, the grafting sites are initiated by a peroxide free radical initiator and the grafting reaction is further carried out.

In addition, the grafting reaction can also be carried out by the methods described in CN106543369A, CN104499281A, CN102108112A, CN109251270A, CN1884326A and CN101492517B.

The ratio of the mass of the free radical initiator to the total mass of the monomers for grafting may be 0.1-10:100, preferably 0.5-5:100.

The temperature of the grafting reaction may be 30-130° C., preferably 60-120° C.; and the time may be 0.5-10 h, preferably 1-5 h.

The "reaction mixture" comprises all the materials added to the grafting reaction system, and the materials can be added at one time or at different stages of the reaction.

The reaction mixture may also comprise a dispersant, which is preferably water or an aqueous solution of sodium chloride. The mass amount of the dispersant is preferably 50-300% of the mass of the copolypropylene.

The reaction mixture may also comprise an interfacial agent, which is an organic solvent having swelling effect on polyolefin, preferably at least one of the following organic solvents having swelling effect on copolypropylene: ether solvents, ketone solvents, aromatic hydrocarbon solvents, and alkane solvents; more preferably at least one of the following organic solvents: chlorinated benzene, polychlorinated benzene, alkane or cycloalkane of $C_6$ or more carbons, benzene, $C_1$-$C_4$ alkyl substituted benzene, $C_2$-$C_6$ aliphatic ether, $C_3$-$C_6$ aliphatic ketone, and decahydronaphthalene; further preferably at least one of the following organic solvents: benzene, toluene, xylene, chlorobenzene, tetrahydrofuran, diethyl ether, acetone, hexane, cyclohexane, decahydronaphthalene, and heptane. The mass content of the interfacial agent is preferably 1-35%, further preferably 10-25%, of the mass of the copolypropylene.

The reaction mixture may also comprise an organic solvent as a solvent for dissolving the solid free radical initiator, which preferably comprises at least one of $C_2$-$C_5$ alcohols, $C_2$-$C_4$ ethers and $C_3$-$C_5$ ketones, more preferably comprises at least one of $C_2$-$C_4$ alcohols, $C_2$-$C_3$ ethers and $C_3$-$C_5$ ketones, and most preferably at least one of ethanol, diethyl ether and acetone. The mass content of the organic solvent is preferably 1-35% of the mass of the copolypropylene.

During the grafting reaction, the grafting monomers can be individually or mutually polymerized into ungrafted polymers in a certain amount, thus the grafted propylene polymer can include not only the product (crude product) directly prepared from copolypropylene and grafting monomers via grafting reaction, but also the grafting modified polypropylene pure product obtained by further purifying the product. Therefore, the preparation method may optionally comprise a step of purifying the crude product. The purification can adopt various conventional methods in the art, e.g., extraction.

Preferably, the grafting efficiency of the grafting reaction is controlled to be 5-100%, preferably 30-100%, further preferably 25-80%, or 35-60%. The concept of grafting efficiency is well known to those skilled in the art, and refers to the amount of grafted-on grafting monomers/the total amount of grafting monomers in the reaction feed.

The inert gas may be the various inert gases commonly used in the art, including, but not limited to, nitrogen and argon.

Layer Structure and Properties of the Composite Films

The composite film of the present invention may consist of layer a and layer b only, i.e., a bilayer film.

In an alternative embodiment, in addition to layer a and layer b, the composite film of the present invention may further comprise one or more additional layers, i.e. comprising three or more than three layers, thereby forming a three-layered film or a more than three-layered film, where layer b is the surface layer of the composite film. The composition of the additional layer may be the same as or different from that of layer a or layer b. This layer can also be formed by mixing the components of layer a and the components of layer b. For example, when the composite film is a three-layered film, the additional layer is named as layer c, and layer b and layer c are respectively located on the two sides of layer a, that is, layer c is located on the side of layer a opposite to layer b, and at this time, layer c is also a surface layer. When the composite film is five-layered, it is possible that two layers b are used as the upper and lower surface layers respectively, two layers c are used as the middle layers, and one layer a is used as the core layer.

The thicknesses of layer a, layer b and the optional layer c and additional layers in the present invention are not particularly limited. The ratio of the sum of the thicknesses of other layers than layer a to the thickness of layer a can be 1:6-2:1, for example, 1:5.5, 1:5, 1:4.5, 1:4, 1:3.5, 1:3, 1:2.5, 1:2, 1:1.5, 1:1, 1.5:1, and any value between them, preferably 1:4-2:1, more preferably 1:2-1:1. Such composite film may advantageously have better mechanical properties (e.g., tensile strength) and property stability.

It is found unexpectedly that since the composite film of the present invention comprises dispersed strip-like rubber phases from propylene impact copolymer arranged parallel to each other, the composite film of the present invention can simultaneously have excellent impact resistance and optical properties, or even has excellent mechanical properties (for example, tensile strength) and/or excellent heat-sealing performance, and can have good heat-sealing strength at a lower heat-sealing temperature.

When in addition to the above rubber phase from the propylene impact copolymer, homopolypropylene and polyolefin elastomer are additionally present in the composite film of the present invention, the rubber phase and the non-elastic part in the propylene impact copolymer will be in synergistic interaction with the polymer spherulites formed by homopolypropylene and with the polyolefin elastomer rubber phase, making it possible to further improve the impact resistance and optical properties of the composite film at the same time, or even improve its mechanical properties.

The composite film according to the present invention may advantageously have one or more of the following properties, preferably all of the following properties:

1) pendulum impact strength of ≥0.4 J, for example, ≥0.5 J, 0.6 J or 0.7 J, preferably ≥0.9 J, more preferably ≥1.1 J, e.g., ≥1.5 J, or even ≥1.8 J;

2) film haze of less than 7%, preferably ≤5%, more preferably ≤3%, for example ≤2.5%, even more preferably ≤2%;

3) machine direction (MD) tensile strength of ≥40 MPa, preferably ≥50 MPa;

4) heat-sealing strength at 150° C. of ≥12N/15 mm, preferably ≥15N/15 mm, preferably ≥17N/15 mm, more preferably ≥18N/15 mm, or even ≥19N/15 mm, such as ≥20N/15 mm;

5) thickness deviation in the MD direction of not greater than 1.3, e.g., not greater than 1.0, preferably not greater than 0.5;

6) thickness deviation in the TD direction of not greater than 1.5, e.g., not greater than 1.3, preferably not greater than 0.75 or not greater than 0.8;

7) impact resistance deviation in the MD direction of not greater than 0.05, preferably not greater than 0.03;

8) impact resistance deviation in the TD direction of not greater than 0.07, preferably not greater than 0.05, more preferably not greater than 0.04;

9) surface energy of ≥29 mN/m, e.g., ≥33 mN/m, ≥34.5 mN/m, preferably ≥35 mN/m;

10) volume resistivity of $\geq 1.5 \times 10^{15}$ Ω·m, preferably of $\geq 2.0 \times 10^{15}$ Ω·m.

Measurement methods and standards for the properties are as follows:

Pendulum impact strength: according to the standard GB/T 8809-2015.

Film haze: according to the standard GB/T 2410-2008.

Tensile strength: according to the standard GB/T 1040.3-2006, along the machine direction of the film.

Heat-sealing strength: according to the standard QB/T 2358, heat-sealing temperature being 150° C., heat-sealing pressure being 0.2 MPa, and heat-sealing time being 3 s during sample preparation.

Thickness deviation in the MD direction: determining the thickness of the film using a thickness gauge of model 7301 from Mitutoyo, Japan. As shown in FIG. 1a, after the edge of the film is trimmed, on the center line of the film, one point is taken every 1 meter along the MD direction and a total of 10 points are taken; the thickness at each point is determined according to the method specified in GB/T 8809-2015, and the average value is taken as the film thickness (MD). And based on the above data, the standard deviation of thickness is calculated as the thickness deviation in the MD direction.

Figure 1B:
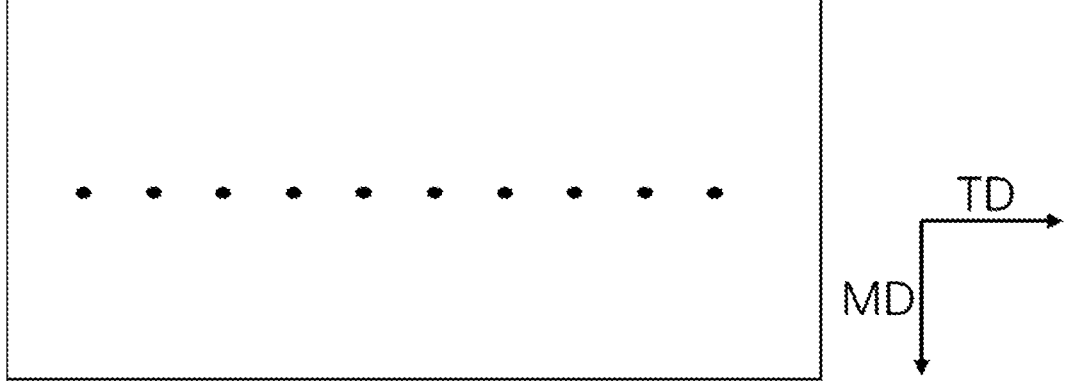
Figure 2:
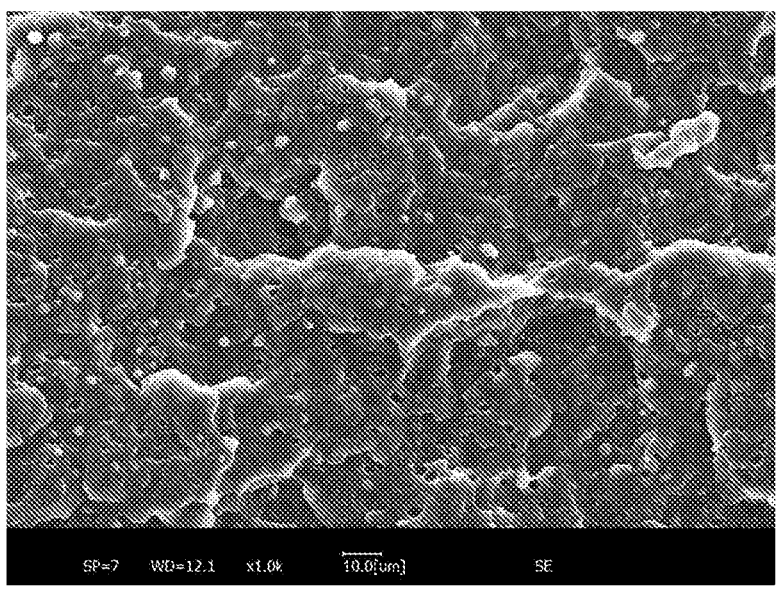
FIG. 2 is a scanning electron microscope (SEM) photograph of a cross section of a specimen of the raw material propylene impact copolymer used in Example A1 according to the present invention.

Thickness deviation in the TD direction: As shown in FIG. 1b, 10 points are taken uniformly along the TD direction of any part of the film, the thickness at each point is determined according to the method specified in GB/T 8809-2015, and the average value is taken as the film thickness (TD). And based on the above data, the standard deviation of thickness is calculated as the thickness deviation in the TD direction.

Impact strength deviation in the MD direction: As shown in FIG. 1a, after the edge of the film is trimmed, on the center line of the film, one point is taken every 1 meter along the MD direction and a total of 10 points are taken; the impact strength of each point is determined according to the method specified in GB/T 8809-2015, and the average value is taken as the impact strength (MD) of the film; and based on the above data, the standard deviation of impact strength is calculated as the impact strength deviation in the MD direction.

Impact strength deviation in the TD direction: As shown in FIG. 1b, 10 points are taken uniformly along the TD direction of any part of the film, the impact strength at each point is determined according to the method specified in GB/T 8809-2015, and the average value is taken as the impact strength (TD) of the film; and based on the above data, the standard deviation of the impact strength is calculated as the impact strength deviation in the TD direction.

Surface energy of the film: determined according to the method specified in GB/T 14216-2008.

Volume resistivity: determined according to the method specified in GB/T 1410-2006.

Preparation of Composite Films

According to a second aspect, the present invention provides a method for preparing the composite film of the present invention. The method of the present invention comprises extrusion casting a raw material composition for forming each layer to form the composite film.

According to the present invention, prior to the extrusion process, the elastic part of the propylene impact copolymer used in the raw material composition can form a particulate rubber phase, the average particle size of the rubber phase is less than or equal to 1.8 μm, preferably less than or equal to 1.5 μm, and the maximum particle size is no more than 2.5 μm, preferably no more than 2 μm, as determined by observing the cross section of a specimen via SEM.

The rubber phase is generally spherical or nearly spherical.

Herein, the spherical and nearly spherical shape means that the aspect ratio of the particles is substantially in the range of 1-2. "Substantially" means that at least 90% of the rubber phase particles have an aspect ratio in the range of 1-2.

The average particle size and the maximum particle size of the rubber phase in the propylene impact copolymer in the raw materials are determined by observing the cross section of an impact specimen via scanning electron microscope (SEM) method, wherein the impact specimen is prepared according to the method specified in the standard GB/T 8809-2015. For spherical particles, the diameter of the particle is measured; for nearly spherical particles, the longitudinal axis of the particle (the distance between the two furthest points on the contour of the particle) is measured. The average value of the above sizes of 50 sample points obtained by observing the SEM photograph is taken as the average particle size, and the maximum value of the above sizes in the above sample points is taken as the maximum particle size.

According to the present invention, by controlling the size of the rubber phase in the raw material propylene impact copolymer, the size of the rubber phase in the composite film can be within the specific range according to the invention.

Prior to the extrusion process, various components (including the optional additives, such as antioxidants, lubricants and other film additives) of the polymer composition used as raw material to prepare each layer may be mixed or blended, and optionally pelletized.

The pelletization process can be carried out as follows: the various components of the propylene polymer composition A for constituting layer a and the propylene polymer composition B for constituting layer b and optionally the polymer composition for constituting an additional layer, together with the optional additives, are homogeneously mixed in a high-speed mixer, and the homogeneously mixed material is added to a twin-screw extruder for melting and mixing, homogeneously extruded and pelletized, and dried to obtain pellets. The processing temperature of the twin-screw extruder can be controlled at 170-230° C.

Then, the resulting pellets are subjected to extrusion casting to thereby prepare a composite film. The extrusion casting process of the pellets can be carried out in a conventional manner using common equipment. The extrusion casting method may comprise feeding the pellets of the polymer compositions used to prepare the various layers to multiple extruders respectively, and co-extruding, compositing and flowing out the pellets through the die of the extruder, followed by casting roll, draw-off roll, trimming and winding up in sequence, thereby preparing the composite film. The extrusion casting temperature can be controlled at 170-230° C. The temperature of the casting roll may be 10-50° C.

Through the preparation method according to the present invention, the rubber phase comprised in the propylene impact copolymer as a raw material is deformed during the process of preparing the composite film, from a spherical or nearly spherical shape into a strip shape, and is oriented along a certain direction, i.e., aligned in parallel, and maintains such a microstructure in the final composite film product, thereby obtaining a composite film having good impact resistance and optical properties according to the present invention.

Advantageously, the polyolefin elastomer used is also deformed during the process of preparing the composite film, into a strip-like rubber phase, and is oriented along a certain direction, i.e., aligned in parallel, and maintains such a microstructure in the final composite film product, and at the same time, it interacts synergistically with the rubber phase from the propylene impact copolymer, thereby further improving the impact resistance and optical properties as well as other properties (mechanical properties, heat-sealing properties, film uniformity, etc.) of the composite film.

The obtained composite film can be stretched, for example, biaxially stretched, in subsequent processes, thereby the mechanical properties of the composite film can be further improved advantageously.

According to some embodiments of the present invention, the method for preparing the composite film comprises pelletizing the propylene polymer composition A and the propylene polymer composition B, and then performing extrusion casting and stretching, to obtain the composite film.

Use of Composite Films

According to a third aspect, the present invention provides use of the composite film of the present invention in the sector of packaging materials.

Since the composite film of the present invention can simultaneously have good impact resistance and optical properties, even has good tensile properties and/or can have good heat-sealing strength at a lower heat-sealing temperature, and even has good thickness and/or property uniformity, the composite film of the present invention can particularly be used in the sector of high-end packaging, such as the sectors that are demanding both for impact resistance and for optical properties of the film, for example, battery packaging materials, electronic product packaging, high-end food packaging and other sectors. Said packaging materials may be, for example, those comprising aluminum-plastic composite films.

Upon using the composite film of the present invention, layer a is used as the core layer, i.e., a layer that is relatively far away from the medium that the composite film will contact, and layer b is used as the surface layer, i.e., a layer that is close to the medium that the composite film will contact. The medium is, for example, an electrolyte that the battery packaging material contacts.

Accordingly, according to a fourth aspect, the present invention provides a packaging material comprising the composite film of the present invention. The packaging material can be, for example, battery packaging materials, electronic product packaging materials or food packaging materials, especially high-end food packaging materials. Said packaging materials may be, for example, those comprising aluminum-plastic composite films.

EXAMPLES

The present invention will be further illustrated below in conjunction with examples, but the scope of the present invention is not limited by these examples.

In the following examples and comparative examples:

The film casting equipment was available from the company Labtech, Sweden, with the model LCR400.

The properties of raw materials, polymer compositions and films were measured according to the following methods:

(1) Melt flow rate (MFR): determined according to the method specified in GB/T 3682-2000, wherein the test temperature was 230° C. and the load was 2.16 kg.

(2) Tensile strength of the film: determined according to the method specified in GB/T 1040.3-2006.

(3) Pendulum impact strength of the film and impact strength deviation calculation: determined according to the method specified in GB/T 8809-2015. Specifically, As shown in FIG. 1a, after the edge of the film was trimmed, on the center line of the film, one point was taken every 1 meter along the MD direction and a total of 10 points were taken, the impact strength at each point was determined according to the method specified in GB/T 8809-2015, and the average value was taken as the impact strength (MD) of the film; and based on the above data, the standard deviation of impact strength was calculated as the impact strength deviation in the MD direction.

As shown in FIG. 1b, 10 points were taken uniformly along the TD direction of any part of the film, the impact strength at each point was determined according to the method specified in GB/T 8809-2015, and the average value was taken as the impact strength (TD) of the film; and based on the above data, the standard deviation of impact strength was calculated as the impact strength deviation in the TD direction.

(4) Film haze: determined according to the method specified in GB/T 2410-2008.

(5) Heat-sealing strength of the film: determined according to the method specified in QB/T 2358. During sample preparation, the heat-sealing temperature was 150° C., the heat-sealing pressure was 0.2 MPa, and the heat-sealing time was 3 s.

(6) Isotacticity: determined by $^{13}$C NMR, and using a nuclear magnetic resonance spectrometer (NMR) of the model AVANCE III from the company Bruker, Switzerland, to determine the nuclear magnetic carbon spectrum ($^{13}$C-NMR) of the propylene polymer at 400 MHz, wherein the solvent was deuterated o-dichlorobenzene, and the sample concentration was 250 mg sample/2.5 mL solvent. To prevent the sample from oxidative degradation during dissolution and data collection, 2 mg of 2,6-di-tert-butyl-4-methylphenol antioxidant (abbreviated as BHT) was added to the sample. Test sample was dissolved at 140° C. and $^{13}$C-NMR was collected, wherein the test was performed at a temperature of 125° C., with probe specification of 10 mm, 90° pulse, sampling time AQ of 5 seconds, delay time D1 of 1 second, and the number of scans of 6000 times. The isotactic diad [mm] content was used as the isotacticity.

(7) Molecular weight distribution n (Mw/Mn): determined by gel permeation chromatography (GPC) method, and using a gel permeation chromatograph of the model PL-GPC 220 produced by the company Polymer Laboratories, Britain, in association with a IR5 type infrared detector, wherein the chromatographic columns in the gel permeation chromatograph were three PIgel 10 μm MIXED-B columns connected in series, the solvent and mobile phase were both 1,2,4-trichlorobenzene (containing 0.3 g/1000 mL of the antioxidant 2,6-di-tert-butyl-p-cresol), the column temperature was 150° C., the flow rate was 1.0 mL/min, and the EasiCal PS-1 narrow distribution polystyrene standards produced by the company PL were used for universal calibration.

(8) Film thickness and thickness deviation test: determining the thickness of the film using a thickness gauge of model 7301 from Mitutoyo, Japan. As shown in FIG. 1a, after the edge of the film was trimmed, on the center line of the film, one point was taken every 1 meter along the MD direction and a total of 10 points were taken, the thickness at each point was determined according to the method specified in GB/T 8809-2015, and the average value was taken as the film thickness (MD). And based on the above data, the standard deviation of thickness was calculated as the thickness deviation in the MD direction.

As shown in FIG. 1b, 10 points were taken uniformly along the TD direction of any part of the film, the thickness at each point was determined according to the method specified in GB/T 8809-2015, and the average value was taken as the film thickness (TD). And based on the above data, the standard deviation of thickness was calculated as the thickness deviation in the TD direction.

(9) Calculation of standard deviation(S): calculated according to formula (a).

$$S = \sqrt{\frac{1}{N}\sum_{i=1}^{N}\left(X_i - \bar{X}\right)^2} \qquad \text{formula (a)}$$

wherein $\bar{X}$ represents for the average value of the measured data $X1, X2 \ldots Xn$, and N is the total number of data used.

(10) Determination of shear viscosity: determined with a Rheograph 25 capillary rheometer from the company GOTTFERT, Germany, according to the method described in ISO11443:2014. The settings were as followed: capillary rheometer temperature at 230° C., die capillary length of 30 mm, capillary aspect ratio at 30:1, and preheating time of 300 seconds; the shear stresses (δ) at shear rates (γ) of 160 s$^{-1}$ and 640 s$^{-1}$ were determined, respectively, and the shear viscosities $\eta_{160}$ and $\eta_{640}$ at corresponding shear rates were calculated respectively according to formula (b).

$$\eta = \frac{\delta}{\dot{\gamma}} \qquad \text{formula (b)}$$

The shear viscosities of the propylene polymer composition A in the examples and comparative examples at shear rates of 160 s$^{-1}$ and 640 s$^{-1}$ were marked as $\eta A_{160}$ and $\eta A_{640}$ respectively, and the shear viscosities of the propylene polymer composition B at shear rates of 160 s$^{-1}$ and 640 s$^{-1}$ were marked as $\eta B_{160}$ and $\eta B_{640}$ respectively, and P represents for the ratio $(\eta A_{160}-\eta B_{160})/(\eta A_{640}-\eta B_{640})$ of the difference $(\eta A_{160}-\eta B_{160})$ in shear viscosity at a shear rate of 160 s$^{-1}$ between propylene polymer composition A and propylene polymer composition B to the difference $(\eta A_{640}-\eta B_{640})$ in shear viscosity at 640 s$^{-1}$.

(11) Atomic force microscope (AFM) photograph: using Dimension FastScan Icon atomic force microscope from the company Bruker, USA, to scan and observe the transversely cut cross-section of the film sample with the quantitative nanomechanical scanning mode.

(12) Transverse axis size and aspect ratio of the rubber phase in the film: using Dimension FastScan Icon atomic force microscope from the company Bruker, USA, to scan and observe the transversely cut cross-section of the film sample with the quantitative nanomechanical scanning mode, performing the measurement, calculation and stastitical analysis to the transverse axis (the length between the intersection points of the straight line with the longest distance between the intersection points intersecting the contour of the object among the straight lines perpendicular to the longitudinal axis), longitudinal axis (the distance between the two furthest points on the contour of the object) and aspect ratio of the rubber phase, and obtaining the average size of the transverse axis and the average value of the aspect ratio based on 200 sample points.

(13) Average particle size and maximum particle size of the rubber phase of the propylene impact copolymer in the raw materials: subjecting the cross section of an impact specimen after gold-spraying treatment to scanning and observing using the scanning electron microscope of EM-30AX from COXEM, South Korea; performing the measurement and statistical analysis to the particle size of the rubber phase, to obtain the average particle size and maximum particle size. For spherical particles, the diameter of the particle was measured; for nearly spherical particles, the longitudinal axis of the particle (the distance between the two furthest points on the contour of the object) was measured. Based on 50 sample points, the maximum value of the above sizes was obtained as the maximum particle size, and the average value of the above sizes was calculated as the average particle size.

(14) Content of the ethylene unit-containing copolymerized part, content of ethylene units, and content of ethylene unit sequences [EEE] in the propylene impact copolymer: determined by $^{13}$C NMR.

$^{13}$C NMR was determined by a 400 MHz nuclear magnetic resonance spectrometer (NMR) from the company Bruker, Switzerland, and the instrument model was AVANCE III. The solvent was deuterated o-dichlorobenzene, with 250 mg sample/2.5 mL solvent. To prevent the sample from oxidative degradation during dissolution and data collection, 2 mg of BHT antioxidant was added to the sample. Test sample was dissolved at 140° C. and $^{13}$C-NMR was collected, wherein the test was performed at a temperature of 125° C., with probe specification of 10 mm, 90° pulse, sampling time AQ of 5 seconds, delay time D1 of 1 second, and the number of scans of 6000 times.

(15) Surface energy of the film: determined according to the method specified in GB/T 14216-2008.

(16) Comonomer content of the copolypropylene in the grafted propylene polymer: determining the comonomer content by quantitative Fourier Transform Infrared (FTIR) spectroscopy. The correlation of the determined comonomer content was calibrated by quantitative nuclear magnetic resonance (NMR) spectroscopy. The calibration method based on the results obtained from the quantitative $^{13}$C-NMR spectrum was carried out according to conventional method in the art.

(17) Xylene solubles content of copolypropylene ingrafted propylene polymer, comonomer content in solubles and intrinsic viscosity ratio of solubles/copolypropylene: using the instrument CRYST-EX from the company Polymer Char for testing. Trichlorobenzene solvent was used, and temperature was raised to 150° C. for dissolution and was maintained constant for 90 minutes; a sample was taken for testing; then the temperature was lowered to 35° C., and was maintained constant for 70 minutes; a sample was taken for testing.

(18) Weight-average molecular weight of the copolypropylene in the grafted propylene polymer: determined by high-temperature GPC, using the PL-GPC 220 gel permeation chromatograph from the company Polymer Laboratory. Test sample was dissolved with 1,2,4-trichlorobenzene, and the concentration was 1.0 mg/ml. The test temperature was 150° C., and the flow rate of the solution was 1.0 ml/min. The molecular weight of polystyrene was used as an internal reference to establish a standard curve, and the molecular weight and molecular weight distribution of the sample were calculated according to the outflow time.

(19) Melting temperature (Tm): analyzing the melting process and crystallization process of a material by a differential scanning calorimeter. The specific procedure was as followed: under the protection of nitrogen, measuring 5-10 mg of a sample from 20° C. to 200° C. using a three-stage temperature increasing and decreasing measurement method, with the change of heat flow reflecting the melting and crystallization process of the material, thereby calculating the melting temperature (Tm).

(20) Grafting efficiency (GE), parameter M1: placing 2-4 g of a grafted product into a Soxhlet extractor, using ethyl acetate (acetone, in the case of using alkenyl-containing silane monomer as grafting monomer) to extract for 24 hours, removing unreacted monomers and homopolymer thereof to obtain pure grafted product, which was dried and weighed; and calculating parameter M1 and grafting efficiency (GE).

The parameter M1 represents for the total content of the structural units derived from grafting monomers in the grafted propylene polymer. The formulae for calculating M1 and GE were as follows:

$$M1 = \frac{w_2 - w_0}{w_1} \times 100\%$$

$$GE = \frac{w_2 - w_0}{w_3} \times 100\%.$$

In the above formulae, $w_0$ was the mass of the PP matrix; $w_1$ was the mass of the grafted product before extraction; $w_2$ was the mass of the grafted product after extraction; $w_3$ was the total mass of grafted monomers added.

Mass content of maleic anhydride % $G_{MAH}$ was tested and calculated according to the method described in the literature (Zhang Guangping, Solid Phase Graft of Maleic Anhydride onto Polypropylene in Helical Ribbon Reactor, China Plastics, February 2002, Vol. 16, No. 2, 69-71). The parameter M2 represents for the content of the grafted-on structural units derived from maleic anhydride monomers in the grafted propylene polymer. The formula for calculating M2 was as follows:

$$M2 = \frac{w_2 \times \% \ G_{MAH}}{w_1} \times 100\%.$$

In the above formula, $w_1$ is the mass of the grafted product before extraction; $w_2$ is the mass of the grafted product after extraction; % $G_{MAH}$ is the mass content of maleic anhydride.

(21) Volume resistivity: determined according to the method specified in GB/T 1410-2006.

Example A1

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was a propylene impact copolymer under the trade name EP200K (available from SINOPEC SABIC Petrochemical Company, having an ethylene content of 8% by weight, an ethylene-propylene copolymerized part content of 13% by weight, and a melt flow rate of 3.2 g/10 min); and component c was a polyolefin elastomer under the trade name 6102 (available from Exxon Corporation, obtained by copolymerization of propylene and ethylene, and having a content of ethylene structural units of 16% by weight). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=3.6 g/10 min.

(2) Preparation of Propylene Polymer Composition B for the Preparation of Layer b:

Component x was a random propylene copolymer under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation). Various components prepared above were weighed and mixed according to proportions, wherein the mass parts Wx of component x was 75 parts by weight, and the mass parts Wy of component y was 25 parts by weight. Wc:Wy was 3:5. Other procedures were the same as those in step (1), and finally pellets of propylene polymer composition B were obtained; after measurement, they had a melt flow rate MFR$_B$=3.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, Mizusawa, Japan, trade name JC-50, hereinafter the same) was further needed to be added to the upper surface layer extruder, wherein the weight ratio of the anti-blocking agent to the propylene polymer composition pellets was 0.02:1. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Figure 3:
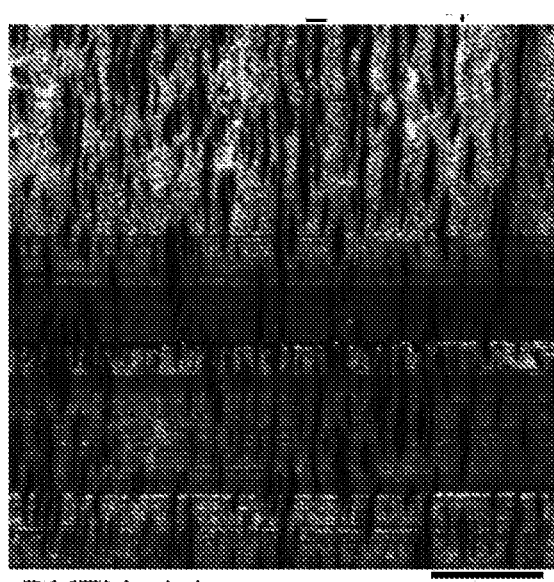
FIG. 3 is an atomic force microscope photograph of a cross section of the film of Example A1 according to the present invention.

The atomic force microscope photograph of the cross section of the composite film is shown in FIG. 3. Therein the black parts were the rubber phases, which were dispersed, strip-like, and arranged parallel to each other. The rubber phases had the average size of the transverse axis of 56 nm, and the average value of aspect ratio of 10.3.

Example A2

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was a propylene impact copolymer under the trade name M180R (available from Shanghai Petrochemical Co., Ltd, having an ethylene content of 11% by weight, an ethylene-propylene copolymerized part content of 15% by weight, and a melt flow rate of 2.0 g/10 min); and component c was a polyolefin elastomer under the trade name DF640 (obtained by copolymerization of ethylene and butene, having a content of butene structural units of 32% by weight, available from the company Mitsui). Various components prepared above were weighed and mixed according to proportions, wherein the mass parts Wa of component a was 65 parts by weight, the mass parts Wb of component b was 30 parts by weight, and the mass parts Wc of component c was 5 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw the material was molten and mixed homogeneously, extruded, pelletized and dried. Pellets of propylene polymer composition A were obtained, and after measurement, they had a melt flow rate MFR$_A$=3.2 g/10 min.

(2) Preparation of Propylene Polymer Composition B for the Preparation of Layer b:

Component x was a random propylene copolymer under the trade name F500EPS (available from Shanghai Petrochemical Co., Ltd, an ethylene-propylene-butene terpolymer having a melt flow rate of 5.3 g/10 min); and component y was a polyolefin elastomer under the trade name DF640 (available from the company Mitsui). Various components prepared above were weighed and mixed according to proportions, wherein the mass parts Wx of component x was 90 parts by weight, and the mass parts Wy of component y was 10 parts by weight. Wc:Wy was 1:2. Other procedures were the same as those in step (1), and finally pellets of propylene polymer composition B were obtained; after measurement, they had a melt flow rate MFR$_B$=5.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder and lower surface layer extruder of the multi-layer extrusion casting machine, wherein an inorganic anti-blocking agent (silica, the same as above) was further needed to be added to the upper and lower surface layer extruders, wherein the weight ratio of the anti-blocking agent to the propylene polymer composition pellets was 0.02:1. During the process of casting a film, the temperature of the casting chilling roll was set at 30° C., and after winding up, a composite film was prepared, which consisted of upper and lower surface layers (layer b; layer c having the same composition as layer b) and a core layer (layer a). The thickness of the film was 50 μm, wherein the ratio of the sum of the thicknesses of the upper and lower surface layers to the thickness of the core layer was 1:1.

Example A3

(1) Preparation of Propylene Polymer Composition A for the Preparation of Layer a:

Component a was a homopolypropylene under the trade name FC801 (available from Shanghai Petrochemical Co., Ltd, having a melt flow rate of 7.8 g/10 min, an isotacticity of 98%, and a molecular weight distribution Mw/Mn of 4.8); component b was a propylene impact copolymer under the trade name PPB-M02D (available from Maoming Petrochemical Company, having an ethylene content of 8% by weight, an ethylene-propylene copolymerized part content of 10% by weight, a content of ethylene units of 36.3% by weight in the room-temperature xylene solubles, a content of ethylene unit sequences [EEE] of 18.5% by weight, and a melt flow rate of 1.5 g/10 min); and component c was a polyolefin elastomer under the trade name EXACT3139 (obtained by copolymerization of ethylene and octene, having a content of octene structural units of 14% by weight, and available from Exxon Corporation). Various components prepared above were weighed and mixed according to proportions, wherein the mass parts Wa of component a was 55 parts by weight, the mass parts Wb of component b was 25 parts by weight, and the mass parts Wc of component c was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=6.6 g/10 min.

(2) Preparation of Propylene Polymer Composition B for the Preparation of Layer b:

Component x was a random propylene copolymer under the trade name F800EPS (available from Shanghai Petrochemical Co., Ltd, an ethylene-propylene-butene terpolymer having a melt flow rate of 8.2 g/10 min); and component y was a polyolefin elastomer under the trade name EXACT3139 (available from Exxon Corporation). Various components prepared above were weighed and mixed according to proportions, wherein the mass parts Wx of component x was 80 parts by weight, and the mass parts Wy of component y was 20 parts by weight. Wc:Wy was 1:1. Other procedures were the same as those in step (1), and finally pellets of propylene polymer composition B were obtained, and after measurement, they had a melt flow rate $MFR_B$=7.9 g/10 min.

(3) Preparation of Composite Film:

The preparation procedure was the same as step (3) in Example A1.

Example A4

(1) Preparation of Propylene Polymer Composition A for the Preparation of Layer a:

Procedure was the same as that in step (1) of Example A1, except that the mass parts Wa of component a was 80 parts by weight, the mass parts Wb of component b was 18 parts by weight, and the mass parts Wc of component c was 2 parts by weight. Finally pellets of propylene polymer composition A were obtained, and after measurement, they had a melt flow rate $MFR_A$=2.8 g/10 min.

(2) Preparation of Propylene Polymer Composition B for the Preparation of Layer b:

Procedure was the same as that in step (2) of Example A1, except that the mass parts Wx of component x was 92 parts by weight, and the mass parts Wy of component y was 8 parts by weight. Wc:Wy was 1:4. Finally pellets of propylene polymer composition B were obtained, and after measurement, they had a melt flow rate $MFR_B$=7.7 g/10 min.

(3) Preparation of Composite Film:

Procedure was the same as that in step (3) of Example A1. The thickness of the film was 50 μm, wherein the thickness ratio of layer b to layer a was 1:3.

Example A5

(1) Preparation of Propylene Polymer Composition A for the Preparation of Layer a:

Procedure was the same as that in step (1) of Example A3, except that the mass parts Wa of component a was 90 parts by weight, the mass parts Wb of component b was 5 parts by weight, and the mass parts Wc of component c was 5 parts by weight. Pellets of propylene polymer composition A were obtained, and after measurement, they had a melt flow rate $MFR_A$=9.6 g/10 min.

(2) Preparation of Propylene Polymer Composition B for the Preparation of Layer b:

Procedure was the same as that in step (2) of Example A3, except that the mass parts Wx of component x was 80 parts by weight, and the mass parts Wy of component y was 20 parts by weight. Wc:Wy was 1:4. Finally pellets of propylene polymer composition B were obtained, and after measurement, they had a melt flow rate $MFR_B$=7.9 g/10 min.

(3) Preparation of Composite Film:

Procedure was the same as that in step (3) of Example A2. The thickness of the film was 50 μm, wherein the ratio of the sum of the thicknesses of the upper and lower surface layers to the thickness of the core layer was 2:1.

Example A6

(1) Preparation of Propylene Polymer Composition A for the Preparation of Layer a:

Procedure was the same as that in step (1) of Example A3, except that the mass parts Wa of component a was 50 parts by weight, the mass parts Wb of component b was 40 parts by weight, and the mass parts Wc of component c was 10 parts by weight. Pellets of propylene polymer composition A were obtained, and after measurement, they had a melt flow rate $MFR_A$=4.6 g/10 min.

(2) Preparation of Propylene Polymer Composition B for the Preparation of Layer b:

Procedure was the same as that in step (2) of Example A3, except that the mass parts Wx of component x was 60 parts by weight, and the mass parts Wy of component y was 40 parts by weight. Wc:Wy was 1:4. Finally pellets of propylene polymer composition B were obtained, and after measurement, they had a melt flow rate $MFR_B$=9.8 g/10 min.

(3) Preparation of Composite Film:

Procedure was the same as that in step (3) of Example A3. The thickness of the film was 50 μm, wherein the ratio of the thickness of the upper surface layer to the thickness of the core layer was 1:4.

Example A7

(1) Preparation of Propylene Polymer Composition A for the Preparation of Layer a:

Procedure was the same as that in step (1) of Example A1, except that the mass parts Wa of component a was 50 parts by weight, the mass parts Wb of component b was 20 parts by weight, and the mass parts Wc of component c was 30 parts by weight. Pellets of propylene polymer composition A were obtained, and after measurement, they had a melt flow rate $MFR_A$=2.2 g/10 min.

(2) Preparation of Propylene Polymer Composition B for the Preparation of Layer b:

Procedure was the same as that in step (2) of Example A1, except that the mass parts Wx of component x was 85 parts by weight, and the mass parts Wy of component y was 15 parts by weight. Wc:Wy was 2:1. Finally pellets of propylene polymer composition B were obtained, and after measurement, they had a melt flow rate $MFR_B$=4.5 g/10 min.

(3) Preparation of Composite Film:

Procedure was the same as that in step (3) of Example A1. The thickness of the film was 50 μm, wherein the thickness ratio of layer b to layer a was 1:3.

Example A8

A composite film was prepared as described in Example A1, except that in the preparation of the propylene polymer composition A, the mass parts Wa of component a was 40 parts by weight, the mass parts Wb of component b was 40 parts by weight, and the mass parts Wc of component c was 20 parts by weight. Wc:Wy was 4:5. Pellets of propylene polymer composition A were obtained, and after measurement, they had a melt flow rate $MFR_A$=2.8 g/10 min.

Example A9

A composite film was prepared as described in Example A1, except that in the preparation of the propylene polymer composition A, the mass parts Wa of component a was 50 parts by weight, the mass parts Wb of component b was 45 parts by weight, and the mass parts Wc of component c was 5 parts by weight. Wc:Wy was 1:5. Pellets of propylene polymer composition A were obtained, and after measurement, they had a melt flow rate $MFR_A$=3.1 g/10 min.

Example A10

A composite film was prepared as described in Example A1, except that in the preparation of the propylene polymer composition A, the mass parts Wa of component a was 50 parts by weight, the mass parts Wb of component b was 10 parts by weight, and the mass parts Wc of component c was 40 parts by weight. Wc:Wy was 8:5. Pellets of propylene polymer composition A were obtained, and after measurement, they had a melt flow rate $MFR_A$=2.7 g/10 min.

Example A11

A composite film was prepared as described in Example A1, except that in the preparation of the propylene polymer composition B, the mass parts Wx of component x was 50 parts by weight, and the mass parts Wy of component y was 50 parts by weight. Wc:Wy was 3:10. Pellets of propylene polymer composition B were obtained, and after measurement, they had a melt flow rate $MFR_B$=4.7 g/10 min.

Example A12

A composite film was prepared as described in Example A1, except that the propylene polymer composition B comprised component x only.

Example A13

A composite film was prepared as described in Example A1, except that in the preparation of the propylene polymer composition B, the mass parts Wx of component x was 92.5 parts by weight, and the mass parts Wy of component y was 7.5 parts by weight. Wc:Wy was 2:1. Finally, pellets of propylene polymer composition B were obtained, and after measurement, they had a melt flow rate $MFR_B$=5.5 g/10 min.

Example A14

A composite film was prepared as described in Example A1, except that in the preparation of the propylene polymer composition B, the mass parts Wx of component x was 85 parts by weight, and the mass parts Wy of component y was 15 parts by weight. Wc:Wy was 1:1. Finally, pellets of propylene polymer composition B were obtained, and after measurement, they had a melt flow rate $MFR_B$=5.1 g/10 min.

Example A15

A composite film was prepared as described in Example A1, except that in the preparation of the propylene polymer composition B, the mass parts Wx of component x was 70 parts by weight, and the mass parts Wy of component y was 30 parts by weight. Wc:Wy was 1:2. Finally, pellets of propylene polymer composition B were obtained, and after measurement, they had a melt flow rate $MFR_B$=4.4 g/10 min.

Example A16

A composite film was prepared as described in Example A1, except that in the preparation of the propylene polymer composition B, the mass parts Wx of component x was 40 parts by weight, and the mass parts Wy of component y was 60 parts by weight. Wc:Wy was 1:4. Finally, pellets of propylene polymer composition B were obtained, and after measurement, they had a melt flow rate $MFR_B$=2.9 g/10 min.

Example A17

A composite film was prepared as described in Example A1, except that in the preparation of the propylene polymer composition B, the mass parts Wx of component x was 97 parts by weight, and the mass parts Wy of component y was 3 parts by weight. Wc:Wy was 5:1. Finally, pellets of propylene polymer composition B were obtained, and after measurement, they had a melt flow rate $MFR_B$=6.0 g/10 min.

Comparative Example A1

A composite film was prepared according to the procedure in Example A1, except that only the propylene polymer composition A was used for extrusion casting to form a single-layer film having a film thickness of 50 μm.

Comparative Example A2

A composite film was prepared according to the procedure in Example A2, except that only the propylene polymer composition B was used for extrusion casting to form a single-layer film having a film thickness of 50 μm.

Comparative Example A3

Figure 4:
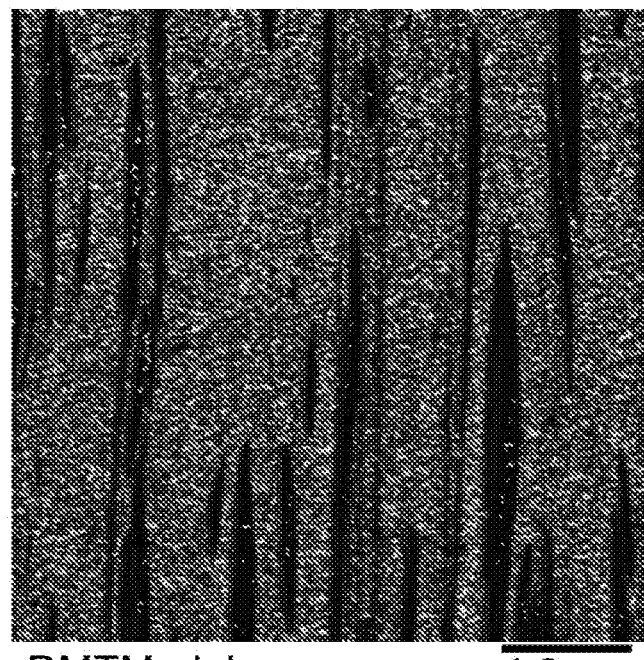
FIG. 4 is an atomic force microscope photograph of a cross section of the film of Comparative Example A3 not according to the present invention.

A composite film was prepared according to the procedure in Example A1, except that the propylene polymer composition A comprised component b only. As shown in FIG. 4, according to the observation using AFM, the rubber phase had the average size of the transverse axis of 380 nm, and the average value of the aspect ratio of 23.4.

Comparative Example A4

A composite film was prepared according to the procedure in Example A1, except that the propylene polymer composition A comprised component a and component b only, wherein the mass parts Wa of component a was 75 parts by weight, and the mass parts Wb of component b was 25 parts by weight.

Comparative Example A5

A composite film was prepared according to the procedure in Example A1, except that the propylene polymer composition A comprised component a and component c only, wherein the mass parts Wa of component a was 75 parts by weight, and the mass parts Wc of component c was 25 parts by weight.

TABLE 1

| No. | Haze (%) | Pendulum impact strength(J) | Tensile Strength in machine direction (MPa) | Heat-sealing strength (N/15 mm) |
|---|---|---|---|---|
| Example A1 | 1.8 | 1.22 | 56.5 | 19.0 |
| Example A2 | 2.6 | 0.94 | 53.8 | 18.6 |
| Example A3 | 2.4 | 1.28 | 50.7 | 19.2 |

TABLE 1-continued

| No. | Haze (%) | Pendulum impact strength(J) | Tensile Strength in machine direction (MPa) | Heat-sealing strength (N/15 mm) |
|---|---|---|---|---|
| Example A4 | 3.8 | 0.48 | 46.5 | 16.3 |
| Example A5 | 3.4 | 0.56 | 48.9 | 17.2 |
| Example A6 | 4.5 | 0.66 | 43.2 | 16.2 |
| Example A7 | 4.7 | 0.58 | 43.8 | 15.4 |
| Example A8 | 4.6 | 0.45 | 42.5 | 15.3 |
| Example A9 | 4.2 | 0.40 | 43.3 | 15.7 |
| Example A10 | 4.7 | 0.46 | 40.8 | 15.8 |
| Example A11 | 4.2 | 0.42 | 41.8 | 15.0 |
| Example A12 | 4.8 | 0.41 | 45.5 | 15.2 |
| Example A13 | 3.0 | 0.89 | 50.9 | 18.2 |
| Example A14 | 2.3 | 1.15 | 52.3 | 18.8 |
| Example A15 | 2.5 | 1.08 | 53.0 | 18.6 |
| Example A16 | 3.2 | 0.92 | 50.5 | 18.3 |
| Example A17 | 4.1 | 0.68 | 48.2 | 17.3 |
| Comparative Example A1 | 6.8 | 0.34 | 35.6 | 2.4 |
| Comparative Example A2 | 5.5 | 0.38 | 25.9 | 10.5 |
| Comparative Example A3 | 15.9 | 0.32 | 30.4 | 13.5 |
| Comparative Example A4 | 13.8 | 0.34 | 27.5 | 12.4 |
| Comparative Example A5 | 11.5 | 0.38 | 24.6 | 13.2 |

From the results in Table 1, it can be concluded that the composite film according to the present invention could have good impact resistance and optical properties simultaneously, and could even have good tensile strength and good heat-sealing strength. Compared with a single-layer film only or a composite film that was not according to the present invention, the composite film of the present invention could achieve a better balance of the above various properties, and upon extrusion casting, the film had a better surface stability and thickness uniformity.

Example B1

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); and component b was a polyolefin elastomer under the trade name 6102 (available from Exxon Corporation). Various components prepared above were weighed and mixed according to proportions, wherein the mass parts Wa of component a was 80 parts by weight, and the mass parts Wb of component b was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.5 g/10 min.

(2) Preparation of Propylene Polymer Composition B for the Preparation of Layer b:

Component x was a random propylene copolymer under the trade name F5006 (available from Yanshan Petrochemical Company, an ethylene-propylene-butene terpolymer having a melt flow rate of 5.2 g/10 min); component y was a polyolefin elastomer under the trade name 6102 (available from Exxon Corporation); and component z was a propylene impact copolymer under the trade name EP200K (available from SINOPEC SABIC Petrochemical Company, having an ethylene content of 8% by weight, an ethylene-propylene copolymerized part content of 13% by weight, and a melt flow rate of 3.2 g/10 min). Various components prepared above were weighed and mixed according to proportions, wherein the mass parts Wx of component x was 85 parts by weight, the mass parts Wy of component y was 5 parts by weight, and the mass parts Wz of component z was 10 parts by weight. Wb: Wy was 4:1. Other procedures were the same as those in step (1), and finally pellets of propylene polymer composition B were obtained, and after measurement, they had a melt flow rate $MFR_B$=4.7 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was further needed to be added to the upper surface layer extruder, wherein the weight ratio of the anti-blocking agent to the propylene polymer composition pellets was 0.02:1. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Example B2

(1) Preparation of Propylene Polymer Composition A for the Preparation of Layer a:

Component a was a propylene impact copolymer under the trade name M180R (available from Shanghai Petrochemical Co., Ltd, having an ethylene content of 11% by weight, an ethylene-propylene copolymerized part content of 15% by weight, and a melt flow rate of 2.0 g/10 min); and component b was a polyolefin elastomer under the trade name DF640 (available from the company Mitsui). Various components prepared above were weighed and mixed according to proportions, wherein the mass parts Wa of component a was 95 parts by weight, and the mass parts Wb of component b was 5 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.1 g/10 min.

(2) Preparation of Propylene Polymer Composition B for the Preparation of Layer b:

Component x was a random propylene copolymer under the trade name F500EPS (available from Shanghai Petrochemical Co., Ltd, an ethylene-propylene-butene terpolymer having a melt flow rate of 5.3 g/10 min); component y was a polyolefin elastomer under the trade name DF640 (available from the company Mitsui); and component z was a propylene impact copolymer under the trade name M180R (available from Shanghai Petrochemical Co., Ltd, having an ethylene content of 11% by weight, an ethylene-propylene copolymerized part content of 15% by weight, and a melt flow rate of 2.0 g/10 min). Various components prepared above were weighed and mixed according to proportions, wherein the mass parts Wx of component x was 60 parts by weight, the mass parts Wy of component y was 20 parts by weight, and the mass parts Wz of component z was 20 parts by weight. Wb: Wy was 1:4. Other procedures were the same as those in step (1), and finally pellets of propylene polymer composition B were obtained, and after measurement, they had a melt flow rate $MFR_B$=4.4 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder and lower surface layer extruder of the multi-layer extrusion casting machine, wherein an inorganic anti-blocking agent (silica, the same as above) was further needed to be added to the upper and lower surface layer extruders, wherein the weight ratio of the anti-blocking agent to the propylene polymer composition pellets was 0.02:1. During the process of casting a film, the temperature of the casting chilling roll was set at 30° C., and after winding up, a composite film was prepared, which consisted of upper and lower surface layers (layer b; layer c having the same composition as layer b) and a core layer (layer a). The thickness of the film was 50 μm, wherein the ratio of the sum of the thicknesses of the upper and lower surface layers to the thickness of the core layer was 1:1.

Example B3

(1) Preparation of Propylene Polymer Composition A for the Preparation of Layer a:

Component a was a homopolypropylene under the trade name FC801 (available from Shanghai Petrochemical Co., Ltd, having a melt flow rate of 7.8 g/10 min, an isotacticity of 98%, and a molecular weight distribution Mw/Mn of 4.8); and component b was a polyolefin elastomer under the trade name EXACT3139 (available from Exxon Corporation). Various components prepared above were weighed and mixed according to proportions, wherein the mass parts Wa of component a was 85 parts by weight, and the mass parts Wb of component b was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=7.9 g/10 min.

(2) Preparation of Propylene Polymer Composition B for the Preparation of Layer b:

Component x was a random propylene copolymer under the trade name F800EPS (available from Shanghai Petrochemical Co., Ltd); component y was a polyolefin elastomer under the trade name EXACT3139 (available from Exxon Corporation); and component z was a polypropylene impact copolymer under the trade name PPB-M02D (available from Maoming Petrochemical Company). Various components prepared above were weighed and mixed according to proportions, wherein the mass parts Wx of component x was 85 parts by weight, the mass parts Wy of component y was 10 parts by weight, and the mass parts Wz of component z was 5 parts by weight. Wb: Wy was 3:2. Other procedures were the same as those in step (1), and finally pellets of propylene polymer composition B were obtained, and after measurement, they had a melt flow rate $MFR_B$=7.4 g/10 min.

(3) Preparation of Composite Film:

The preparation procedure was the same as step (3) in Example B1.

Example B4

(1) Preparation of Propylene Polymer Composition A for the Preparation of Layer a:

Procedure was the same as that in step (1) of Example B1, except that the mass parts Wa of component a was 70 parts by weight, and the mass parts Wb of component b was 30 parts by weight. Pellets of propylene polymer composition A were obtained, and after measurement, they had a melt flow rate $MFR_A$=3.2 g/10 min.

(2) Preparation of Propylene Polymer Composition B for the Preparation of Layer b:

Procedure was the same as that in step (2) of Example B1, except that the mass parts Wx of component x was 90 parts by weight, the mass parts Wy of component y was 5 parts by weight, and the mass parts Wz of component z was 5 parts by weight. Wb: Wy was 6:1. Other procedures were the same as those in step (1). Finally pellets of propylene polymer composition B were obtained, and after measurement, they had a melt flow rate $MFR_B$=8.2 g/10 min.

(3) Preparation of Composite Film:

Procedure was the same as that in step (3) of Example B1. The thickness of the film was 50 μm, wherein the thickness ratio of layer b to layer a was 1:3.

Example B5

(1) Preparation of Propylene Polymer Composition A for the Preparation of Layer a:

Procedure was the same as that in step (1) of Example B3, except that the mass parts Wa of component a was 75 parts by weight, and the mass parts Wb of component b was 25 parts by weight. Pellets of propylene polymer composition A were obtained, and after measurement, they had a melt flow rate $MFR_A$=9.3 g/10 min.

(2) Preparation of Propylene Polymer Composition B for the Preparation of Layer b:

Procedure was the same as that in step (2) of Example B3, except that the mass parts Wx of component x was 85 parts by weight, the mass parts Wy of component y was 13 parts by weight, and the mass parts Wz of component z was 2 parts by weight. Wb: Wy was 25:13. Finally pellets of propylene polymer composition B were obtained, and after measurement, they had a melt flow rate $MFR_B$=9.2 g/10 min.

(3) Preparation of Composite Film:

Procedure was the same as that in step (3) of Example B2. The thickness of the film was 50 μm, wherein the ratio of the sum of the thicknesses of the upper and lower surface layers to the thickness of the core layer was 2:1.

Example B6

(1) Preparation of Propylene Polymer Composition A for the Preparation of Layer a:

Procedure was the same as that in step (1) of Example B3, except that the mass parts Wa of component a was 100 parts by weight. Pellets of propylene polymer composition A were obtained, and after measurement, they had a melt flow rate $MFR_A$=7.8 g/10 min.

(2) Preparation of Propylene Polymer Composition B for the Preparation of Layer b:

Procedure was the same as that in step (2) of Example B3, except that the mass parts Wx of component x was 50 parts by weight, the mass parts Wy of component y was 30 parts by weight, and the mass parts Wz of component z was 20 parts by weight. Finally pellets of propylene polymer composition B were obtained, and after measurement, they had a melt flow rate $MFR_B$=6.8 g/10 min.

(3) Preparation of Composite Film:

Procedure was the same as that in step (3) of Example B3. The thickness of the film was 50 μm, wherein the ratio of the thickness of the upper surface layer to the thickness of the core layer was 1:4.

Example B7

(1) Preparation of Propylene Polymer Composition A for the Preparation of Layer a:

Procedure was the same as that in step (1) of Example B1. The mass parts Wa of component a was 100 parts by weight. Pellets of propylene polymer composition A were obtained, and after measurement, they had a melt flow rate $MFR_A$=3.1 g/10 min.

(2) Preparation of Propylene Polymer Composition B for the Preparation of Layer b:

Procedure was the same as that in step (2) of Example B1, except that the mass parts Wx of component x was 50 parts by weight, the mass parts Wy of component y was 20 parts by weight, and the mass parts Wz of component z was 30 parts by weight. Other procedures were the same as those in step (1). Finally pellets of propylene polymer composition B were obtained, and after measurement, they had a melt flow rate $MFR_B$=3.5 g/10 min.

(3) Preparation of Composite Film:

Procedure was the same as that in step (3) of Example B1. The thickness of the film was 50 μm, wherein the thickness ratio of layer b to layer a was 1:3.

Example B8

A composite film was prepared as described in Example B1, except that in the preparation of the propylene polymer composition A, the mass parts Wa of component a was 100 parts by weight. Finally, pellets of propylene polymer composition A were obtained, and after measurement, they had a melt flow rate $MFR_A$=3.1 g/10 min.

Example B9

A composite film was prepared as described in Example B1, except that in the preparation of the propylene polymer composition A, the mass parts Wa of component a was 50 parts by weight, and the mass parts Wb of component b was 50 parts by weight. Wb: Wy was 10:1. Finally, pellets of propylene polymer composition A were obtained, and after measurement, they had a melt flow rate $MFR_A$=3.5 g/10 min.

Example B10

A composite film was prepared as described in Example B1, except that in the preparation of the propylene polymer composition B, the mass parts Wx of component x was 40 parts by weight, the mass parts Wy of component y was 30 parts by weight, and the mass parts Wz of component z was 30 parts by weight. Wb: Wy was 2:3. Pellets of propylene polymer composition B were obtained, and after measurement, they had a melt flow rate $MFR_B$=4.5 g/10 min.

Example B11

A composite film was prepared as described in Example B1, except that in the preparation of the propylene polymer composition B, the mass parts Wx of component x was 50 parts by weight, the mass parts Wy of component y was 40 parts by weight, and the mass parts Wz of component z was 10 parts by weight. Wb: Wy was 1:2. Pellets of propylene polymer composition B were obtained, and after measurement, they had a melt flow rate $MFR_B$=5.0 g/10 min.

Example B12

A composite film was prepared as described in Example B1, except that in the preparation of the propylene polymer composition B, the mass parts Wx of component x was 50 parts by weight, the mass parts Wy of component y was 10 parts by weight, and the mass parts Wz of component z was 40 parts by weight. Wb: Wy was 2:1. Pellets of propylene polymer composition B were obtained, and after measurement, they had a melt flow rate $MFR_B$=4.8 g/10 min.

Example B13

A composite film was prepared as described in Example B1, except that in the preparation of the propylene polymer composition A, the mass parts Wa of component a was 99 parts by weight, and the mass parts Wb of component b was 1 part by weight. Wb: Wy was 1:5. Finally, pellets of propylene polymer composition A were obtained, and after measurement, they had a melt flow rate $MFR_A$=3.2 g/10 min.

Example B14

A composite film was prepared as described in Example B1, except that in the preparation of the propylene polymer composition A, the mass parts Wa of component a was 97.5 parts by weight, and the mass parts Wb of component b was 2.5 parts by weight. Wb: Wy was 1:2. Finally, pellets of propylene polymer composition A were obtained, and after measurement, they had a melt flow rate $MFR_A$=3.1 g/10 min.

Example B15

A composite film was prepared as described in Example B1, except that in the preparation of the propylene polymer composition A, the mass parts Wa of component a was 95 parts by weight, and the mass parts Wb of component b was 5 parts by weight. Wb: Wy was 1:1. Finally, pellets of propylene polymer composition A were obtained, and after measurement, they had a melt flow rate $MFR_A$=3.2 g/10 min.

Example B16

A composite film was prepared as described in Example B1, except that in the preparation of the propylene polymer composition A, the mass parts Wa of component a was 90 parts by weight, and the mass parts Wb of component b was 10 parts by weight. Wb: Wy was 2:1. Finally, pellets of propylene polymer composition A were obtained, and after measurement, they had a melt flow rate $MFR_A$=3.3 g/10 min.

Example B17

A composite film was prepared as described in Example B1, except that in the preparation of the propylene polymer composition A, the mass parts Wa of component a was 75 parts by weight, and the mass parts Wb of component b was 25 parts by weight. Wb: Wy was 5:1. Finally, pellets of propylene polymer composition A were obtained, and after measurement, they had a melt flow rate $MFR_A$=3.1 g/10 min.

Comparative Example B1

A composite film was prepared as described in Example B1, except that only the propylene polymer composition A was used for extrusion casting to form a single-layer film having a film thickness of 50 μm.

Comparative Example B2

A composite film was prepared as described in Example B2, except that only the propylene polymer composition B was used for extrusion casting to form a single-layer film having a film thickness of 50 μm.

Comparative Example B3

A composite film was prepared as described in Example B1, except that the propylene polymer composition B comprised component x only.

Comparative Example B4

A composite film was prepared as described in Example B1, except that the propylene polymer composition B comprised component x and component y only, wherein the mass parts Wx of component x was 85 parts by weight, and the mass parts Wy of component y was 15 parts by weight.

Example B18

A composite film was prepared as described in Example B2, except that the propylene polymer composition B comprised component x and component z only, wherein the mass parts Wx of component x was 70 parts by weight, and the mass parts Wz of component z was 30 parts by weight.

TABLE 2

| No. | Haze (%) | Pendulum impact strength(J) | Tensile Strength in machine direction (MPa) | Heat-sealing strength (N/15 mm) |
|---|---|---|---|---|
| Example B1 | 1.5 | 1.82 | 52.6 | 18.5 |
| Example B2 | 1.3 | 1.56 | 53.5 | 18.8 |
| Example B3 | 1.6 | 1.78 | 51.2 | 18.2 |
| Example B4 | 2.8 | 1.22 | 48.6 | 17.3 |
| Example B5 | 2.5 | 1.18 | 45.7 | 17.5 |
| Example B6 | 3.9 | 1.06 | 42.2 | 15.4 |
| Example B7 | 3.8 | 0.86 | 43.2 | 15.6 |
| Example B8 | 3.8 | 0.62 | 45.7 | 15.2 |
| Example B9 | 4.4 | 0.76 | 41.6 | 15.4 |
| Example B10 | 4.7 | 0.84 | 41.2 | 15.9 |
| Example B11 | 4.8 | 0.79 | 40.5 | 15.3 |
| Example B12 | 4.7 | 0.82 | 40.2 | 15.9 |
| Example B13 | 3.2 | 1.38 | 47.5 | 17.6 |
| Example B14 | 2.3 | 1.55 | 50.8 | 18.0 |
| Example B15 | 1.8 | 1.67 | 51.3 | 18.3 |
| Example B16 | 1.5 | 1.72 | 50.9 | 18.2 |
| Example B17 | 1.8 | 1.66 | 51.5 | 18.5 |
| Comparative Example B1 | 5.6 | 0.35 | 36.8 | 3.6 |
| Comparative Example B2 | 4.4 | 0.38 | 24.6 | 12.3 |
| Comparative Example B3 | 4.2 | 0.38 | 33.8 | 12.5 |
| Comparative Example B4 | 3.8 | 0.42 | 36.5 | 13.8 |
| Example B18 | 6.0 | 0.52 | 34.6 | 13.4 |

From the results in Table 2, it can be concluded that the composite film according to the present invention had good impact resistance and optical properties simultaneously, and even had good tensile property and good heat-sealing strength. Compared with a single-layer film only or a composite film that was not according to the present invention, the composite film of the present invention could achieve a good balance of the various properties, and upon extrusion casting, the film had a better surface stability and thickness uniformity.

Example C1

The procedure in Example A1 was basically repeated, except that the polyolefin elastomer used in steps (1) and (2) was replaced by the polyolefin elastomer under the trade name 8200 (available from the company Dow, an ethylene-1-octene copolymer, having a content of octene structural units of 38% by weight, the polyolefin elastomer having a shear viscosity ratio $\eta_{160}/\eta_{640}$ of 2.18 at 230° C. and under shear rates of 160 s$^{-1}$ and 640 s$^{-1}$, and the elastomer having a shear viscosity $\eta_{640}$ of 185 Pa·s at 230° C. and under a shear rate of 640 s$^{-1}$); and in step (3), the weight ratio of the anti-blocking agent to the propylene polymer composition pellets was 0.2:100. The melt flow rates were MFR$_A$=3.8 g/10 min, MFR$_B$=4.2 g/10 min.

Figure 5:
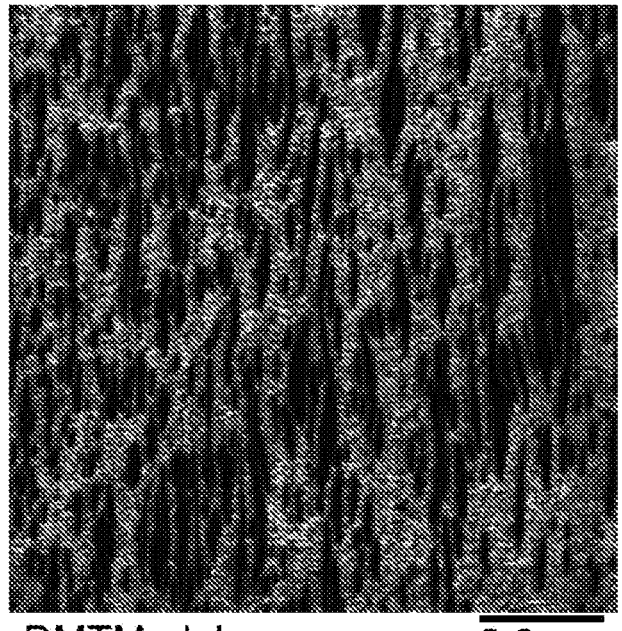
FIG. 5 is an atomic force microscope photograph of a cross section of the film of Example C1 according to the present invention.

The atomic force microscope photograph of the cross section of the composite film is shown in FIG. 5. Therein the black parts were the rubber phases, which were dispersed, strip-like, and arranged parallel to each other. The rubber phase had the average size of the transverse axis of 84 nm, and the average value of aspect ratio of 8.8.

Example C2

The procedure in Example A2 was basically repeated, except that the polyolefin elastomer used in steps (1) and (2)

was replaced by the polyolefin elastomer under the trade name DF840 (available from the company Mitsui, an ethylene-1-butene copolymer, having a content of butene structural units of 25% by weight, the polyolefin elastomer having a shear viscosity ratio $\eta_{160}/\eta_{640}$ of 1.75 at 230° C. and under shear rates of 160 s$^{-1}$ and 640 s$^{-1}$, and the elastomer having a shear viscosity $\eta_{640}$ of 398 Pa·s at 230° C. and under a shear rate of 640 s$^{-1}$); and in step (3), the weight ratio of the anti-blocking agent to the propylene polymer composition pellets was 0.2:100. The melt flow rates were MFR$_A$=3.4 g/10 min, MFR$_B$=5.6 g/10 min.

The composite film was observed under an atomic force microscope, and rubber phases were visible that were dispersed, strip-like, and arranged parallel to each other. The average size of the transverse axis of the rubber phase was 105 nm, and the average value of aspect ratio was 8.5.

Example C3

(1) Preparation of Propylene Polymer Composition A for the Preparation of Layer a:

Component a was a homopolypropylene under the trade name FC801 (available from Shanghai Petrochemical Co., Ltd, having a melt flow rate of 7.8 g/10 min, an isotacticity of 98%, and a molecular weight distribution Mw/Mn of 4.8); component b was a propylene impact copolymer under the trade name PPB-M02D (available from Maoming Petrochemical Company, having an ethylene content of 8% by weight, an ethylene-propylene copolymerized part content of 10% by weight, a content of ethylene units of 36.3% by weight in the room-temperature xylene solubles, a content of ethylene unit sequences [EEE] of 18.5% by weight, and a melt flow rate of 1.5 g/10 min); and component c was a polyolefin elastomer under the trade name VM3980 (available from Exxon Corporation, a propylene-ethylene copolymer, having a content of ethylene structural units of 9% by weight, the polyolefin elastomer having a shear viscosity ratio $\eta_{160}/\eta_{640}$ of 2.26 at 230° C. and under shear rates of 160 s$^{-1}$ and 640 s$^{-1}$, and the elastomer having a shear viscosity $\eta_{640}$ of 205 Pa·s at 230° C. and under a shear rate of 640 s$^{-1}$). Various components prepared above were weighed and mixed according to proportions, wherein the mass parts Wa of component a was 55 parts by weight, the mass parts Wb of component b was 25 parts by weight, and the mass parts Wc of component c was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=7.0 g/10 min.

(2) Preparation of Propylene Polymer Composition B for the Preparation of Layer b:

Component x was a random propylene copolymer under the trade name F800EDF (available from Shanghai Petrochemical Co., a propylene-ethylene bipolymer having a melt flow rate of 7.8 g/10 min); and component y was a polyolefin elastomer under the trade name VM3980 (available from Exxon Corporation, a propylene-ethylene copolymer, having a content of ethylene structural units of 9% by weight, the polyolefin elastomer having a shear viscosity ratio $\eta_{160}/\eta_{640}$ of 2.26 at 230° C. and under shear rates of 160 s$^{-1}$ and 640 s$^{-1}$, and the elastomer having a shear viscosity $\eta_{640}$ of 205 Pa·s at 230° C. and under a shear rate of 640 s$^{-1}$). Various components prepared above were weighed and mixed according to proportions, wherein the mass parts Wx of component x was 80 parts by weight, and the mass parts Wy of component y was 20 parts by weight. Other procedures were the same as those in step (1), and finally pellets of propylene polymer composition B were obtained, and after measurement, they had a melt flow rate MFR$_B$=8.3 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder and lower surface layer extruder of the multi-layer extrusion casting machine, wherein an inorganic anti-blocking agent (silica, the same as above) was added to the upper and lower surface layer extruders, wherein the weight ratio of the anti-blocking agent to the propylene polymer composition pellets was 0.2:100. During the process of casting a film, the temperature of the casting chilling roll was set at 30° C., and after winding up, a composite film was prepared, which consisted of upper and lower surface layers (layer b; layer c having the same composition as layer b) and a core layer (layer a). The thickness of the film was 50 μm, wherein the ratio of the sum of the thicknesses of the upper and lower surface layers to the thickness of the core layer was 1:4.

The composite film was observed under an atomic force microscope, and rubber phases were visible that were dispersed, strip-like, and arranged parallel to each other. The rubber phase had the average size of the transverse axis of 88 nm, and the average value of aspect ratio of 9.6.

Example C4

(1) Preparation of Propylene Polymer Composition A for the Preparation of Layer a:

Procedure was the same as that in step (1) of Example C1, except that the mass parts Wa of component a was 80 parts by weight, the mass parts Wb of component b was 18 parts by weight, and the mass parts Wc of component c was 2 parts by weight. Component c was a polyolefin elastomer under the trade name 8411 (available from the company Dow, an ethylene-1-octene copolymer, having a content of octene structural units of 36% by weight, the polyolefin elastomer having a shear viscosity ratio $\eta_{160}/\eta_{640}$ of 1.80 at 230° C. and under shear rates of 160 s$^{-1}$ and 640 s$^{-1}$, and the elastomer having a shear viscosity $\eta_{640}$ of 148 Pa·s at 230° C. and under a shear rate of 640 s$^{-1}$). Pellets of propylene polymer composition A were obtained, and after measurement, they had a melt flow rate MFR$_A$=2.6 g/10 min.

(2) Preparation of Propylene Polymer Composition B for the Preparation of Layer b:

Procedure was the same as that in step (2) of Example C1, except that the mass parts Wx of component x was 92 parts by weight, and the mass parts Wy of component y was 8 parts by weight. Other procedures were the same as those in step (1), and finally pellets of propylene polymer composition B were obtained, and after measurement, they had a melt flow rate MFR$_B$=7.5 g/10 min.

(3) Preparation of Composite Film:

Procedure was the same as that in step (3) of Example C1. The thickness of the film was 50 μm, wherein the thickness ratio of layer b to layer a was 1:6.

The composite film was observed under an atomic force microscope, and rubber phases were visible that were dispersed, strip-like, and arranged parallel to each other. The rubber phase had the average size of the transverse axis of 196 nm, and the average value of aspect ratio of 5.3.

Example C5

(1) Preparation of Propylene Polymer Composition A for the Preparation of Layer a:

Procedure was the same as that in step (1) of Example C1, except that the mass parts Wa of component a was 90 parts by weight, the mass parts Wb of component b was 5 parts by weight, and the mass parts Wc of component c was 5 parts by weight. Pellets of propylene polymer composition A were obtained, and after measurement, they had a melt flow rate MFR$_A$=3.0 g/10 min.

(2) Preparation of Propylene Polymer Composition B for the Preparation of Layer b:

Procedure was the same as that in step (2) of Example C1, except that the mass parts Wx of component x was 80 parts by weight, and the mass parts Wy of component y was 20 parts by weight. Finally pellets of propylene polymer composition B were obtained, and after measurement, they had a melt flow rate MFR$_B$=3.5 g/10 min.

(3) Preparation of Composite Film:

Procedure was the same as that in step (3) of Example C2. The thickness of the film was 50 μm, wherein the ratio of the sum of the thicknesses of the upper and lower surface layers to the thickness of the core layer was 2:1.

Example C6

(1) Preparation of Propylene Polymer Composition A for the Preparation of Layer a:

Procedure was the same as that in step (1) of Example C3, except that the mass parts Wa of component a was 50 parts by weight, the mass parts Wb of component b was 40 parts by weight, and the mass parts Wc of component c was 10 parts by weight. Pellets of propylene polymer composition A were obtained, and after measurement, they had a melt flow rate MFR$_A$=4.8 g/10 min.

(2) Preparation of Propylene Polymer Composition B for the Preparation of Layer b:

Procedure was the same as that in step (2) of Example C3, except that the mass parts Wx of component x was 60 parts by weight, and the mass parts Wy of component y was 40 parts by weight. Finally pellets of propylene polymer composition B were obtained, and after measurement, they had a melt flow rate MFR$_B$=9.6 g/10 min.

(3) Preparation of Composite Film: Procedure was the same as that in step (3) of Example C3.

The composite film was observed under an atomic force microscope, and rubber phases were visible that were dispersed, strip-like, and arranged parallel to each other. The rubber phase had the average size of the transverse axis of 23 nm, and the average value of aspect ratio of 19.8.

Example C7

(1) Preparation of Propylene Polymer Composition A for the Preparation of Layer a:

Procedure was the same as that in Example C1, except that the mass parts Wa of component a was 50 parts by weight, the mass parts Wb of component b was 20 parts by weight, and the mass parts Wc of component c was 30 parts by weight. Pellets of propylene polymer composition A were obtained, and after measurement, they had a melt flow rate $MFR_A$=2.0 g/10 min.

(2) Preparation of Propylene Polymer Composition B for the Preparation of Layer b:

Procedure was the same as that in step (2) of Example C1, except that the mass parts Wx of component x was 85 parts by weight, and the mass parts Wy of component y was 15 parts by weight. Other procedures were the same as those in step (1), and finally pellets of propylene polymer composition B were obtained, and after measurement, they had a melt flow rate $MFR_B$=4.3 g/10 min.

(3) Preparation of Composite Film: Procedure was the same as that in Example C1. The thickness of the film was 50 μm, wherein the thickness ratio of layer b to layer a was 1:3.

The composite film was observed under an atomic force microscope, and rubber phases were visible that were dispersed, strip-like, and arranged parallel to each other. The rubber phase had the average size of the transverse axis of 145 nm, and the average value of aspect ratio of 12.1.

Example C8

A propylene polymer film was prepared as described in Example C1, except that in the preparation of the propylene polymer composition A, the mass parts Wa of component a was 40 parts by weight, the mass parts Wb of component b was 40 parts by weight, and the mass parts Wc of component c was 20 parts by weight. Pellets of propylene polymer composition A were obtained, and after measurement, they had a melt flow rate $MFR_A$=3.1 g/10 min.

The composite film was observed under an atomic force microscope, and rubber phases were visible that were dispersed, strip-like, and arranged parallel to each other. The rubber phase had the average size of the transverse axis of 88 nm, and the average value of aspect ratio of 17.0.

Example C9

A propylene polymer film was prepared as described in Example C1, except that in the preparation of the propylene polymer composition B, the mass parts Wx of component x was 95 parts by weight, and the mass parts Wy of component y was 5 parts by weight. Finally pellets of propylene polymer composition B were obtained, and after measurement, they had a melt flow rate $MFR_B$=5.5 g/10 min.

Example C10

A propylene polymer film was prepared as described in Example C1, except that in the preparation of the propylene polymer composition B, the mass parts Wx of component x was 70 parts by weight, and the mass parts Wy of component y was 30 parts by weight. Finally pellets of propylene polymer composition B were obtained, and after measurement, they had a melt flow rate $MFR_B$=4.7 g/10 min.

Example C11

A propylene polymer film was prepared as described in Example C1, except that in the preparation of the propylene polymer composition B, the mass parts Wx of component x was 40 parts by weight, and the mass parts Wy of component y was 60 parts by weight.

Finally pellets of propylene polymer composition B were obtained, and after measurement, they had a melt flow rate $MFR_B$=3.2 g/10 min.

Example C12

A propylene polymer composition A was prepared as described in Example C3, a propylene polymer composition B was prepared as described in Example C2, so that both $(\eta A_{160}-\eta B_{160})$ and $(\eta A_{640}-\eta B_{640})$ were less than 0. A composite film was prepared as described in Example C3.

Comparative Example C1

A propylene polymer film was prepared as described in Example C1, except that in the preparation of the propylene polymer composition A, the polyolefin elastomer c was replaced by a polyolefin elastomer under the trade name DF740 (available from the company Mitsui, having a content of butene structural units of 28% by weight, the polyolefin elastomer having a shear viscosity ratio $\eta_{160}/\eta_{640}$ of 1.63 at 230° C. and under shear rates of 160 s$^{-1}$ and 640 s$^{-1}$, and the elastomer having a shear viscosity $\eta_{640}$ of 554 Pa·s at 230° C. and under a shear rate of 640 s$^{-1}$). Finally, pellets of propylene polymer composition A were obtained, and after measurement, they had a melt flow rate $MFR_A$=2.4 g/10 min.

Comparative Example C2

A propylene polymer film was prepared as described in Example C2, except that in the preparation of the propylene polymer composition B, the polyolefin elastomer y was replaced by a polyolefin elastomer under the trade name 8400 (available from the company Dow, a propylene-octene copolymer, having a content of octene structural units of 35%, the polyolefin elastomer having a shear viscosity ratio $\eta_{160}/\eta_{640}$ of 2.45 at 230° C. and under shear rates of 160 s$^{-1}$ and 640 s$^{-1}$, and the elastomer having a shear viscosity $\eta_{640}$ of 84 Pa·s at 230° C. and under a shear rate of 640 s$^{-1}$). Finally, pellets of propylene polymer composition B were obtained, and after measurement, they had a melt flow rate $MFR_B$=8.4 g/10 min.

Comparative Example C3

A composite film was prepared as described in Example C1, except that the propylene polymer composition B comprised component x only.

Comparative Example C4

A composite film was prepared as described in Example C1, except that the propylene polymer composition A comprised component a and component b only, wherein the mass parts Wa of component a was 75 parts by weight, and the mass parts Wb of component b was 25 parts by weight.

Comparative Example C5

A composite film was prepared as described in Example C1, except that the propylene polymer composition A comprised component a and component c only, wherein the mass parts Wa of component a was 75 parts by weight, and the mass parts Wc of component c was 25 parts by weight.

TABLE 3

| No. | $\eta A_{160}$ (Pa · s) | $\eta A_{640}$ (Pa · s) | $\eta B_{160}$ (Pa · s) | $\eta B_{640}$ (Pa · s) | P |
|---|---|---|---|---|---|
| Example C1 | 482 | 203 | 398 | 153 | 1.68 |
| Example C2 | 558 | 227 | 407 | 157 | 2.16 |
| Example C3 | 358 | 148 | 342 | 140 | 2.00 |
| Example C4 | 456 | 188 | 403 | 155 | 1.61 |
| Example C5 | 492 | 209 | 388 | 142 | 1.55 |
| Example C6 | 388 | 160 | 342 | 141 | 2.42 |
| Example C7 | 502 | 232 | 402 | 153 | 1.27 |
| Example C8 | 502 | 232 | 398 | 153 | 1.32 |
| Example C9 | 482 | 203 | 457 | 180 | 1.09 |
| Example C10 | 482 | 203 | 448 | 175 | 1.21 |
| Example C11 | 482 | 203 | 342 | 145 | 2.41 |
| Example C12 | 358 | 148 | 407 | 157 | — |
| Comparative Example C1 | 505 | 221 | 398 | 153 | 1.57 |
| Comparative Example C2 | 482 | 203 | 367 | 122 | 1.42 |
| Comparative Example C3 | 482 | 203 | 476 | 189 | 0.43 |
| Comparative Example C4 | 534 | 201 | 398 | 153 | 2.83 |
| Comparative Example C5 | 434 | 197 | 398 | 153 | 0.82 |

TABLE 4

| | Thickness (µm) | Thickness deviation (MD) | Thickness deviation(TD) | Impact strength(MD, J) | Impact strength deviation (MD) | Impact strength(TD, J) | Impact strength deviation(TD) | Haze (%) |
|---|---|---|---|---|---|---|---|---|
| Example C1 | 52 | 0.42 | 0.65 | 1.28 | 0.02 | 1.25 | 0.04 | 1.9 |
| Example C2 | 53 | 0.50 | 0.75 | 1.12 | 0.03 | 1.10 | 0.04 | 2.5 |
| Example C3 | 50 | 0.47 | 0.70 | 1.20 | 0.03 | 1.21 | 0.05 | 2.6 |
| Example C4 | 52 | 0.49 | 0.77 | 0.54 | 0.03 | 0.53 | 0.05 | 3.7 |
| Example C5 | 53 | 0.58 | 0.92 | 0.62 | 0.03 | 0.64 | 0.06 | 3.4 |
| Example C6 | 49 | 0.85 | 1.21 | 0.66 | 0.04 | 0.66 | 0.05 | 4.7 |
| Example C7 | 53 | 0.88 | 1.42 | 0.57 | 0.04 | 0.54 | 0.06 | 4.7 |
| Example C8 | 52 | 0.84 | 1.23 | 0.58 | 0.04 | 0.59 | 0.06 | 4.6 |
| Example C9 | 51 | 0.90 | 1.38 | 0.63 | 0.05 | 0.65 | 0.07 | 3.1 |
| Example C10 | 52 | 1.22 | 1.47 | 0.75 | 0.05 | 0.72 | 0.06 | 2.8 |
| Example C11 | 52 | 1.27 | 1.45 | 0.66 | 0.05 | 0.67 | 0.07 | 3.3 |
| Example C12 | 52 | 1.28 | 1.48 | 0.83 | 0.05 | 0.84 | 0.07 | 3.5 |
| Comparative Example C1 | 55 | 3.12 | 2.56 | 0.75 | 0.20 | 0.70 | 0.23 | 5.7 |
| Comparative Example C2 | 53 | 2.67 | 2.70 | 0.66 | 0.12 | 0.63 | 0.15 | 5.3 |
| Comparative Example C3 | 52 | 2.14 | 2.27 | 0.41 | 0.08 | 0.40 | 0.10 | 4.8 |
| Comparative Example C4 | 51 | 2.37 | 2.68 | 0.34 | 0.10 | 0.33 | 0.13 | 15.9 |
| Comparative Example C5 | 52 | 2.22 | 2.53 | 0.36 | 0.12 | 0.37 | 0.15 | 6.8 |

From the results in Table 3 and Table 4, it can be concluded that the composite film according to the present invention had good impact resistance and optical properties simultaneously, and even had a good film uniformity, in particular, when using a polyolefin elastomer having a specific shear viscosity, upon extrusion casting, the film surface was stable, and both the thickness uniformity and the impact resistance uniformity of the film were greatly improved.

Example D1

The procedure in Example B1 was basically repeated, except for the following:

The polyolefin elastomer used in step (1) was replaced by the polyolefin elastomer under the trade name 8411 (available from the company Dow, an ethylene-1-octene copolymer, having a content of octene structural units of 36% by weight, the polyolefin elastomer having a shear viscosity ratio $\eta_{160}/\eta_{640}$ of 1.80 at 230° C. and under shear rates of 160 $s^{-1}$ and 640 $s^{-1}$, and the elastomer having a shear viscosity of 148 Pa·s at 230° C. and under a shear rate of 640

$s^{-1}$); and the obtained pellets of the propylene polymer composition A had a melt flow rate $MFR_A$=3.4 g/10 min.

The polyolefin elastomer used in step (2) was replaced by the polyolefin elastomer under the trade name 8200 (available from the company Dow, an ethylene-1-octene copolymer, having a content of octene structural units of 38% by weight, the polyolefin elastomer having a shear viscosity ratio $\eta_{160}/\eta_{640}$ of 2.18 at 230° C. and under shear rates of 160 $s^{-1}$ and 640 $s^{-1}$, and the elastomer having a shear viscosity $\eta_{640}$ of 185 Pas at 230° C. and under a shear rate of 640 $s^{-1}$); and the obtained pellets of the propylene polymer composition B had a melt flow rate $MFR_B$=4.9 g/10 min.

In step (3), the weight ratio of the anti-sticking agent to the propylene polymer composition pellets was 0.2:100.

The composite film was observed under an atomic force microscope, and rubber phases were visible that were dispersed, strip-like, and arranged parallel to each other. The rubber phase had the average size of the transverse axis of 72 nm, and the average value of aspect ratio of 5.5.

Example D2

The procedure in Example B2 was basically repeated, except that the polyolefin elastomer used in steps (1) and (2) was replaced by the polyolefin elastomer under the trade name DF840 (available from the company Mitsui, an ethylene-1-butene copolymer, having a content of butene structural units of 25% by weight, the polyolefin elastomer having a shear viscosity ratio $\eta_{160}/\eta_{640}$ of 1.75 at 230° C. and under shear rates of 160 $s^{-1}$ and 640 $s^{-1}$, and the elastomer having a shear viscosity $\eta_{640}$ of 398 Pa·s at 230° C. and under a shear rate of 640 $s^{-1}$); and in step (3), the weight ratio of the anti-sticking agent to the propylene polymer composition pellets was 0.2:100. The melt flow rates were $MFR_A$=3.3 g/10 min, $MFR_B$=4.5 g/10 min.

The composite film was observed under the atomic force microscope, and rubber phases were visible that were dispersed, strip-like, and arranged parallel to each other. The rubber phase had the average size of the transverse axis of 130 nm, and the average value of aspect ratio of 6.4.

Example D3

(1) Preparation of Propylene Polymer Composition A for the Preparation of Layer a:

Component a was a homopolypropylene under the trade name FC801 (available from Shanghai Petrochemical Co., Ltd, having a melt flow rate of 7.8 g/10 min, an isotacticity of 98%, and a molecular weight distribution Mw/Mn of 4.8); component b was a polyolefin elastomer under the trade name VM3980 (available from Exxon Corporation, a propylene-ethylene copolymer, having a content of ethylene structural units of 9% by weight, the polyolefin elastomer having a shear viscosity ratio $\eta_{160}/\eta_{640}$ of 2.26 at 230° C. and under shear rates of 160 s$^{-1}$ and 640 s$^{-1}$, and the elastomer having a shear viscosity of 205 Pa·s at 230° C. and under a shear rate of 640 s$^{-1}$). Various components prepared above were weighed and mixed according to proportions, wherein the mass parts Wa of component a was 85 parts by weight, and the mass parts Wb of component b was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=7.4 g/10 min.

(2) Preparation of Propylene Polymer Composition B for the Preparation of Layer b:

Component x was a random propylene copolymer under the trade name F800EDF (available from Shanghai Petrochemical Co., an ethylene-propylene bipolymer having a melt flow rate of 7.8 g/10 min); component y was a polyolefin elastomer under the trade name VM3980 (available from Exxon Corporation, a propylene-ethylene copolymer, having a content of ethylene structural units of 9% by weight, the polyolefin elastomer having a shear viscosity ratio $\eta_{160}/\eta_{640}$ of 2.26 at 230° C. and under shear rates of 160 s$^{-1}$ and 640 s$^{-1}$, and the elastomer having a shear viscosity of 205 Pa·s at 230° C. and under a shear rate of 640 s$^{-1}$); and component z was a propylene impact copolymer under the trade name PPB-M02D (available from Maoming Petrochemical Company, having an ethylene content of 8% by weight, an ethylene-propylene copolymerized part content of 10% by weight, a content of ethylene units of 36.3% by weight in the room-temperature xylene solubles, a content of ethylene unit sequences [EEE] of 18.5% by weight, and a melt flow rate of 1.5 g/10 min). Various components prepared above were weighed and mixed according to proportions, wherein the mass parts Wx of component x was 85 parts by weight, the mass parts Wy of component y was 10 parts by weight, and the mass parts Wz of component z was 5 parts by weight. Other procedures were the same as those in step (1), and finally pellets of propylene polymer composition B were obtained, and after measurement, they had a melt flow rate MFR$_B$=7.9 g/10 min.

(3) Preparation of Composite Film:

The preparation procedure was the same as that in step (3) of Example D1.

The composite film was observed under the atomic force microscope, and rubber phases were visible that were dispersed, strip-like, and arranged parallel to each other. The rubber phase had the average size of the transverse axis of 72 nm, and the average value of aspect ratio of 13.2.

Example D4

(1) Preparation of Propylene Polymer Composition A for the Preparation of Layer a:

Procedure was the same as that in step (1) of Example D1, except that the mass parts Wa of component a was 70 parts by weight, and the mass parts Wb of component b was 30 parts by weight. Pellets of propylene polymer composition A were obtained, and after measurement, they had a melt flow rate MFR$_A$=3.5 g/10 min.

(2) Preparation of Propylene Polymer Composition B for the Preparation of Layer b:

Procedure was the same as that in step (2) of Example D1, except that the mass parts Wx of component x was 90 parts by weight, the mass parts Wy of component y was 5 parts by weight, and the mass parts Wz of component z was 5 parts by weight. Other procedures were the same as those in step (1), and finally pellets of propylene polymer composition B were obtained, after measurement, they had a melt flow rate MFR$_B$=5.2 g/10 min.

(3) Preparation of Composite Film:

Procedure was the same as that in step (3) of Example D1. The thickness of the film was 50 μm, wherein the thickness ratio of layer b to layer a was 1:3.

Example D5

(1) Preparation of Propylene Polymer Composition A for the Preparation of Layer a:

Procedure was the same as that in step (1) of Example D3, except that the mass parts Wa of component a was 75 parts by weight, and the mass parts Wb of component b was 25 parts by weight. Pellets of propylene polymer composition A were obtained, and after measurement, they had a melt flow rate MFR$_A$=9.0 g/10 min.

(2) Preparation of Propylene Polymer Composition B for the Preparation of Layer b:

Procedure was the same as that in step (2) of Example D3, except that the mass parts Wx of component x was 85 parts by weight, the mass parts Wy of component y was 13 parts by weight, and the mass parts Wz of component z was 2 parts by weight. Finally pellets of propylene polymer composition B were obtained, and after measurement, they had a melt flow rate MFR$_B$=9.3 g/10 min.

(3) Preparation of Composite Film:

The step was the same as that in Example D2. The thickness of the film was 50 μm, wherein the ratio of the sum of the thicknesses of the upper and lower surface layers to the thickness of the core layer was 2:1.

Example D6

(1) Preparation of Propylene Polymer Composition A for the Preparation of Layer a:

Procedure was the same as that in step (1) of Example D3.

(2) Preparation of Propylene Polymer Composition B for the Preparation of Layer b:

Procedure was the same as that in step (2) of Example D3, except that the mass parts Wx of component x was 50 parts by weight, the mass parts Wy of component y was 30 parts by weight, component y was a polyolefin elastomer under the trade name 8411 (an ethylene-1-octene copolymer, having a content of octene structural units of 36% by weight, available from the company Dow, the polyolefin elastomer having a shear viscosity ratio $\eta_{160}/\eta_{640}$ of 1.80 at 230° C. and under shear rates of 160 s$^{-1}$ and 640 s$^{-1}$, and the elastomer having a shear viscosity of 148 Pa·s at 230° C. and under a shear rate of 640 s$^{-1}$), and the mass parts Wz of component z was 20 parts by weight. Finally pellets of propylene polymer composition B were obtained, and after measurement, they had a melt flow rate $MFR_B$=9.0 g/10 min.

(3) Preparation of Composite Film:

Procedure was the same as that in step (3) of Example D3. The thickness of the film was 50 μm, wherein the ratio of the thickness of the upper surface layer to the thickness of the core layer was 1:4.

The composite film was observed under the atomic force microscope, and rubber phases were visible that were dispersed, strip-like, and arranged parallel to each other. The rubber phase had the average size of the transverse axis of 25 nm, and the average value of aspect ratio of 19.7.

Example D7

(1) Preparation of Propylene Polymer Composition A for the Preparation of Layer a:

Procedure was the same as that in step (1) of Example D1.

(2) Preparation of Propylene Polymer Composition B for the Preparation of Layer b:

Procedure was the same as that in step (2) of Example D1, except that the mass parts Wx of component x was 50 parts by weight, the mass parts Wy of component y was 20 parts by weight, and the mass parts Wz of component z was 30 parts by weight. Other procedures were the same as those in step (1), and finally pellets of propylene polymer composition B were obtained, after measurement, they had a melt flow rate $MFR_B$=3.7 g/10 min.

(3) Preparation of Composite Film:

Procedure was the same as that in step (3) of Example D1. The thickness of the film was 50 μm, wherein the thickness ratio of layer b to layer a was 1:3.

The composite film was observed under the atomic force microscope, and rubber phases were visible that were dispersed, strip-like, and arranged parallel to each other. The rubber phase had the average size of the transverse axis of 67 nm, and the average value of aspect ratio of 17.5.

Example D8

A composite film was prepared as described in Example D1, except that in the preparation of the propylene polymer composition A, the mass parts Wa of component a was 50 parts by weight, and the mass parts Wb of component b was 50 parts by weight. Finally, pellets of propylene polymer composition A were obtained, and after measurement, they had a melt flow rate $MFR_A$=3.6 g/10 min.

The composite film was observed under the atomic force microscope, and rubber phases were visible that were dispersed, strip-like, and arranged parallel to each other. The rubber phase had the average size of the transverse axis of 190 nm, and the average value of aspect ratio of 5.1.

Example D9

A composite film was prepared as described in Example D1, except that in the preparation of the propylene polymer composition B, the mass parts Wx of component x was 40 parts by weight, the mass parts Wy of component y was 30 parts by weight, and the mass parts Wz of component z was 30 parts by weight. Pellets of propylene polymer composition B were obtained, and after measurement, they had a melt flow rate $MFR_B$=4.4 g/10 min.

The composite film was observed under the atomic force microscope, and rubber phases were visible that were dispersed, strip-like, and arranged parallel to each other. The rubber phase had the average size of the transverse axis of 145 nm, and the average value of aspect ratio of 7.8.

Example D10

A composite film was prepared as described in Example D1, except that in the preparation of the propylene polymer composition B, the mass parts Wx of component x was 50 parts by weight, the mass parts Wy of component y was 40 parts by weight, and the mass parts Wz of component z was 10 parts by weight. Pellets of propylene polymer composition B were obtained, after measurement, they had a melt flow rate $MFR_B$=5.1 g/10 min.

The composite film was observed under the atomic force microscope, and rubber phases were visible that were dispersed, strip-like, and arranged parallel to each other. The rubber phase had the average size of the transverse axis of 85 nm, and the average value of aspect ratio of 18.3.

Example D11

A propylene polymer composition A was prepared as described in Example D3, a propylene polymer composition B was prepared as described in Example D2, so that both $(\eta A_{160} - \eta B_{160})$ and $(\eta A_{640} - \eta B_{640})$ were less than 0. A composite film was prepared as described in Example D3.

Comparative Example D1

A composite film was prepared as described in Example D1, except that the polyolefin elastomer b was replaced by a polyolefin elastomer under the trade name DF740 (available from the company Mitsui, the polyolefin elastomer having a shear viscosity ratio $\eta_{160}/\eta_{640}$ of 1.63 at 230° C. and under shear rates of 160 s$^{-1}$ and 640 s$^{-1}$, and the elastomer having a shear viscosity of 554 Pas at 230° C. and under a shear rate of 640 s$^{-1}$). The propylene polymer composition A had a melt flow rate $MFR_A$=2.6 g/10 min. The thickness of the film was 50 μm.

Comparative Example D2

A composite film was prepared as described in Example D2, except that the polyolefin elastomer y was replaced by a polyolefin elastomer under the trade name DF740 (available from the company Mitsui, the polyolefin elastomer having a shear viscosity ratio $\eta_{160}/\eta_{640}$ of 1.63 at 230° C. and under shear rates of 160 s$^{-1}$ and 640 s$^{-1}$, and the elastomer having a shear viscosity of 554 Pa·s at 230° C. and under a shear rate of 640 s$^{-1}$). Pellets of propylene polymer composition B were obtained, and after measurement, they had a melt flow rate $MFR_B$=4.2 g/10 min. The thickness of the film was 50 μm.

Comparative Example D3

A composite film was prepared as described in Example D1, except that the propylene polymer composition B comprised component x only.

Comparative Example D4

A composite film was prepared as described in Example D1, except that the propylene polymer composition B comprised component x and component y only, wherein the mass parts Wx of component x was 85 parts by weight, and the mass parts Wy of component y was 15 parts by weight.

Example D12

A composite film was prepared as described in Example D2, except that the propylene polymer composition B comprised component x and component z only, wherein the mass parts Wx of component x was 70 parts by weight, and the mass parts Wz of component z was 30 parts by weight.

Comparative Example D5

A composite film was prepared as described in Example D2, except that the propylene polymer composition A comprised component a only.

TABLE 5

| No. | $\eta A_{160}$ (Pa · s) | $\eta A_{640}$ (Pa · s) | $\eta B_{160}$ (Pa · s) | $\eta B_{640}$ (Pa · s) | P |
|---|---|---|---|---|---|
| Example D1 | 479 | 192 | 384 | 150 | 2.26 |
| Example D2 | 574 | 235 | 413 | 157 | 2.06 |
| Example D3 | 354 | 137 | 337 | 128 | 1.89 |
| Example D4 | 453 | 185 | 399 | 155 | 1.80 |
| Example D5 | 340 | 127 | 335 | 124 | 1.67 |
| Example D6 | 354 | 137 | 322 | 124 | 2.46 |
| Example D7 | 464 | 187 | 403 | 162 | 2.44 |
| Example D8 | 442 | 183 | 398 | 153 | 1.47 |
| Example D9 | 464 | 187 | 353 | 142 | 2.47 |
| Example D10 | 464 | 187 | 341 | 135 | 2.37 |
| Example D11 | 354 | 137 | 397 | 157 | — |
| Comparative Example D1 | 511 | 226 | 384 | 150 | 1.67 |
| Comparative Example D2 | 574 | 235 | 412 | 160 | 2.16 |
| Comparative Example D3 | 479 | 192 | 476 | 189 | 1.00 |
| Comparative Example D4 | 479 | 192 | 359 | 151 | 2.93 |
| Example D12 | 479 | 192 | 394 | 162 | 2.83 |
| Comparative Example D5 | 501 | 191 | 384 | 150 | 2.85 |

TABLE 6

| | Thickness (μm) | Thickness deviation(MD) | Thickness deviation(TD) | Impact strength (MD, J) | Impact strength deviation (MD) | Impact strength (TD, J) | Impact strength deviation(TD) | Haze (%) |
|---|---|---|---|---|---|---|---|---|
| Example D1 | 52 | 0.43 | 0.68 | 1.85 | 0.02 | 1.84 | 0.03 | 1.4 |
| Example D2 | 51 | 0.47 | 0.74 | 1.58 | 0.03 | 1.59 | 0.04 | 1.5 |
| Example D3 | 52 | 0.42 | 0.64 | 1.77 | 0.02 | 1.75 | 0.04 | 1.7 |
| Example D4 | 52 | 0.49 | 0.78 | 1.24 | 0.03 | 1.25 | 0.04 | 2.6 |
| Example D5 | 53 | 0.54 | 0.96 | 1.15 | 0.03 | 1.15 | 0.05 | 2.5 |
| Example D6 | 50 | 0.76 | 1.13 | 1.07 | 0.04 | 1.04 | 0.06 | 3.8 |
| Example D7 | 52 | 0.78 | 1.20 | 0.88 | 0.05 | 0.87 | 0.07 | 3.7 |
| Example D8 | 51 | 0.84 | 1.23 | 0.80 | 0.04 | 0.82 | 0.06 | 4.3 |
| Example D9 | 52 | 0.92 | 1.27 | 0.87 | 0.04 | 0.86 | 0.06 | 4.6 |
| Example D10 | 49 | 0.96 | 1.25 | 0.76 | 0.05 | 0.77 | 0.06 | 4.8 |
| Example D11 | 52 | 0.98 | 1.28 | 1.44 | 0.05 | 1.41 | 0.07 | 2.1 |
| Comparative Example D1 | 52 | 3.05 | 3.12 | 1.65 | 0.22 | 1.58 | 0.23 | 1.6 |
| Comparative Example D2 | 51 | 2.56 | 2.66 | 1.44 | 0.14 | 1.40 | 0.18 | 1.8 |
| Comparative Example D3 | 50 | 1.94 | 2.23 | 0.38 | 0.08 | 0.37 | 0.11 | 4.2 |
| Comparative Example D4 | 50 | 2.14 | 2.35 | 0.40 | 0.09 | 0.42 | 0.13 | 3.8 |
| Example D12 | 52 | 2.25 | 2.55 | 0.52 | 0.13 | 0.48 | 0.16 | 6.0 |
| Comparative Example D5 | 51 | 2.58 | 2.94 | 0.62 | 0.08 | 0.58 | 0.11 | 10.4 |

From the results in Table 5 and Table 6, it can be concluded that the composite film according to the present invention had good impact resistance and optical properties simultaneously. Compared with a composite film that was not according to the present invention, the composite film of the present invention had better overall properties, and in particular, when using a polyolefin elastomer having a specific shear viscosity, upon extrusion casting, the film surface was stable, and both the thickness uniformity and the impact resistance uniformity of the film were greatly improved.

Example E1

Figure 6A:
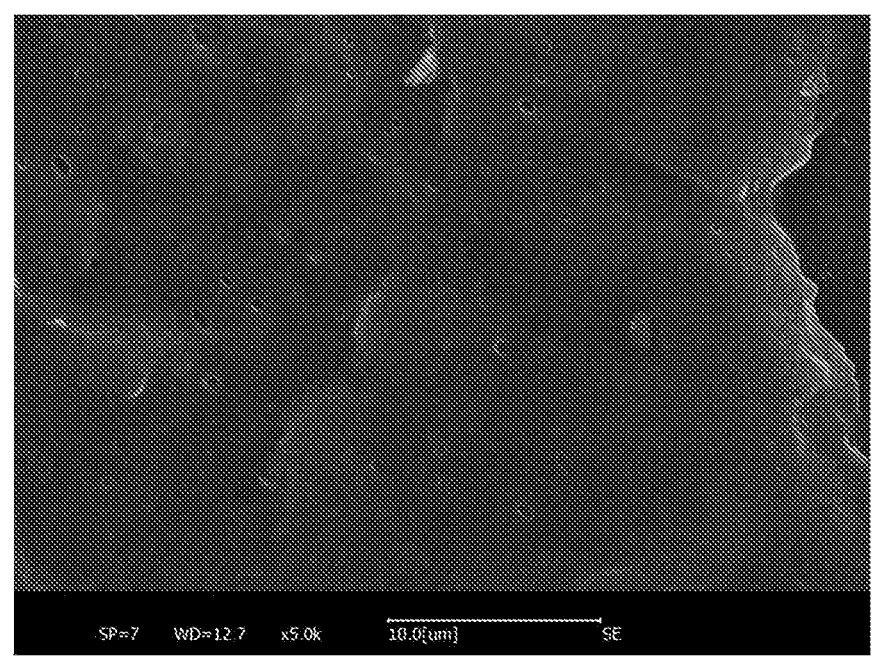
FIG. 6a is a SEM photograph of a cross section of a specimen of the raw material propylene impact copolymer used in Example E1 according to the present invention.

(1) Preparation of Propylene Polymer Composition A for the Preparation of Layer a:

Component a was a propylene impact copolymer under the trade name J410F (available from Korean Hyosung, the rubber phase having an average particle size of 600 nm and a maximum particle size of 800 nm, the content of ethylene units being 5.3% by weight, the ethylene-propylene copolymerized part content being 7.2% by weight, the content of ethylene units being 26.0% by weight in the room-temperature xylene solubles, the content of ethylene unit sequences [EEE] being 6.9% by weight, and the melt flow rate being 4.6 g/10 min, FIG. 6a showing the SEM photograph of the cross section of the propylene impact copolymer specimen); component b was a homopolypropylene under the trade name PPH-FA03 (available from Qingdao Refining & Chemical Co., Ltd., having a melt flow rate of 3.0 g/10 min, and a molecular weight distribution Mw/Mn of 4.6); and component c was a polyolefin elastomer under the trade name DF840 (available from the company Mitsui, an ethylene-1-butene copolymer). Various components prepared above were weighed and mixed according to proportions, wherein the mass parts Wa of component a was 65 parts by weight, the mass parts Wb of component b was 30 parts by weight, and the mass parts Wc of component c was 5 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=4.1 g/10 min.

(2) Preparation of Propylene Polymer Composition B for the Preparation of Layer b:

Component x was a propylene random copolymer under the trade name F500EPS (available from Shanghai Petrochemical Co., Ltd, an ethylene-propylene-butene terpolymer having a melt flow rate of 5.3 g/10 min); and component y was a polyolefin elastomer under the trade name DF840 (available from the company Mitsui, an ethylene-1-butene copolymer). Various components prepared above were weighed and mixed according to proportions, wherein the mass parts Wx of component x was 90 parts by weight, and the mass parts Wy of component y was 10 parts by weight. Other procedures were the same as those in step (1), and finally pellets of propylene polymer composition B were obtained, after measurement, they had a melt flow rate $MFR_B$=5.6 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder and lower surface layer extruder of the multi-layer extrusion casting machine, wherein an inorganic anti-blocking agent (silica, the same as above) was added to the upper and lower surface layer extruders, wherein the weight ratio of the anti-blocking agent to the propylene polymer composition pellets was 0.2:100. During the process of casting a film, the temperature of the casting chilling roll was set at 30° C., and after winding up, a composite film was prepared, which consisted of upper and lower surface layers (layer b) and a core layer (layer a). The thickness of the film was 50 μm, wherein the ratio of the sum of the thicknesses of the upper and lower surface layers to the thickness of the core layer was 1:1.

Figure 7:
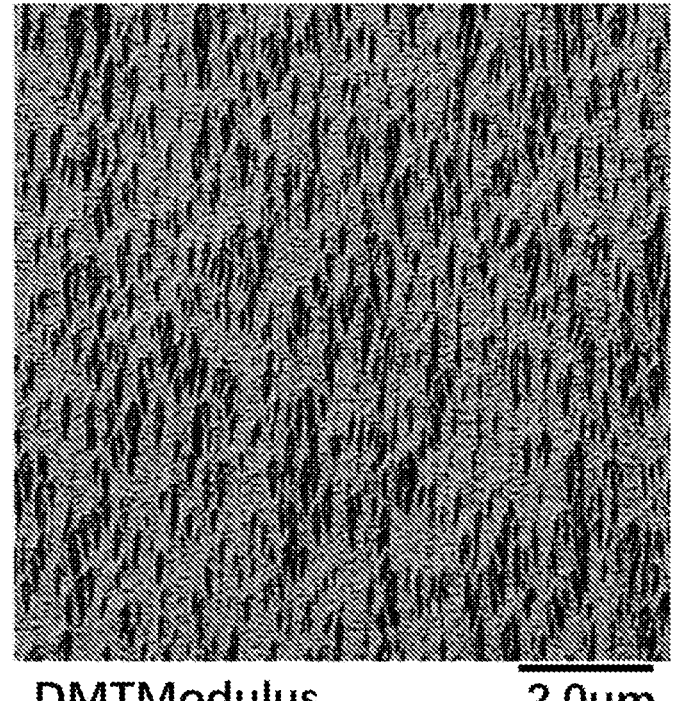
FIG. 7 is an atomic force microscope photograph of a cross section of the film of Example E1 according to the present invention.

The atomic force microscope photograph of the cross section of the composite film is shown in FIG. 7. Therein the black parts were the rubber phases, and it could be seen that the rubber phases were dispersed, strip-like, and arranged parallel to each other. The rubber phase had the average size of the transverse axis of 53 nm, and the average value of aspect ratio was 5.2.

Example E2

(1) Preparation of Propylene Polymer Composition A for the Preparation of Layer a:

Component a was a propylene impact copolymer under the trade name F200R (available from Shanghai Petrochemical Co., Ltd, the content of ethylene units being 9.1% by weight, the ethylene-propylene copolymerized part content being 12.2% by weight, the rubber phase having an average particle size of 800 nm, and a maximum particle size of 1 μm, the content of ethylene units being 38.1% by weight in the room-temperature xylene solubles, the content of ethylene unit sequences [EEE] being 13.6% by weight, and the melt flow rate being 2.1 g/10 min); component b was a homopolypropylene under the trade name PPH-FA03 (available from Qingdao Refining & Chemical Co., Ltd., having a melt flow rate of 3.1 g/10 min, and a molecular weight distribution Mw/Mn of 4.7); and component c was a polyolefin elastomer under the trade name 8200 (available from the company Dow, an ethylene-1-octene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.3 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); and component y was a polyolefin elastomer under the trade name 8200 (available from the company Dow, an ethylene-1-octene copolymer). Various components prepared above were weighed and mixed according to proportions, wherein the mass parts Wx of component x was 75 parts by weight, and the mass parts Wy of component y was 25 parts by weight. Other procedures were the same as those in step (1), and finally pellets of propylene polymer composition B were obtained, after measurement, they had a melt flow rate $MFR_B$=4.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

The composite film was observed under the atomic force microscope, and rubber phases were visible that were dispersed, strip-like, and arranged parallel to each other. The rubber phase had the average size of the transverse axis of 62 nm, and the average value of aspect ratio of 11.2.

Example E3

Component a was a propylene impact copolymer under the trade name PPB-M02D (the rubber phase having an average particle size of 1.4 μm and a maximum particle size of 1.9 μm, available from Maoming Petrochemical Company, the ethylene content being 8% by weight, the ethylene-propylene copolymerized part content being 10% by weight, the content of ethylene units being 36.3% by weight in the room-temperature xylene solubles, the content of ethylene unit sequences [EEE] being 18.5% by weight, and the melt flow rate being 1.5 g/10 min); component b was a propylene-ethylene binary random copolypropylene under the trade name F800EDF (available from Shanghai Petrochemical Co., having a melt flow rate of 7.8 g/10 min); and component c was a polyolefin elastomer under the trade name VM3980 (available from Exxon Corporation, a propylene-ethylene copolymer). Various components prepared above were weighed and mixed according to proportions, wherein the mass parts Wa of component a was 55 parts by weight, the mass parts Wb of component b was 25 parts by weight, and the mass parts Wc of component c was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=6.4 g/10 min.

(2) Preparation of Propylene Polymer Composition B for the Preparation of Layer b:

Component x was a propylene random copolymer under the trade name F800EDF (available from Shanghai Petrochemical Co., a propylene-ethylene bipolymer having a melt flow rate of 7.8 g/10 min); and component y was a polyolefin elastomer under the trade name VM3980 (available from Exxon Corporation, a propylene-ethylene copolymer). Various components prepared above were weighed and mixed according to proportions, wherein the mass parts Wx of component x was 80 parts by weight, and the mass parts Wy of component y was 20 parts by weight. Other procedures were the same as those in step (1), and finally pellets of propylene polymer composition B were obtained, after measurement, they had a melt flow rate MFR$_B$=8.3 g/10 min.

(3) Preparation of Composite Film:

Procedure was the same as that in step (3) of Example E1. The thickness of the finally prepared film was 50 μm, wherein the ratio of the sum of the thicknesses of the upper and lower surface layers to the thickness of the core layer was 1:4.

The composite film was observed under the atomic force microscope, and rubber phases were visible that were dispersed, strip-like, and arranged parallel to each other. The rubber phase had the average size of the transverse axis of 143 nm, and the average value of aspect ratio was 8.7.

Example E4

(1) Preparation of Propylene Polymer Composition A for the Preparation of Layer a:

Procedure was the same as that in step (1) of Example E2, except that the mass parts Wa of component a was 80 parts by weight, the mass parts Wb of component b was 18 parts by weight, and the mass parts Wc of component c was 2 parts by weight, wherein component c was a polyolefin elastomer under the trade name 8411 (available from the company Dow, an ethylene-1-octene copolymer). Pellets of propylene polymer composition A were obtained, and after measurement, they had a melt flow rate MFR$_A$=3.1 g/10 min.

(2) Preparation of Propylene Polymer Composition B for the Preparation of Layer b:

Procedure was the same as that in step (2) of Example E2, except that the mass parts Wx of component x was 92 parts by weight, and the mass parts Wy of component y was 8 parts by weight. Other procedures were the same as those in step (1), and finally pellets of propylene polymer composition B were obtained, after measurement, they had a melt flow rate MFR$_B$=7.5 g/10 min.

(3) Preparation of Composite Film:

Procedure was the same as that in step (3) of Example E2. The thickness of the film was 50 μm, wherein the thickness ratio of layer b to layer a was 1:6.

The composite film was observed under the atomic force microscope, and rubber phases were visible that were dispersed, strip-like, and arranged parallel to each other. The rubber phase had the average size of the transverse axis of 77 nm, and the average value of aspect ratio of 5.6.

Example E5

(1) Preparation of Propylene Polymer Composition A for the Preparation of Layer a:

Procedure was the same as that in step (1) of Example E1, except that the mass parts Wa of component a was 90 parts by weight, the mass parts Wb of component b was 5 parts by weight, and the mass parts Wc of component c was 5 parts by weight. Pellets of propylene polymer composition A were obtained, and after measurement, they had a melt flow rate MFR$_A$=5.1 g/10 min.

(2) Preparation of Propylene Polymer Composition B:

Procedure was the same as that in step (2) of Example E2, except that the mass parts Wx of component x was 80 parts by weight, and the mass parts Wy of component y was 20 parts by weight. Finally pellets of propylene polymer composition B were obtained, and after measurement, they had a melt flow rate MFR$_B$=3.5 g/10 min.

(3) Preparation of Composite Film:

Procedure was the same as that in step (3) of Example E1. The thickness of the film was 50 μm, wherein the ratio of the sum of the thicknesses of the upper and lower surface layers to the thickness of the core layer was 2:1.

The composite film was observed under the atomic force microscope, and rubber phases were visible that were dispersed, strip-like, and arranged parallel to each other. The rubber phase had the average size of the transverse axis of 25 nm, and the average value of aspect ratio of 14.6.

Example E6

(1) Preparation of Propylene Polymer Composition A for the Preparation of Layer a:

Procedure was the same as that in step (1) of Example E3, except that the mass parts Wa of component a was 50 parts by weight, the mass parts Wb of component b was 40 parts by weight, and the mass parts Wc of component c was 10 parts by weight. Pellets of propylene polymer composition A were obtained, and after measurement, they had a melt flow rate $MFR_A$=2.3 g/10 min.

(2) Preparation of Propylene Polymer Composition B for the Preparation of Layer b:

Procedure was the same as that in step (2) of Example E3, except that the mass parts Wx of component x was 60 parts by weight, and the mass parts Wy of component y was 40 parts by weight. Finally pellets of propylene polymer composition B were obtained, and after measurement, they had a melt flow rate $MFR_B$=9.6 g/10 min.

(3) Preparation of Composite Film:

Procedure was the same as that in step (3) of Example E3.

The composite film was observed under the atomic force microscope, and rubber phases were visible that were dispersed, strip-like, and arranged parallel to each other. The rubber phase had the average size of the transverse axis of 138 nm, and the average value of aspect ratio of 6.3.

Example E7

(1) Preparation of Propylene Polymer Composition A for the Preparation of Layer a:

Procedure was the same as that in step (1) of Example E2, except that the mass parts Wa of component a was 50 parts by weight, the mass parts Wb of component b was 20 parts by weight, and the mass parts Wc of component c was 30 parts by weight. Pellets of propylene polymer composition A were obtained, and after measurement, they had a melt flow rate $MFR_A$=3.6 g/10 min.

(2) Preparation of Propylene Polymer Composition B for the Preparation of Layer b:

Procedure was the same as that in step (2) of Example E2, except that the mass parts Wx of component x was 85 parts by weight, and the mass parts Wy of component y was 15 parts by weight. Other procedures were the same as those in step (1), and finally pellets of propylene polymer composition B were obtained, after measurement, they had a melt flow rate $MFR_B$=4.3 g/10 min.

(3) Preparation of Composite Film:

Procedure was the same as that in step (3) of Example E2. The thickness of the film was 50 μm, wherein the thickness ratio of layer b to layer a was 1:3.

The composite film was observed under the atomic force microscope, and rubber phases were visible that were dispersed, strip-like, and arranged parallel to each other. The rubber phase had the average size of the transverse axis of 106 nm, and the average value of aspect ratio of 8.6.

Example E8

A composite film was prepared as described in Example E2, except that in the preparation of the propylene polymer composition A, the mass parts Wa of component a was 40 parts by weight, the mass parts Wb of component b was 40 parts by weight, and the mass parts Wc of component c was 20 parts by weight. Pellets of propylene polymer composition A were obtained, and after measurement, they had a melt flow rate $MFR_A$=3.3 g/10 min.

The composite film was observed under the atomic force microscope, and rubber phases were visible that were dispersed, strip-like, and arranged parallel to each other. The rubber phase had the average size of the transverse axis of 94 nm, and the average value of aspect ratio of 9.3.

Example E9

A composite film was prepared as described in Example E2, except that in the preparation of the propylene polymer composition B, the mass parts Wx of component x was 95 parts by weight, and the mass parts Wy of component y was 5 parts by weight. Finally, pellets of propylene polymer composition B were obtained, and after measurement, they had a melt flow rate $MFR_B$=5.5 g/10 min.

Example E10

A composite film was prepared as described in Example E2, except that in the preparation of the propylene polymer composition B, the mass parts Wx of component x was 70 parts by weight, and the mass parts Wy of component y was 30 parts by weight. Finally, pellets of propylene polymer composition B were obtained, and after measurement, they had a melt flow rate $MFR_B$=4.7 g/10 min.

Example E11

A composite film was prepared as described in Example E2, except that in the preparation of the propylene polymer composition B, the mass parts Wx of component x was 40 parts by weight, and the mass parts Wy of component y was 60 parts by weight. Finally, pellets of propylene polymer composition B were obtained, and after measurement, they had a melt flow rate $MFR_B$=3.2 g/10 min.

Comparative Example E1

Figure 6B:
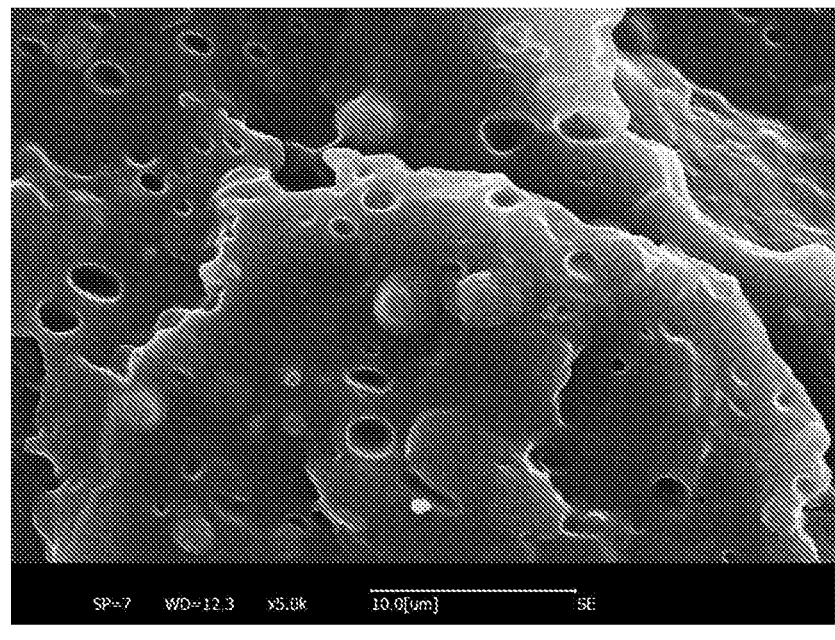
FIG. 6b is a SEM photograph of a cross section of a specimen of the raw material propylene impact copolymer used in Comparative Example E1 not according to the present invention.

A composite film was prepared as described in Example E2, except that in the preparation of the propylene polymer composition A, the propylene impact copolymer was replaced by a propylene impact copolymer under the trade name F780R (available from Shanghai Petrochemical Co., the rubber phase having an average particle size of 2.0 μm and a maximum particle size of 3.0 μm, the content of ethylene units being 9.0% by weight, the ethylene-propylene copolymerized part content being 17.1% by weight, and the melt flow rate being 7.3 g/10 min, FIG. 6b being the SEM photograph of the cross section of the propylene impact copolymer specimen). Finally, pellets of propylene polymer composition A were obtained, and after measurement, they had a melt flow rate $MFR_A$=7.7 g/10 min.

Example E12

A composite film was prepared as described in Example E2, except that the propylene polymer composition A comprised component a and component b only, wherein the mass parts Wa of component a was 75 parts by weight, and the mass parts Wb of component b was 25 parts by weight.

Comparative Example E2

A composite film was prepared as described in Example E2, except that the propylene polymer composition A comprised component a and component c only, wherein the mass parts Wa of component a was 75 parts by weight, and the mass parts Wc of component c was 25 parts by weight.

TABLE 7

| No. | Thickness (μm) | Haze (%) | Pendulum impact strength (J) | Heat-sealing strength (N/15 mm) |
|---|---|---|---|---|
| Example E1 | 51 | 1.8 | 1.34 | 18.5 |
| Example E2 | 52 | 1.6 | 1.30 | 19.2 |
| Example E3 | 52 | 2.4 | 1.17 | 18.8 |
| Example E4 | 50 | 3.2 | 0.52 | 16.5 |
| Example E5 | 51 | 2.8 | 0.60 | 17.4 |
| Example E6 | 52 | 3.6 | 0.65 | 16.1 |
| Example E7 | 53 | 3.9 | 0.54 | 15.7 |
| Example E8 | 50 | 4.2 | 0.57 | 15.4 |
| Example E9 | 52 | 2.8 | 0.63 | 15.4 |
| Example E10 | 51 | 2.5 | 0.70 | 15.5 |
| Example E11 | 51 | 3.0 | 0.73 | 15.3 |
| Comparative example E1 | 52 | 10.7 | 0.40 | 14.7 |
| Example E12 | 51 | 5.2 | 0.42 | 12.5 |
| Comparative example E2 | 53 | 10.3 | 0.55 | 14.3 |

From the results in Table 7, it can be concluded that the composite film having the microstructure according to the present invention had good impact resistance and optical properties simultaneously, and even had a good heat-sealing strength. In contrast, the composite film not having the microstructure according to the present invention prepared by using a propylene impact copolymer not according to the present invention had worse optical properties or impact resistance, and upon extrusion casting, the film surface was not stable and it was difficult to obtain a film with uniform thickness.

Example F1

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); and component b was a polyolefin elastomer under the trade name 8411 (available from the company Dow, an ethylene-1-octene copolymer). Various components prepared above were weighed and mixed according to proportions, wherein the mass parts Wa of component a was 80 parts by weight, and the mass parts Wb of component b was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.4 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); component y was a polyolefin elastomer under the trade name 8200 (available from the company Dow, an ethylene-1-octene copolymer); and component z was a polypropylene impact copolymer under the trade name PPB-M02D (the rubber phase having an average particle size of 1.4 μm and a maximum particle size of 1.9 μm, available from Maoming Petrochemical Company, the ethylene content being 8% by weight, and the melt flow rate being 1.5 g/10 min). Various components prepared above were weighed and mixed according to proportions, wherein the mass parts Wx of component x was 85 parts by weight, the mass parts Wy of component y was 5 parts by weight, and the mass parts Wz of component z was 10 parts by weight. Other steps were the same as those in step (1), and finally pellets of propylene polymer composition B were obtained, after measurement, they had a melt flow rate $MFR_B$=4.8 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

The atomic force microscope photograph of the cross section of the composite film showed that rubber phases were present in the film, which were uniformly dispersed, strip-like, and arranged parallel to each other. The rubber phase had the average size of the transverse axis of 128 nm, and the average value of aspect ratio of 5.2.

Example F2

(1) Preparation of Propylene Polymer Composition A for the Preparation of Layer a:

Component a was a propylene impact copolymer under the trade name F200R (available from Shanghai Petrochemical Co., Ltd, the rubber phase having an average particle size of 800 nm and a maximum particle size of 1 μm, the ethylene content being 9.1% by weight, the ethylene-propylene copolymerized part content being 12.2% by weight, the content of ethylene units being 38.1% by weight in the room-temperature xylene solubles, the content of ethylene unit sequences [EEE] being 13.6% by weight, and the melt flow rate being 2.1 g/10 min); and component b was a polyolefin elastomer under the trade name DF840 (available from the company Mitsui, an ethylene-1-butene copolymer). Various components prepared above were weighed and mixed according to proportions, wherein the mass parts Wa of component a was 95 parts by weight, and the mass parts Wb of component b was 5 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.6 g/10 min.

(2) Preparation of Propylene Polymer Composition B for the Preparation of Layer b:

Component x was a propylene random copolymer under the trade name F500EPS (available from Shanghai Petrochemical Co., Ltd, an ethylene-propylene-butene terpolymer having a melt flow rate of 5.3 g/10 min); component y was a polyolefin elastomer under the trade name DF840 (available from the company Mitsui); and component z was a polypropylene impact copolymer under the trade name F200R. Various components prepared above were weighed and mixed according to proportions, wherein the mass parts Wx of component x was 60 parts by weight, the mass parts Wy of component y was 20 parts by weight, and the mass parts Wz of component z was 20 parts by weight. Other steps were the same as those in step (1), and finally pellets of propylene polymer composition B were obtained, after measurement, they had a melt flow rate $MFR_B$=4.3 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder and lower surface layer extruder of the multi-layer extrusion casting machine, wherein an inorganic anti-blocking agent (silica, the same as above) was added to the upper and lower surface layer extruders, wherein the weight ratio of the anti-blocking agent to the propylene polymer composition pellets was 0.2:100. During the process of casting a film, the temperature of the casting chilling roll was set at 30° C., and after winding up, a composite film was prepared, which consisted of upper and lower surface layers (layer b) and a core layer (layer a). The thickness of the film was 50 μm, wherein the ratio of the sum of the thicknesses of the upper and lower surface layers to the thickness of the core layer was 1:1.

The composite film was observed under the atomic force microscope, and rubber phases were visible that were dispersed, strip-like, and arranged parallel to each other. The rubber phase had the average size of the transverse axis of 88 nm, and the average value of aspect ratio of 7.5.

Example F3

(1) Preparation of Propylene Polymer Composition A for the Preparation of Layer a:

Component a was a homopolypropylene under the trade name FC801 (available from Shanghai Petrochemical Co., Ltd, having a melt flow rate of 7.8 g/10 min, an isotacticity of 98%, and a molecular weight distribution Mw/Mn of 4.8);

and component b was a polyolefin elastomer under the trade name VM3980 (available from Exxon Corporation, a propylene-ethylene copolymer, having a content of ethylene structural units of 9% by weight). Various components prepared above were weighed and mixed according to proportions, wherein the mass parts Wa of component a was 85 parts by weight, and the mass parts Wb of component b was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=7.4 g/10 min.

(2) Preparation of Propylene Polymer Composition B for the Preparation of Layer b:

Component x was a propylene random copolymer under the trade name F800EPS (available from Shanghai Petrochemical Co., Ltd, an ethylene-propylene-butene terpolymer having a melt flow rate of 8.2 g/10 min); component y was a polyolefin elastomer under the trade name VM3980 (available from Exxon Corporation, a propylene-ethylene copolymer, having a content of ethylene structural units of 9% by weight); and component z was a polypropylene impact copolymer under the trade name J410F (available from Korean Hyosung, the rubber phase having an average particle size of 600 nm and a maximum particle size of 800 nm, the ethylene content being 5.3% by weight, the ethylene-propylene copolymerized part content being 7.2% by weight, the content of ethylene units being 26.0% by weight in the room-temperature xylene solubles, the content of ethylene unit sequences [EEE] being 6.9% by weight, and the melt flow rate being 4.6 g/10 min). Various components prepared above were weighed and mixed according to proportions, wherein the mass parts Wx of component x was 85 parts by weight, the mass parts Wy of component y was 10 parts by weight, and the mass parts Wz of component z was 5 parts by weight. Other steps were the same as those in step (1), and finally pellets of propylene polymer composition B were obtained, after measurement, they had a melt flow rate $MFR_B$=8.4 g/10 min.

(3) Preparation of Composite Film:

The preparation procedure was the same as step (3) in Example F1.

The composite film was observed under the atomic force microscope, and rubber phases were visible that were dispersed, strip-like, and arranged parallel to each other. The rubber phase had the average size of the transverse axis of 54 nm, and the average value of aspect ratio of 9.8.

Example F4

(1) Preparation of Propylene Polymer Composition A for the Preparation of Layer a:

Procedure was the same as that in step (1) of Example F1, except that the mass parts Wa of component a was 70 parts by weight, and the mass parts Wb of component b was 30 parts by weight. Pellets of propylene polymer composition A were obtained, and after measurement, they had a melt flow rate $MFR_A$=3.5 g/10 min.

(2) Preparation of Propylene Polymer Composition B for the Preparation of Layer b:

The step was the same as step (2) of Example F1, except that the mass parts Wx of component x was 90 parts by weight, the mass parts Wy of component y was 5 parts by weight, and the mass parts Wz of component z was 5 parts by weight. Other procedures were the same as those in step (1), and finally pellets of propylene polymer composition B were obtained, after measurement, they had a melt flow rate $MFR_B$=5.5 g/10 min.

(3) Preparation of Composite Film:

The step was the same as that in Example F1. The thickness of the film was 50 μm, wherein the thickness ratio of layer B to layer A was 1:3.

Example F5

(1) Preparation of Propylene Polymer Composition A for the Preparation of Layer a:

Procedure was the same as that in step (1) of Example F2, except that the mass parts Wa of component a was 75 parts by weight, and the mass parts Wb of component b was 25 parts by weight. Pellets of propylene polymer composition A were obtained, and after measurement, they had a melt flow rate $MFR_A$=4.0 g/10 min.

(2) Preparation of Propylene Polymer Composition B for the Preparation of Layer b:

Procedure was the same as that in Example F3, except that the mass parts Wx of component x was 85 parts by weight, the mass parts Wy of component y was 13 parts by weight, and the mass parts Wz of component z was 2 parts by weight. Finally pellets of propylene polymer composition B were obtained, and after measurement, they had a melt flow rate $MFR_B$=8.2 g/10 min.

(3) Preparation of Composite Film:

Procedure was the same as that in Example F2. The thickness of the film was 50 μm, wherein the ratio of the sum of the thicknesses of the upper and lower surface layers to the thickness of the core layer was 2:1.

Example F6

(1) Preparation of Propylene Polymer Composition A for the Preparation of Layer a:

Procedure was the same as that in step (1) of Example F3.

(2) Preparation of Propylene Polymer Composition B for the Preparation of Layer b:

Procedure was the same as that in step (2) of Example F3, except that the mass parts Wx of component x was 50 parts by weight, the mass parts Wy of component y was 30 parts by weight, component y was a polyolefin elastomer under the trade name 8411 (an ethylene-1-octene copolymer, available from the company Dow), and the mass parts Wz of component z was 20 parts by weight. Finally pellets of propylene polymer composition B were obtained, and after measurement, they had a melt flow rate $MFR_B$=8.6 g/10 min.

(3) Preparation of Composite Film:

Procedure was the same as that in step (3) of Example F3. The thickness of the film was 50 μm, wherein the ratio of the thickness of the upper surface layer to the thickness of the core layer was 1:4.

The composite film was observed under the atomic force microscope, and rubber phases were visible that were dispersed, strip-like, and arranged parallel to each other. The rubber phase had the average size of the transverse axis of 28 nm, and the average value of aspect ratio of 14.5.

Example F7

(1) Preparation of Propylene Polymer Composition A for the Preparation of Layer a:

Procedure was the same as that in step (1) of Example F1.

(2) Preparation of Propylene Polymer Composition B for the Preparation of Layer b:

Procedure was the same as that in step (2) of Example F1, except that the mass parts Wx of component x was 50 parts by weight, the mass parts Wy of component y was 20 parts by weight, and the mass parts Wz of component z was 30 parts by weight. Other procedures were the same as those in step (1), and finally pellets of propylene polymer composition B were obtained, after measurement, they had a melt flow rate $MFR_B$=4.3 g/10 min.

(3) Preparation of Composite Film:

Procedure was the same as that in step (3) of Example F1. The thickness of the film was 50 μm, wherein the thickness ratio of layer B to layer A was 1:3.

The composite film was observed under the atomic force microscope, and rubber phases were visible that were dispersed, strip-like, and arranged parallel to each other. The rubber phase had the average size of the transverse axis of 147 nm, and the average value of aspect ratio of 6.3.

Example F8

A composite film was prepared as described in Example F1, except that in the preparation of the propylene polymer composition A, the mass parts Wa of component a was 50 parts by weight, and the mass parts Wb of component b was 50 parts by weight. Finally, pellets of propylene polymer composition A were obtained, and after measurement, they had a melt flow rate $MFR_A$=3.6 g/10 min.

The composite film was observed under the atomic force microscope, and rubber phases were visible that were dispersed, strip-like, and arranged parallel to each other. The rubber phase had the average size of the transverse axis of 120 nm, and the average value of aspect ratio of 5.5.

Example F9

A composite film was prepared as described in Example F1, except that in the preparation of the propylene polymer composition B, the mass parts Wx of component x was 40 parts by weight, the mass parts Wy of component y was 30 parts by weight, and the mass parts Wz of component z was 30 parts by weight. Pellets of propylene polymer composition B were obtained, and after measurement, they had a melt flow rate $MFR_B$=4.2 g/10 min.

The composite film was observed under the atomic force microscope, and rubber phases were visible that were dispersed, strip-like, and arranged parallel to each other. The rubber phase had the average size of the transverse axis of 145 nm, and the average value of aspect ratio of 7.4.

Example F10

A composite film was prepared as described in Example F1, except that in the preparation of the propylene polymer composition B, the mass parts Wx of component x was 50 parts by weight, the mass parts Wy of component y was 40 parts by weight, and the mass parts Wz of component z was 10 parts by weight. Pellets of propylene polymer composition B were obtained, after measurement, they had a melt flow rate MFR$_B$=5.3 g/10 min.

The composite film was observed under the atomic force microscope, and rubber phases were visible that were dispersed, strip-like, and arranged parallel to each other. The rubber phase had the average size of the transverse axis of 102 nm, and the average value of aspect ratio of 9.3.

Comparative Example F1

A composite film was prepared as described in Example F1, except that in the preparation of the propylene polymer composition B, the polypropylene impact copolymer z was replaced by a polypropylene impact copolymer under the trade name F780R (available from Shanghai Petrochemical Co., the rubber phase having an average particle size of 2.0 μm, and a maximum particle size of 3.0 μm, the content of ethylene units being 9.0% by weight, the ethylene-propylene copolymerized part content being 17.1% by weight, and the melt flow rate being 7.3 g/10 min). Finally, pellets of propylene polymer composition B were obtained, after measurement, they had a melt flow rate MFR$_B$=7.9 g/10 min. The thickness of the film was 50 μm.

Comparative Example F2

A composite film was prepared as described in Example F2, except that component a in composition A and component z in composition B were replaced by a propylene impact copolymer under the trade name F780R, and pellets of propylene polymer composition A (a melt flow rate MFR$_A$=7.3 g/10 min) and pellets of propylene polymer composition B (a melt flow rate MFR$_B$=6.5 g/10 min) were obtained. The thickness of the film was 50 μm.

Comparative Example F3

A composite film was prepared as described in Example F1, except that the propylene polymer composition B comprised component x only.

Comparative Example F4

A composite film was prepared as described in Example F1, except that the propylene polymer composition B comprised component x and component y only, wherein the mass parts Wx of component x was 85 parts by weight, and the mass parts Wy of component y was 15 parts by weight.

Comparative Example F5

A composite film was prepared as described in Example F2, except that the propylene polymer composition B comprised component x and component z only, wherein the mass parts Wx of component x was 70 parts by weight, and the mass parts Wz of 10 component z was 30 parts by weight.

TABLE 8

| No. | Thickness (μm) | Haze (%) | Pendulum impact strength (J) | Machine direction tensile strength (MPa) | Heat-sealing strength (N/15 mm) |
|---|---|---|---|---|---|
| Example F1 | 51 | 1.7 | 1.89 | 51.8 | 20.6 |
| Example F2 | 50 | 1.9 | 2.03 | 52.5 | 21.2 |
| Example F3 | 52 | 1.3 | 1.81 | 50.2 | 19.2 |

TABLE 8-continued

| No. | Thickness (μm) | Haze (%) | Pendulum impact strength (J) | Machine direction tensile strength (MPa) | Heat-sealing strength (N/15 mm) |
|---|---|---|---|---|---|
| Example F4 | 50 | 2.5 | 1.34 | 47.2 | 18.5 |
| Example F5 | 49 | 3.5 | 1.42 | 48.0 | 18.4 |
| Example F6 | 51 | 3.2 | 1.22 | 42.8 | 17.5 |
| Example F7 | 51 | 3.6 | 1.02 | 43.5 | 16.6 |
| Example F8 | 52 | 3.8 | 0.75 | 42.3 | 15.8 |
| Example F9 | 50 | 4.1 | 0.68 | 42.5 | 15.6 |
| Example F10 | 51 | 4.6 | 0.77 | 40.3 | 15.2 |
| Comparative example F1 | 51 | 8.6 | 0.52 | 34.2 | 14.5 |
| Comparative example F2 | 49 | 13.3 | 0.58 | 36.8 | 14.7 |
| Comparative example F3 | 52 | 4.5 | 0.42 | 32.5 | 14.3 |
| Comparative example F4 | 50 | 5.4 | 0.50 | 30.8 | 13.7 |
| Comparative example F5 | 52 | 7.5 | 0.43 | 35.9 | 14.3 |

From the results in Table 8, it can be concluded that the composite film having the microstructure according to the present invention prepared by using the propylene impact copolymer according to the present invention had both good impact resistance and optical properties simultaneously, and had good tensile properties and good heat-sealing strength at the same time. In contrast, the composite film not having the microstructure according to the present invention prepared by using a propylene impact copolymer not according to the present invention had worse optical properties or impact resistance, and meanwhile, worse tensile properties or heat-sealing strength; further, upon extrusion casting, the film surface was not stable, and it was difficult to obtain a film with uniform thickness.

Example G1 (Using Maleic Anhydride Modified Polypropylene)

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was a propylene impact copolymer under the trade name EP200K (available from SINOPEC SABIC Petrochemical Company, having an ethylene content of 8% by weight, and a melt flow rate of 3.2 g/10 min); and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant FL7540L produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.6 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); component y was a polyolefin elastomer under the trade name 6102 (available from Exxon Corporation, an ethylene-propylene copolymer); and component z was a maleic anhydride modified polypropylene under the trade name QF551A (available from the company Mitsui). Various components prepared above were weighed and mixed according to proportions, wherein the mass parts Wx of component x was 70 parts by weight, the mass parts Wy of component y was 15 parts by weight, and the mass parts Wz of component z was 15 parts by weight. Wc:Wy was 1:1. Other steps were the same as those in step (1), and finally pellets of propylene polymer composition B were obtained, after measurement, they had a melt flow rate $MFR_B$=3.5 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the composite film was 50 μm, wherein the thickness ratio of layer b to layer a was 1:2.

The composite film was observed under the atomic force microscope, and rubber phases were visible. The rubber phase had the average size of the transverse axis of 65 nm, and the average value of aspect ratio of 10.9.

Example G2 (Using Polypropylene-g-Glycidyl Methacrylate)

I. Preparation of Polypropylene-g-Glycidyl Methacrylate

The base copolypropylene powder having the following characteristics was selected: comonomer ethylene content of 18.1% by weight, xylene solubles content of 48.7% by weight, comonomer of content 31.9% by weight in the solubles, solubles/copolypropylene intrinsic viscosity ratio of 0.89, weight average molecular weight of $34.3 \times 10^4$ g/mol, MFR at 230° C. and under a load of 2.16 kg of 1.21 g/10 min, and Tm=143.4° C., and the fine powder smaller than 40 meshes was removed by sieving. 2.0 kg of the above base copolypropylene powder was weighed, and added into a 10 L reaction kettle with mechanical stirring; the reaction system was sealed and subjected to removing oxygen by replacement with nitrogen. 2.5 g of dibenzoyl peroxide and 80 g of glycidyl methacrylate were added; the materials were stirred and mixed for 30 min; the temperature was raised to 90° C.; the reaction was performed for 4 hours. After the reaction was completed, nitrogen purging was performed to decrease the temperature, thereby obtaining polypropylene-g-glycidyl methacrylate with a melt flow rate of 0.49 g/10 min, wherein M1 was 2.96%, and the grafting efficiency was 77%.

II Preparation of Composite Film:

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was the polypropylene-g-glycidyl methacrylate prepared above; and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=2.8 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation, an ethylene-propylene copolymer). Various components prepared above were weighed and mixed according to proportions, wherein the mass parts Wx of component x was 75 parts by weight, and the mass parts Wy of component y was 25 parts by weight. Wc:Wy was 3:5. Other steps were the same as those in step (1), and finally pellets of propylene polymer composition B were obtained, after measurement, they had a melt flow rate $MFR_B$=3.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Example G3 (Using Polypropylene-g-Styrene)

I. Preparation of Polypropylene-g-Styrene

The base copolypropylene powder having the following characteristics was selected: comonomer ethylene content of 18.1% by weight, xylene solubles content of 48.7% by weight, comonomer content of 31.9% in by weight the solubles, solubles/copolypropylene intrinsic viscosity ratio of 0.89, weight average molecular weight of $34.3 \times 10^4$ g/mol, MFR at 230° C. and under a load of 2.16 kg of 1.21 g/10 min, and Tm=143.4° C., and the fine powder smaller than 40 meshes was removed by sieving. 2.0 kg of the above base copolypropylene powder was weighed, and added into a 10 L reaction kettle with mechanical stirring; the reaction system was sealed and subjected to removing oxygen by replacement with nitrogen. 2 g of dibenzoyl peroxide and 100 g of styrene were added; the materials were stirred and mixed for 60 min, and swelled for 4 hours at 40° C.; the temperature was raised to 95° C.; the reaction was performed for 4 hours. After the reaction was completed, nitrogen purging was performed to decrease the temperature, thereby obtaining polypropylene-g-styrene with a melt flow rate of 0.75 g/10 min, wherein M1 was 2.91%, and the grafting efficiency was 61%.

II Preparation of Composite Film:

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was the polypropylene-g-styrene prepared above; and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=2.9 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation, an ethylene-propylene copolymer). Various components prepared above were weighed and mixed according to proportions, wherein the mass parts Wx of component x was 75 parts by weight, and the mass parts Wy of component y was 25 parts by weight. Wc:Wy was 3:5. Other steps were the same as those in step (1), and finally pellets of propylene polymer composition B were obtained, after measurement, they had a melt flow rate MFR$_B$=3.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Example G4 (Using Polypropylene-g-Vinyltriethoxysilane)

I. Preparation of Polypropylene-g-Vinyltriethoxysilane

The base copolypropylene powder having the following characteristics was selected: comonomer ethylene content of 18.1% by weight, xylene solubles content of 48.7% by weight, comonomer content of by weight 31.9% in the solubles, solubles/copolypropylene intrinsic viscosity ratio of 0.89, weight average molecular weight of $34.3 \times 10^4$ g/mol, MFR at 230° C. and under a load of 2.16 kg of 1.21 g/10 min, and Tm=143.4° C., and the fine powder smaller than 40 meshes was removed by sieving. 2.0 kg of the above base copolypropylene powder was weighed, and added into a 10 L reaction kettle with mechanical stirring; the reaction system was sealed, and subjected to removing oxygen by replacement with nitrogen. 2.5 g of lauroyl peroxide and 50 g of vinyltriethoxysilane were added; the materials were stirred and mixed for 30 min, and swelled for 1 hour at 40° C.; the temperature was raised to 90° C.; the reaction was performed for 4 hours. After the reaction was completed, nitrogen purging was performed to cool and decrease the temperature, thereby obtaining polypropylene-g-vinyltriethoxysilane with a melt flow rate of 1.15 g/10 min, wherein M1 was 1.03%, and the grafting efficiency was 42%.

II Preparation of Composite Film:

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was the polypropylene-g-vinyltriethoxysilane prepared above; and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A=3.0$ g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation, an ethylene-propylene copolymer). Various components prepared above were weighed and mixed according to proportions, wherein the mass parts Wx of component x was 75 parts by weight, and the mass parts Wy of component y was 25 parts by weight. Wc:Wy was 3:5. Other steps were the same as those in step (1), and finally pellets of propylene polymer composition B were obtained, after measurement, they had a melt flow rate $MFR_B=3.2$ g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Example G5 (Using Polypropylene-g-4-Vinylpyridine)

I. Preparation of Polypropylene-g-4-Vinylpyridine

The base copolypropylene powder having the following characteristics was selected: comonomer ethylene content of 18.1% by weight, xylene solubles content of 48.7% by weight, comonomer content of 31.9% by weight in the solubles, solubles/copolypropylene intrinsic viscosity ratio of 0.89, weight average molecular weight of $34.3\times10^4$ g/mol, MFR at 230° C. and under a load of 2.16 kg of 1.21 g/10 min, and Tm=143.4° C., and the fine powder smaller than 40 meshes was removed by sieving. 2.0 kg of the above base copolypropylene powder was weighed, and added into a 10 L reaction kettle with mechanical stirring; the reaction system was sealed and subjected to removing oxygen by replacement with nitrogen. 1.2 g of dibenzoyl peroxide and 40 g of 4-vinylpyridine were added; the materials were stirred and mixed for 30 min, and swelled for 30 min at 50° C.; the temperature was raised to 90° C.; the reaction was performed for 4 hours. After the reaction was completed, nitrogen purging was performed to decrease the temperature, thereby obtaining polypropylene-g-4-vinylpyridine with a melt flow rate of 0.89 g/10 min, wherein M1 was 0.92%, and the grafting efficiency was 47%.

II Preparation of Composite Film:

(1) Preparation of Propylene Polymer Composition A:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was the polypropylene-g-4-vinylpyridine prepared above; and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A=3.1$ g/10 min.

(2) Preparation of Propylene Polymer Composition B:

Component x was a propylene random copolymer under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation, an ethylene-propylene copolymer). Various components prepared above were weighed and mixed according to proportions, wherein the mass parts Wx of component x was 75 parts by weight, and the mass parts Wy of component y was 25 parts by weight. Wc:Wy was 3:5. Other steps were the same as those in step (1), and finally pellets of propylene polymer composition B were obtained, after measurement, they had a melt flow rate $MFR_B=3.2$ g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer b). The thickness of the film was 50 μm, wherein the thickness ratio of layer b to layer a was 1:2.

Example G6 (Using the Polypropylene-g-Styrene Prepared in Example G3)

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); and component b was a polyolefin elastomer under the trade name 6102 (available from Exxon Corporation, an ethylene-propylene copolymer). Various components prepared above were weighed and mixed according to proportions, wherein the mass parts Wa of component a was 80 parts by weight, and the mass parts Wb of component b was 20 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a and component b) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate $MFR_A$=3.5 g/10 min.

(2) Preparation of Propylene Polymer Composition B for the Preparation of Layer b:

Component x was a propylene random copolymer under the trade name F5006 (available from Yanshan Petrochemical Company, an ethylene-propylene-butene terpolymer having a melt flow rate of 5.2 g/10 min); component y was a polyolefin elastomer under the trade name 6102 (available from Exxon Corporation, an ethylene-propylene copolymer); and component z was the polypropylene-g-styrene prepared in Example G3. Various components prepared above were weighed and mixed according to proportions, wherein the mass parts Wx of component x was 85 parts by weight, the mass parts Wy of component y was 5 parts by weight, and the mass parts Wz of component z was 10 parts by weight. Wb: Wy was 4:1. Other steps were the same as those in step (1), and finally pellets of propylene polymer composition B were obtained, after measurement, they had a melt flow rate $MFR_B$=4.64 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

Example G7 (Using Polypropylene-g-Styrene/Maleic Anhydride)

I. Preparation of Polypropylene-g-Styrene/Maleic Anhydride

The base copolypropylene powder having the following characteristics was selected: comonomer ethylene content of 18.1% by weight, xylene solubles content of 48.7% by weight, comonomer content of 31.9% by weight in the solubles, solubles/copolypropylene intrinsic viscosity ratio of 0.89, weight average molecular weight of $34.3 \times 10^4$ g/mol, MFR at 230° C. and under a load of 2.16 kg of 1.21 g/10 min, and Tm=143.4° C., and the fine powder smaller than 40 meshes was removed by sieving. 2.0 kg of the above base copolypropylene powder was weighed, and added into a 10 L reaction kettle with mechanical stirring; the reaction system was sealed, and subjected to removing oxygen by replacement with nitrogen. A solution of 1.3 g of dibenzoyl peroxide, 10 g of maleic anhydride and 40 g of styrene was added; the materials were stirred and mixed for 30 min, and swelled for 2 hours at 40° C.; the temperature was raised to 90° C.; the reaction was performed for 4 hours. After the reaction was completed, nitrogen purging was performed to decrease the temperature, thereby obtaining polypropylene-g-styrene/maleic anhydride with a melt flow rate of 0.71 g/10 min, wherein M1 was 1.27%, M2 was 0.44%, and the grafting efficiency was 52%.

II Preparation of Composite Film:

(1) Preparation of Propylene Polymer Composition A for the Preparation of Layer a:

Component a was a homopolypropylene under the trade name PPH-FA03 (available from Qingdao Refining & Chemical Co., Ltd., having a melt flow rate of 3.1 g/10 min, an isotacticity of 98%, and a molecular weight distribution Mw/Mn of 4.7); component b was the polypropylene-g-styrene/maleic anhydride prepared above; and component c was a polyolefin elastomer under the trade name 6102 (available from Exxon Corporation, an ethylene-propylene copolymer). Various components prepared above were weighed and mixed according to proportions, wherein the mass parts Wa of component a was 75 parts by weight, the mass parts Wb of component b was 10 parts by weight, and the mass parts Wc of component c was 15 parts by weight. Then a lubricant (the PEG lubricant produced by the company Clariant, Switzerland, having a molecular weight of 10000, and added in an amount of 0.1 parts by weight based on 100 parts by weight of the sum of the masses of the above component a, component b and component c) was added, and then the mixture was added to a high-speed mixer and mixed homogeneously, subsequently the mixed material was added to the feeder of a twin-screw extruder manufactured by the company W&P, through which the material entered the twin-screw, wherein the temperature of the screw was maintained in the range of 160-230° C. during processing, and by the screw, the material was molten and mixed homogeneously, extruded, pelletized and dried. Pellets of propylene polymer composition A were obtained, and after measurement, they had a melt flow rate MFR$_A$=2.9 g/10 min.

(2) Preparation of Propylene Polymer Composition B for the Preparation of Layer b:

Component x was a random polypropylene under the trade name F5006 (available from Yanshan Petrochemical Company, an ethylene-propylene-butene terpolymer having a melt flow rate of 5.2 g/10 min); and component y was a polyolefin elastomer under the trade name 6102 (available from Exxon Corporation, an ethylene-propylene copolymer). Various components prepared above were weighed and mixed according to proportions, wherein the mass parts Wx of component x was 75 parts by weight, and the mass parts Wy of component y was 25 parts by weight. Wc:Wy was 3:5. Other steps were the same as those in step (1), and finally pellets of propylene polymer composition B were obtained, after measurement, they had a melt flow rate MFR$_B$=3.2 g/10 min.

(3) Preparation of Composite Film:

The pellets of the propylene polymer composition A and the propylene polymer composition B obtained in the above step (1) and step (2) were dried, and then the propylene polymer composition A was added to the core layer extruder of a multi-layer extrusion casting machine, the propylene polymer composition B was added to the upper surface layer extruder of the multi-layer extrusion casting machine, wherein an inorganic anti-blocking agent (silica, the same as above) was added to the upper surface layer extruder, wherein the weight ratio of the anti-blocking agent to the propylene polymer composition pellets was 0.2:100. During the casting process, the temperature of the casting chilling roll was set at 30° C., and after winding up, a composite film was prepared, which consisted of an upper surface layer (layer b) and a core layer (layer a). The thickness of the film was 50 μm, wherein the thickness ratio of layer b to layer a was 1:2.

present invention, many modifications and alterations will be apparent to those skilled in the art.

In addition, it should be noted that various specific technical features described in the above specific embodiments may be combined in any suitable manner if there is no contradiction. Additionally, various different embodiments of the present invention can be arbitrarily combined, and such combination shall also be regarded as the disclosure in the present invention, as long as it is not against the spirit of the present invention.

The endpoints and any values of the ranges disclosed herein are not limited to such precise ranges or values, and these ranges or values shall be understood to include the values close to these ranges or values. For numerical ranges, combination can be made with each other between the endpoints of the various ranges, between the endpoints and individual point values of the various ranges, as well as between the individual point values to obtain one or more new numerical ranges, which should be considered as being specifically disclosed herein.

The invention claimed is:

1. A propylene polymer-based composite film, comprising at least layer a and layer b that are different from each other;

wherein each of layer a and layer b comprises at least one propylene polymer, and at least one layer among layer a and layer b comprises a propylene impact copolymer;

wherein the propylene impact copolymer comprises an elastic part, the elastic part being in the form of a plurality of strip-like rubber phases dispersed in the composite film, said plurality of rubber phases are arranged parallel to each other and each has an average size of the transverse axis of 20-200 nm and an average value of the aspect ratio of 5-20, as determined by observing the cross section of the composite film cut along the transverse direction (TD) via an atomic force microscope,

TABLE 9

| No. | Haze (%) | Pendulum impact strength (J) | Machine direction tensile strength (MPa) | Heat-sealing strength (N/15 mm) | Surface energy (mN/m) | Volume resistivity (Ω · m) |
|---|---|---|---|---|---|---|
| Example G1 | — | 1.18 | 57.3 | 18.2 | 37.1 | — |
| Example G2 | 2.2 | 1.46 | 63.9 | 21.9 | — | $2.1 \times 10^{15}$ |
| Example G3 | 2.6 | 1.48 | 63.6 | 21.8 | — | $3.3 \times 10^{15}$ |
| Example G4 | 2.4 | 1.61 | 62.5 | 21.6 | — | $3.0 \times 10^{15}$ |
| Example G5 | 2.5 | 1.62 | 62.6 | 21.2 | — | $2.7 \times 10^{15}$ |
| Example G6 | 2.2 | 2.28 | 57.8 | 20.8 | — | $2.0 \times 10^{15}$ |
| Example G7 | 2.5 | 1.54 | 62.8 | 21.4 | — | $2.6 \times 10^{15}$ |

Note:
"—" indicates "undetermined".

It can be seen from the results in Table 9 that by adding polar monomer-modified polypropylene to the composite film of the present invention, a higher surface energy could be achieved, so that the obtained composite film had a better adhesion to other materials. By adding grafted propylene polymer, a higher volume resistivity could be achieved, thus the obtained composite film had a better electrical insulation performance.

The present invention has been illustrated above with reference to examples, but the illustration is not exhaustive and is not intended to limit the scope of the present invention. Without departing from the scope and spirit of the said propylene impact copolymer comprises a propylene homopolymerized part and a copolymerized part comprising ethylene units, and the copolymerized part comprising ethylene units is the elastic part, and wherein the composite film has a film haze of less than 7%.

2. The composite film according to claim 1, wherein each rubber phase has an average size of the transverse axis of 20-150 nm and an average value of the aspect ratio of 5-15, as determined by observing the cross section of the composite film cut along the transverse direction via an atomic force microscope.

3. The composite film according to claim 1, wherein the transverse cross sections of the plurality of rubber phases have an angle no greater than 10 degrees with respect to each other, as determined by observing the cross section of the composite film cut along the transverse direction via an atomic force microscope.

4. The composite film according to claim 1, wherein the elastic part appears as a spherical or nearly spherical rubber phase in a scanning electron micrograph of an impact specimen of the propylene impact copolymer.

5. The composite film according to claim 1, wherein the elastic part of the propylene impact copolymer is selected from the group consisting of ethylene-propylene copolymerized part and ethylene-butylene copolymerized part.

6. The composite film according to claim 5, wherein
the content of the copolymerized part comprising ethylene units in the propylene impact copolymer is 3-15% by weight; and/or
the content of the ethylene units of the propylene impact copolymer is 1-14 w % by weight, based on the total weight of the propylene impact copolymer; and/or
in the room temperature xylene solubles of the propylene impact copolymer, the content of the ethylene units is not more than 40% by weight; and/or
in the room temperature xylene solubles of the propylene impact copolymer, the content of ethylene unit sequence [EEE] is not more than 20% by weight, as determined by $^{13}C$ NMR; and/or
the melt flow rate of the propylene impact copolymer at 230° C. under a load of 2.16 kg is 1-10 g/10 min.

7. The composite film according to claim 1, wherein
both layer a and layer b comprise said propylene impact copolymer, wherein the propylene impact copolymer in layer a and that in layer b are the same or different; or
only one layer of layer a and layer b comprises said propylene impact copolymer.

8. The composite film according to claim 1, wherein at least one layer of layer a and layer b comprises a polyolefin elastomer.

9. The composite film according to claim 8, wherein the polyolefin elastomer is an elastomer copolymer of ethylene and alpha olefin, wherein the alpha olefin is a $C_3$-$C_{12}$ alpha olefin.

10. The composite film according to claim 9, wherein the alpha olefin is at least one selected from the group consisting of propylene, 1-butene, 1-hexene and 1-octene.

11. The composite film according to claim 8, wherein the polyolefin elastomer has a shear viscosity ratio $\eta_{160}/\eta_{640}$ of 1.2-3 at 230° C. and under shear rates of 160 s$^{-1}$ and 640 s$^{-1}$; and/or
the polyolefin elastomer has a shear viscosity $\eta_{640}$ of 100-500 Pa·s at 230° C. and under a shear rate of 640 r$^{-1}$, wherein the shear viscosities are determined with a capillary rheometer according to ISO11443:2014.

12. The composite film according to claim 8, wherein the elastic part in the propylene impact copolymer and the polyolefin elastomer form a dispersed rubber phase in the composite film, wherein said rubber phase is in the form of strips, the average size of the transverse axis of the rubber phase is 20-200 nm, and the average value of the aspect ratio of the rubber phase is 5-20, as determined by observing the cross section of the composite film cut along the transverse direction via an atomic force microscope.

13. The composite film according to claim 8, wherein
both layer a and layer b comprise said polyolefin elastomer, wherein the polyolefin elastomer in layer a and that in layer b are the same or different; or only one layer of layer a and layer b comprises said polyolefin elastomer.

14. The composite film according to claim 13, wherein the ratio of the weight proportion of the polyolefin elastomer in layer a to the weight proportion of the polyolefin elastomer in layer b is 6:1-1:6.

15. The composite film according to claim 1, wherein layer a comprises a homopolypropylene and/or a propylene random copolymer.

16. The composite film according to claim 15, wherein
the homopolypropylene has a melt flow rate at 230° C. under a load of 2.16 kg of 2-15 g/10 min; and/or
the homopolypropylene has an isotacticity greater than 97%; and/or
the homopolypropylene has a molecular weight distribution Mw/Mn of 4.5 to 7.0.

17. The composite film according to claim 15, wherein
the propylene random copolymer is at least one selected from the group consisting of ethylene-propylene-butene ternary random copolymer, propylene-ethylene binary random copolymer, and propylene-butene binary random copolymer; and/or
the propylene random copolymer has a melt flow rate at 230° C. under a load of 2.16 kg of 2-15 g/10 min; and/or
the propylene random copolymer has a molecular weight distribution Mw/Mn of 4.5 to 7.0.

18. The composite film according to claim 1, wherein layer b comprises a propylene random copolymer.

19. The composite film according to claim 18, wherein
the propylene random copolymer is at least one selected from the group consisting of ethylene-propylene-butene ternary random copolymer, propylene-ethylene binary random copolymer, and propylene-butene binary random copolymer; and/or
the propylene random copolymer has a melt flow rate at 230° C. under a load of 2.16 kg of 2-15 g/10 min; and/or
the propylene random copolymer has a molecular weight distribution Mw/Mn of 4.5 to 7.0.

20. The composite film according to claim 18, wherein layer a comprises a polyolefin elastomer, said propylene impact copolymer and further propylene polymers, said further propylene polymers being selected from a homopolypropylene and a propylene random copolymer; and layer b comprises a propylene random copolymer and a polyolefin elastomer.

21. The composite film according to claim 20, wherein
layer a comprises 40-90% by weight of the propylene impact copolymer, 5-40% by weight of the further propylene polymers and 2-30% by weight of the polyolefin elastomer, each based on the total weight of layer a; and
layer b comprises 40-95% by weight of the propylene random copolymer and 5-60% by weight of the polyolefin elastomer, each based on the total weight of layer b.

22. The composite film according to claim 18, wherein layer a comprises a homopolypropylene, said propylene impact copolymer and a polyolefin elastomer, and layer b comprises a propylene random copolymer and a polyolefin elastomer.

23. The composite film according to claim 22, wherein
the ratio of the weight proportion of the polyolefin elastomer in layer a to the weight proportion of the polyolefin elastomer in layer b is 2:1-1:4; and/or layer a comprises 40-90% by weight of said homopoly-
propylene, 5-40% by weight of said propylene impact
copolymer and 2-30% by weight of said polyolefin
elastomer, each based on the total weight of layer a; and
layer b comprises 40-95% by weight of the propylene
random copolymer, and 5-60% by weight of the poly-
olefin elastomer, each based on the total weight of layer
b.

24. The composite film according to claim 18, wherein
layer a comprises a propylene polymer and a polyolefin
elastomer, the propylene polymer being selected from a
homopolypropylene and said propylene impact copolymer;
and layer b comprises a propylene random copolymer, a
polyolefin elastomer and said propylene impact copolymer.

25. The composite film according to claim 24, wherein
the ratio of the weight proportion of the polyolefin elas-
tomer in layer a to the weight proportion of the poly-
olefin elastomer in layer b is 6:1-1:4; and/or
layer a comprises 50-95% by weight of said propylene
polymer and 5-50% by weight of said polyolefin elas-
tomer, based on the total weight of layer a; and layer b
comprises 40-90% by weight of said propylene random
copolymer, 5-40% by weight of said polyolefin elasto-
mer and 2-30% by weight of said propylene impact
copolymer, each based on the total weight of layer b.

26. The composite film according to claim 1, wherein
layer a and/or layer b further comprise at least one additive
selected from the group consisting of antioxidants, lubri-
cants, halogen absorbers, light stabilizers, heat stabilizers,
colorants, fillers, slipping agents, anti-blocking agents, sur-
face adhesives, electromagnetic shielding agents, flame
retardants, insulating additives, and antistatic agents.

27. The composite film according to claim 26, wherein the
electromagnetic shielding agent is added to layer b in an
amount of 5-30 parts by weight, based on 100 parts by
weight of the weight of matrix polymer in layer b, and the
electromagnetic shielding agent is used in combination with
a titanate coupling agent.

28. The composite film according to claim 26, wherein the
slipping agent is added to both layer a and layer b, wherein
an amide slipping agent is added to layer a, and a mixture of
an amide slipping agent and a migration-resistant slipping
agent is added to layer b.

29. The composite film according to claim 26, wherein
the antioxidant is at least one selected from the group
consisting of antioxidant 1076, antioxidant 1010, anti-
oxidant 168, and thioester antioxidants; and/or
the lubricant is a PEG lubricant and/or a monoglyceride
lubricant; and/or
the filler is at least one conductive filler, selected from the
group consisting of carbon blacks, graphites, carbon
nanotubes, carbon fibers, conductive metal particles,
conductive metal fibers, fillers coated with conductive
metal, and metal oxides; and/or
the electromagnetic shielding agent is a conductive metal
filler and/or carbon material; wherein the conductive
metal filler is conductive metal particles and/or con-
ductive metal fibers; the carbon material is one or more
of carbon black, graphite, graphene and carbon nano-
tube; and/or
the flame retardant is at least one selected from the group
consisting of metallic or non-metallic hydroxides and/
or oxide hydrates, phosphorus flame retardants, boron
flame retardants, antimony flame retardants and intu-
mescent flame retardants; and/or
the colorant is at least one selected from the group
consisting of azo pigments, phthalocyanine pigments, heterocyclic pigments, lake pigments, dyes, fluorescent
whitening agents and fluorescent pigments; and/or
the slipping agent is selected from an amide slipping
agent which is at least one of erucamide, oleamide,
stearamide, behenamide, stearyl erucamide and ethyl-
ene bisstearamide, or a mixture of an amide slipping
agent and a migration-resistant slipping agent which is
at least one of polytetrafluoroethylene microparticles,
polyimide microparticles, polyamide microparticles,
polycarbonate microparticles, silicone, nano-calcium
carbonate, mica and nano-silica.

30. The composite film according to claim 26, wherein the
surface adhesive is a polar monomer-modified polypropyl-
ene, wherein the polar monomer is at least one selected from
the group consisting of hydroxyl group-containing comono-
mers, cyano group-containing comonomers and anhydride
monomers.

31. The composite film according to claim 30, wherein the
polar monomer is selected from the group consisting of
hydroxy acid, vinyl alcohol, cyanoacrylate, maleic anhy-
dride and itaconic anhydride.

32. The composite film according to claim 30, wherein the
polar monomer-modified polypropylene is added to layer b
in an amount of 1-30% by weight, based on the total weight
of layer b.

33. The composite film according to claim 26, wherein the
insulating additive is a grafted propylene polymer.

34. The composite film according to claim 33, wherein the
insulating additive is added to layer a and/or layer b, and
based on the total weight of the layer, in an amount of 5-45%
by weight.

35. The composite film according to claim 33, wherein the
grafted propylene polymer comprises structural units
derived from copolypropylene and structural units derived
from the following grafting monomers: acrylates; acrylics;
styrenes; alkenyl-containing silanes; alkenyl-containing het-
erocyclic monomers; and combinations of anhydrides hav-
ing at least one olefinic unsaturation and alkenyl-containing
polymerizing monomers.

36. The composite film according to claim 33, wherein the
grafted propylene polymer is prepared from copolypropyl-
ene and grafting monomers via a solid-phase grafting reac-
tion; and/or
in the copolypropylene, the comonomer other than pro-
pylene is at least one selected from the group consisting
of ethylene and $C_4$-$C_8$ α-olefins; and/or
the copolypropylene has at least one of the following
features: a comonomer content of 0.5-30 mol %; an
xylene solubles content of 2-80% by weight; a comono-
mer content in the solubles of 10-70% by weight; an
intrinsic viscosity ratio of the solubles to copolypro-
pylene of 0.3-5; a melt flow rate at 230° C. under a load
of 2.16 kg of 0.01-60 g/10 min; a melting temperature
(Tm) of above 100° C.; and a weight average molecular
weight of $20×10^4$-$60×10^4$ g/mol; and/or
the grafted propylene polymer has a melt flow rate at 230°
C. under a load of 2.16 kg of 0.01-30 g/10 min.

37. The composite film according to claim 33, wherein the
grafted propylene polymer comprises structural units
derived from copolypropylene, and structural units derived
from acrylate monomers and optionally acrylic monomers
and grafted thereon; wherein, based on the weight of the
grafted propylene polymer, the content of grafted-on struc-
tural units derived from acrylate monomers and optional
acrylic monomers is 0.3-7% by weight in the grafted pro-
pylene polymer, the molar ratio of the structural units derived from acrylate monomers to the structural units derived from acrylic monomers is 1:0-2; or the grafted propylene polymer comprises structural units derived from copolypropylene and structural units derived from styrene monomers, wherein based on the weight of the grafted propylene polymer, the content of the grafted-on structural units derived from styrene monomers in the grafted propylene polymer is 0.5-14% by weight; or the grafted propylene polymer comprises structural units derived from copolypropylene and structural units derived from alkenyl-containing silane monomers, wherein based on the weight of the grafted propylene polymer, the content of the grafted-on structural units derived from alkenyl-containing silane monomers in the grafted propylene polymer b is 0.2-6% by weight; or the grafted propylene polymer comprises structural units derived from copolypropylene, structural units derived from anhydride monomers, and structural units derived from alkenyl-containing polymerizing monomers, wherein the alkenyl-containing polymerizing monomer is at least one selected from the group consisting of vinyl acetate, styrene, $\alpha$-methylstyrene, (meth)acrylate, vinyl alkyl ether, vinyl pyrrolidone, vinyl pyridine, vinyl imidazole and acrylonitrile; the anhydride is selected from maleic anhydride and itaconic anhydride; the content of the grafted-on structural units derived from anhydride monomers and alkenyl-containing polymerizing monomers is 0.1-5% by weight; and/or the content of the grafted-on structural units derived from anhydride monomers is 0.05-2% by weight; and/or the molar ratio of the structural units derived from anhydride monomers to the structural units derived from alkenyl-containing polymerizing monomers is 1:1-20; or the grafted propylene polymer comprises structural units derived from copolypropylene and structural units derived from alkenyl-containing heterocyclic monomers, wherein based on the weight of the grafted propylene polymer, the content of the grafted-on structural units derived from alkenyl-containing heterocyclic monomers is 0.5-6% by weight.

38. The composite film according to claim 1, wherein the melt flow rate of propylene polymer composition A for constituting layer a at 230° C. under a load of 2.16 kg is 2-10 g/10 min; and/or the melt flow rate of propylene polymer composition B for constituting layer b at 230° C. under a load of 2.16 kg is 2-10 g/10 min.

39. The composite film according to claim 1, wherein for propylene polymer composition A for constituting layer a and propylene polymer composition B for constituting layer b, the difference in shear viscosity, i.e., $\eta A_{160}-\eta B_{160}$, at 230° C. and under a shear rate of 160 s$^{-1}$ and the difference in shear viscosity, i.e., $\eta A_{640}-\eta B_{640}$, at 230° C. and under a shear rate of 640 s$^{-1}$ are both ≥0, and the ratio of the two, $(\eta A_{160}-\eta B_{160})/(\eta A_{640}-\eta B_{640})$, is 1-2.6, wherein the shear viscosities are determined with a capillary rheometer according to ISO11443:2014, and the shear viscosities of the propylene polymer composition A at shear rates of 160 s$^{-1}$ and 640 s$^{-1}$ are marked as $\eta A_{160}$ and $\eta A_{640}$ respectively, and the shear viscosities of the propylene polymer composition B at shear rates of 160 s$^{-1}$ and 640 s$^{-1}$ are marked as $\eta B_{160}$ and $\eta B_{640}$ respectively.

40. The composite film according to claim 39, wherein in the composite film, the ratio of the sum of the thicknesses of other layers than layer a to the thickness of layer a is 1:6-2:1.

41. The composite film according to claim 1, wherein the composite film further comprises one or more additional layers, and layer b is the surface layer of the composite film, wherein the composition of the additional layer is the same as or different from that of layer a or layer b.

42. The composite film according to claim 41, wherein the composite film is a three-layer film, the additional layer is named as layer c, and layer b and layer c are located on the two sides of layer a, respectively.

43. The composite film according to claim 1, wherein the composite film has one or more of the following properties:

1) Pendulum impact strength of ≥0.4 J;
2) Film haze of ≤5%;
3) Machine direction tensile strength of ≥40 MPa;
4) Heat-sealing strength at 150° C. of ≥12N/15 mm;
5) Thickness deviation in the MD direction of not greater than 1.3;
6) Thickness deviation in the TD direction of not greater than 1.5;
7) Impact resistance deviation in the MD direction of not greater than 0.05;
8) Impact resistance deviation in the TD direction of not greater than 0.07;
9) Surface energy of ≥29 mN/m;
10) Volume resistivity of ≥1.5×10$^{15}$ Ω·m.

44. A packaging material, comprising the composite film according to claim 1.

45. The packaging material according to claim 44, wherein the packaging material is battery packaging material, electronic product packaging material or food packaging material.

46. A method for the preparation of a composite film according to claim 1, comprising:

subjecting the raw material compositions for forming the various layers, after the optional pelletization process, to extrusion casting to form the composite film;

wherein prior to the extrusion process, the elastic part in the propylene impact copolymer used in the raw material composition forms a particulate rubber phase, the average particle size of which is less than or equal to 1.8 μm, and the maximum particle size of which is no more than 2.5 μm, as determined by observing the cross section of the impact specimen via a scanning electron microscope.

47. The method according to claim 46, wherein the elastic part in the propylene impact copolymer used in the raw material composition forms a spherical or nearly spherical rubber phase.

48. The method according to claim 46, wherein the method further comprises subjecting the obtained composite film to stretching.

49. The method according to claim 48, wherein the obtained composite film is subjected to biaxial stretching.

* * * * *